(12) United States Patent
Tang et al.

(10) Patent No.: US 10,156,700 B2
(45) Date of Patent: *Dec. 18, 2018

(54) OPTICAL IMAGE CAPTURING SYSTEM

(71) Applicant: ABILITY OPTO-ELECTRONICS TECHNOLOGY CO. LTD., Taichung (TW)

(72) Inventors: Nai-Yuan Tang, Taichung (TW); Yeong-Ming Chang, Taichung (TW)

(73) Assignee: ABILITY OPTO-ELECTRONICS TECHNOLOGY CO. LTD., Taichung (TW)

( * ) Notice: Subject to any disclaimer, the term of this patent is extended or adjusted under 35 U.S.C. 154(b) by 35 days.

This patent is subject to a terminal disclaimer.

(21) Appl. No.: 14/971,649

(22) Filed: Dec. 16, 2015

(65) Prior Publication Data

US 2017/0052348 A1 Feb. 23, 2017

(30) Foreign Application Priority Data

Aug. 17, 2015 (TW) .............................. 104126745 A

(51) Int. Cl.
*G02B 13/18* (2006.01)
*G02B 3/02* (2006.01)
*G02B 13/00* (2006.01)
*G02B 9/62* (2006.01)

(52) U.S. Cl.
CPC ............ *G02B 13/0045* (2013.01); *G02B 9/62* (2013.01)

(58) Field of Classification Search
CPC ...... G02B 13/0045; G02B 9/62; G02B 5/208; G02B 27/002

USPC .................................. 359/713, 761, 756, 757
See application file for complete search history.

(56) References Cited

U.S. PATENT DOCUMENTS 9,753,259 B2 * 9/2017 Tang .................. G02B 13/0045
2014/0355134 A1 * 12/2014 Sekine ............... G02B 13/0045
359/713

FOREIGN PATENT DOCUMENTS

| CN | 203606558 U | 5/2014 |
|---|---|---|
| CN | 106168698 A | 11/2016 |
| CN | 106168699 A | 11/2016 |
| CN | 106168700 A | 11/2016 |
| CN | 106405790 A | 2/2017 |
| CN | 106405791 A | 2/2017 |
| CN | 106443964 A | 2/2017 |

(Continued)

OTHER PUBLICATIONS

U.S. Appl. No. 14/980,046, filed Dec. 28, 2015.
(Continued)

*Primary Examiner* — Alicia M Harrington
(74) *Attorney, Agent, or Firm* — Muncy, Geissler, Olds & Lowe, PC

(57) ABSTRACT

A six-piece optical lens for capturing image and a six-piece optical module for capturing image are provided. In order from an object side to an image side, the optical lens along the optical axis includes a first lens with refractive power, a second lens with refractive power, a third lens with refractive power, a fourth lens with refractive power, a fifth lens with refractive power and a sixth lens with refractive power. At least one of the image-side surface and object-side surface of each of the six lens elements is aspheric. The optical lens can increase aperture value and improve the imagining quality for use in compact cameras.

23 Claims, 24 Drawing Sheets

(56) References Cited

FOREIGN PATENT DOCUMENTS

EP 1 881 356 A1 1/2008
WO WO2015/060166 A1 4/2015

OTHER PUBLICATIONS

U.S. Appl. No. 14/980,098, filed Dec. 28, 2015.
U.S. Appl. No. 14/980,213, filed Dec. 28, 2015.
U.S. Appl. No. 14/985,922, filed Dec. 31, 2015.
U.S. Appl. No. 14/985,801, filed Dec. 31, 2015.
U.S. Appl. No. 14/985,849, filed Dec. 31, 2015.
U.S. Appl. No. 14/971,767, filed Dec. 16, 2015.
U.S. Appl. No. 14/972,579, filed Dec. 17, 2015.
U.S. Appl. No. 14/972,669, filed Dec. 17, 2015.
U.S. Appl. No. 14/974,902, filed Dec. 18, 2015.
U.S. Appl. No. 14/972,507, filed Dec. 17, 2015.
U.S. Appl. No. 14/971,726, filed Dec. 16, 2015.
U.S. Appl. No. 14/971,307, filed Dec. 16, 2015.
U.S. Appl. No. 14/971,457, filed Dec. 16, 2015.
U.S. Appl. No. 14/971,563, filed Dec. 16, 2015.
U.S. Appl. No. 14/974,596, filed Dec. 18, 2015.
U.S. Appl. No. 14/975,022, filed Dec. 18, 2015.
U.S. Appl. No. 14/973,111, filed Dec. 17, 2015.
U.S. Appl. No. 14/972,835, filed Dec. 17, 2015.
U.S. Appl. No. 14/973,212, filed Dec. 17, 2015.
U.S. Appl. No. 14/974,716, filed Dec. 18, 2015.
U.S. Appl. No. 14/974,443, filed Dec. 18, 2015.
U.S. Appl. No. 14/973,168, filed Dec. 17, 2015.
U.S. Appl. No. 14/987,289, filed Jan. 4, 2016.

* cited by examiner

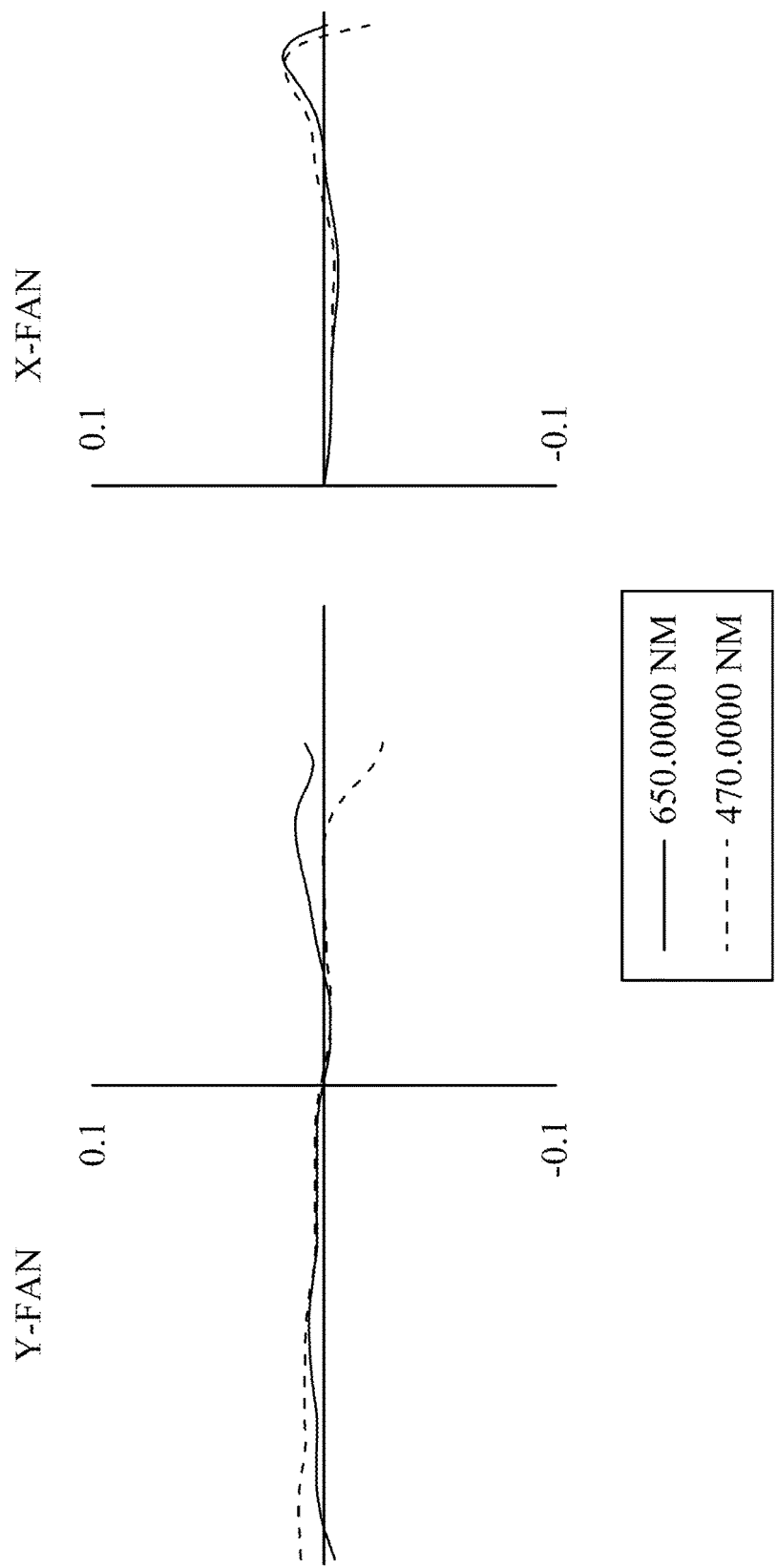

OPTICAL IMAGE CAPTURING SYSTEM

CROSS-REFERENCE TO RELATED APPLICATION

This application claims the benefit of Taiwan Patent Application No. 104126745, filed on Aug. 17, 2015, in the Taiwan Intellectual Property Office, the disclosure of which is incorporated herein in its entirety by reference.

BACKGROUND OF THE INVENTION

1. Field of the Invention

The present disclosure relates to an optical image capturing system, and more particularly to a compact optical image capturing system which can be applied to electronic products.

2. Description of the Related Art

In recent years, with the rise of portable electronic devices having camera functionalities, the demand for an optical image capturing system is raised gradually. The image sensing device of ordinary photographing camera is commonly selected from charge coupled device (CCD) or complementary metal-oxide semiconductor sensor (CMOS Sensor). In addition, as advanced semiconductor manufacturing technology enables the minimization of pixel size of the image sensing device, the development of the optical image capturing system directs towards the field of high pixels. Therefore, the requirement for high imaging quality is rapidly raised.

The traditional optical image capturing system of a portable electronic device comes with different designs, including a four-lens or a fifth-lens design. However, the requirement for the higher pixels and the requirement for a large aperture of an end user, like functionalities of micro filming and night view have been raised. The optical image capturing system in prior arts cannot meet the requirement of the higher order camera lens module.

Therefore, how to effectively increase quantity of incoming light of the optical lenses, and further improves imaging quality for the image formation, becomes a quite important issue.

SUMMARY OF THE INVENTION

The aspect of embodiment of the present disclosure directs to an optical image capturing system and an optical image capturing lens which use combination of refractive powers, convex and concave surfaces of six-piece optical lenses (the convex or concave surface in the disclosure denotes the change of geometrical shape of an object-side surface or an image-side surface of each lens with different height from an optical axis) to increase the quantity of incoming light of the optical image capturing system, and to improve imaging quality for image formation, so as to be applied to minimized electronic products.

The term and its definition to the lens element parameter in the embodiment of the present invention are shown as below for further reference.

The Lens Element Parameter Related to a Length or a Height in the Lens Element

A maximum height for image formation of the optical image capturing system is denoted by HOI. A height of the optical image capturing system is denoted by HOS. A distance from the object-side surface of the first lens element to the image-side surface of the sixth lens element is denoted by InTL. A distance from an aperture stop (aperture) to an image plane is denoted by InS. A distance from the first lens element to the second lens element is denoted by In12 (instance). A central thickness of the first lens element of the optical image capturing system on the optical axis is denoted by TP1 (instance).

The Lens Element Parameter Related to a Material in the Lens Element

An Abbe number of the first lens element in the optical image capturing system is denoted by NA1 (instance). A refractive index of the first lens element is denoted by Nd1 (instance).

The Lens Element Parameter Related to a View Angle in the Lens Element

A view angle is denoted by AF. Half of the view angle is denoted by HAF. A major light angle is denoted by MRA.

The Lens Element Parameter Related to Exit/Entrance Pupil in the Lens Element

An entrance pupil diameter of the optical image capturing system is denoted by HEP. An entrance pupil diameter of the optical image capturing system is denoted by HEP. A maximum effective half diameter position of any surface of single lens element means the vertical height between the effective half diameter (EHD) and the optical axis where the incident light of the maximum view angle of the system passes through the farthest edge of the entrance pupil on the EHD of the surface of the lens element. For example, the maximum effective half diameter position of the object-side surface of the first lens element is denoted as EHD11. The maximum effective half diameter position of the image-side of the first lens element is denoted as EHD12. The maximum effective half diameter position of the object-side surface of the second lens element is denoted as EHD21. The maximum half effective half diameter position of the image-side surface of the second lens element is denoted as EHD22. The maximum effective half diameter position of any surfaces of the remaining lens elements of the optical image capturing system can be referred as mentioned above.

The Lens Element Parameter Related to an Arc Length of the Lens Element Shape and an Outline of Surface A length of outline curve of the maximum effective half diameter position of any surface of a single lens element refers to a length of outline curve from an axial point on the surface of the lens element to the maximum effective half diameter position of the surface along an outline of the surface of the lens element and is denoted as ARS. For example, the length of outline curve of the maximum effective half diameter position of the object-side surface of the first lens element is denoted as ARS11. The length of outline curve of the maximum effective half diameter position of the image-side surface of the first lens element is denoted as ARS12. The length of outline curve of the maximum effective half diameter position of the object-side surface of the second lens element is denoted as ARS21. The length of outline curve of the maximum effective half diameter position of the image-side surface of the second lens element is denoted as ARS22. The lengths of outline curve of the maximum effective half diameter position of any surface of the other lens elements in the optical image capturing system are denoted in the similar way.

A length of outline curve of a half of an entrance pupil diameter (HEP) of any surface of a signal lens element refers to a length of outline curve of the half of the entrance pupil diameter (HEP) from an axial point on the surface of the lens element to a coordinate point of vertical height with a distance of the half of the entrance pupil diameter from the optical axis on the surface along the outline of the surface of the lens element and is denoted as ARE. For example, the length of the outline curve of the half of the entrance pupil diameter (HEP) of the object-side surface of the first lens element is denoted as ARE11. The length of the outline curve of the half of the entrance pupil diameter (HEP) of the image-side surface of the first lens element is denoted as ARE12. The length of the outline curve of the half of the entrance pupil diameter (HEP) of the object-side surface of the second lens element is denoted as ARE21. The length of the outline curve of the half of the entrance pupil diameter (HEP) of the image-side surface of the second lens element is denoted as ARE22. The lengths of outline curves of the half of the entrance pupil diameters (HEP) of any surface of the other lens elements in the optical image capturing system are denoted in the similar way.

The Lens Element Parameter Related to a Depth of the Lens Element Shape

A horizontal distance in parallel with an optical axis from a maximum effective half diameter position to an axial point on the object-side surface of the sixth lens element is denoted by InRS61 (a depth of the maximum effective half diameter). A horizontal distance in parallel with an optical axis from a maximum effective half diameter position to an axial point on the image-side surface of the sixth lens element is denoted by InRS62 (the depth of the maximum effective half diameter). The depths of the maximum effective half diameters (sinkage values) of object surfaces and image surfaces of other lens elements are denoted in the similar way.

The Lens Element Parameter Related to the Lens Element Shape

A critical point C is a tangent point on a surface of a specific lens element, and the tangent point is tangent to a plane perpendicular to the optical axis and the tangent point cannot be a crossover point on the optical axis. To follow the past, a distance perpendicular to the optical axis between a critical point C51 on the object-side surface of the fifth lens element and the optical axis is HVT51 (instance). A distance perpendicular to the optical axis between a critical point C52 on the image-side surface of the fifth lens element and the optical axis is HVT52 (instance). A distance perpendicular to the optical axis between a critical point C61 on the object-side surface of the sixth lens element and the optical axis is HVT61 (instance). A distance perpendicular to the optical axis between a critical point C62 on the image-side surface of the sixth lens element and the optical axis is HVT62 (instance). Distances perpendicular to the optical axis between critical points on the object-side surfaces or the image-side surfaces of other lens elements and the optical axis are denoted in the similar way described above.

The object-side surface of the sixth lens element has one inflection point IF611 which is nearest to the optical axis, and the sinkage value of the inflection point IF611 is denoted by SGI611. SGI611 is a horizontal shift distance in parallel with the optical axis from an axial point on the object-side surface of the sixth lens element to the inflection point which is nearest to the optical axis on the object-side surface of the sixth lens element. A distance perpendicular to the optical axis between the inflection point IF611 and the optical axis is HIF611 (instance). The image-side surface of the sixth lens element has one inflection point IF621 which is nearest to the optical axis and the sinkage value of the inflection point IF621 is denoted by SGI621 (instance). SGI621 is a horizontal shift distance in parallel with the optical axis from an axial point on the image-side surface of the sixth lens element to the inflection point which is nearest to the optical axis on the image-side surface of the sixth lens element. A distance perpendicular to the optical axis between the inflection point IF621 and the optical axis is HIF621 (instance).

The object-side surface of the sixth lens element has one inflection point IF612 which is the second nearest to the optical axis and the sinkage value of the inflection point IF612 is denoted by SGI612 (instance). SGI612 is a horizontal shift distance in parallel with the optical axis from an axial point on the object-side surface of the sixth lens element to the inflection point which is the second nearest to the optical axis on the object-side surface of the sixth lens element. A distance perpendicular to the optical axis between the inflection point IF612 and the optical axis is HIF612 (instance). The image-side surface of the sixth lens element has one inflection point IF622 which is the second nearest to the optical axis and the sinkage value of the inflection point IF622 is denoted by SGI622 (instance). SGI622 is a horizontal shift distance in parallel with the optical axis from an axial point on the image-side surface of the sixth lens element to the inflection point which is the second nearest to the optical axis on the image-side surface of the sixth lens element. A distance perpendicular to the optical axis between the inflection point IF622 and the optical axis is HIF622 (instance).

The object-side surface of the sixth lens element has one inflection point IF613 which is the third nearest to the optical axis and the sinkage value of the inflection point IF613 is denoted by SGI613 (instance). SGI613 is a horizontal shift distance in parallel with the optical axis from an axial point on the object-side surface of the sixth lens element to the inflection point which is the third nearest to the optical axis on the object-side surface of the sixth lens element. A distance perpendicular to the optical axis between the inflection point IF613 and the optical axis is HIF613 (instance). The image-side surface of the sixth lens element has one inflection point IF623 which is the third nearest to the optical axis and the sinkage value of the inflection point IF623 is denoted by SGI623 (instance). SGI623 is a horizontal shift distance in parallel with the optical axis from an axial point on the image-side surface of the sixth lens element to the inflection point which is the third nearest to the optical axis on the image-side surface of the sixth lens element. A distance perpendicular to the optical axis between the inflection point IF623 and the optical axis is HIF623 (instance).

The object-side surface of the sixth lens element has one inflection point IF614 which is the fourth nearest to the optical axis and the sinkage value of the inflection point IF614 is denoted by SGI614 (instance). SGI614 is a horizontal shift distance in parallel with the optical axis from an axial point on the object-side surface of the sixth lens element to the inflection point which is the fourth nearest to the optical axis on the object-side surface of the sixth lens element. A distance perpendicular to the optical axis between the inflection point IF614 and the optical axis is HIF614 (instance). The image-side surface of the sixth lens element has one inflection point IF624 which is the fourth nearest to the optical axis and the sinkage value of the inflection point IF624 is denoted by SGI624 (instance). SGI624 is a horizontal shift distance in parallel with the optical axis from an axial point on the image-side surface of the sixth lens element to the inflection point which is the fourth nearest to the optical axis on the image-side surface of the sixth lens element. A distance perpendicular to the optical axis between the inflection point IF624 and the optical axis is HIF624 (instance).

The inflection points on the object-side surfaces or the image-side surfaces of the other lens elements and the distances perpendicular to the optical axis thereof or the sinkage values thereof are denoted in the similar way described above.

The Lens Element Parameter Related to an aberration

Optical distortion for image formation in the optical image capturing system is denoted by ODT. TV distortion for image formation in the optical image capturing system is denoted by TDT. Further, the range of the aberration offset for the view of image formation may be limited to 50%-100%. An offset of the spherical aberration is denoted by DFS. An offset of the coma aberration is denoted by DFC.

The lateral aberration of the stop is denoted as STA to assess the function of the specific optical image capturing system. The tangential fan or sagittal fan may be applied to calculate the STA of any view fields, and in particular, to calculate the STA of the max reference wavelength (e.g. 650 nm) and the minima reference wavelength (e.g. 470 nm) for serve as the standard of the optimal function. The aforementioned direction of the tangential fan can be further defined as the positive (overhead-light) and negative (lower-light) directions. The max operation wavelength, which passes through the STA, is defined as the image position of the specific view field, and the distance difference of two positions of image position of the view field between the max operation wavelength and the reference primary wavelength (e.g. wavelength of 555 nm), and the minimum operation wavelength, which passes through the STA, is defined as the image position of the specific view field, and STA of the max operation wavelength is defined as the distance between the image position of the specific view field of max operation wavelength and the image position of the specific view field of the reference primary wavelength (e.g. wavelength of 555 nm), and STA of the minimum operation wavelength is defined as the distance between the image position of the specific view field of the minimum operation wavelength and the image position of the specific view field of the reference primary wavelength (e.g. wavelength of 555 nm) are assessed the function of the specific optical image capturing system to be optimal. Both STA of the max operation wavelength and STA of the minimum operation wavelength on the image position of vertical height with a distance from the optical axis to 70% HOI (i.e. 0.7 HOI), which are smaller than 100 µm, are served as the sample. The numerical, which are smaller than 80 µm, are also served as the sample.

A maximum height for image formation on the image plane perpendicular to the optical axis in the optical image capturing system is denoted by HOI. A lateral aberration of the longest operation wavelength of a visible light of a positive direction tangential fan of the optical image capturing system passing through an edge of the entrance pupil and incident on the image plane by 0.7 HOI is denoted as PLTA. A lateral aberration of the shortest operation wavelength of a visible light of the positive direction tangential fan of the optical image capturing system passing through the edge of the entrance pupil and incident on the image plane by 0.7 HOI is denoted as PSTA. A lateral aberration of the longest operation wavelength of a visible light of a negative direction tangential fan of the optical image capturing system passing through the edge of the entrance pupil and incident on the image plane by 0.7 HOI is denoted as NLTA. A lateral aberration of the shortest operation wavelength of a visible light of a negative direction tangential fan of the optical image capturing system passing through the edge of the entrance pupil and incident on the image plane by 0.7 HOI is denoted as NSTA. A lateral aberration of the longest operation wavelength of a visible light of a sagittal fan of the optical image capturing system passing through the edge of the entrance pupil and incident on the image plane by 0.7 HOI is denoted as SLTA. A lateral aberration of the shortest operation wavelength of a visible light of the sagittal fan of the optical image capturing system passing through the edge of the entrance pupil and incident on the image plane by 0.7 HOI is denoted as SSTA.

The disclosure provides an optical image capturing system, an object-side surface or an image-side surface of the sixth lens element may have inflection points, such that the angle of incidence from each view field to the sixth lens element can be adjusted effectively and the optical distortion and the TV distortion can be corrected as well. Besides, the surfaces of the sixth lens element may have a better optical path adjusting ability to acquire better imaging quality.

The disclosure provides an optical image capturing system, in order from an object side to an image side, including a first, second, third, fourth, fifth, sixth lens elements and an image plane. The first lens element has refractive power. An object-side surface and an image-side surface of the sixth lens element are aspheric. Focal lengths of the first through sixth lens elements are f1, f2, f3, f4, f5 and f6 respectively. A focal length of the optical image capturing system is f. An entrance pupil diameter of the optical image capturing system is HEP. A distance on an optical axis from an object-side surface of the first lens element to the image plane is HOS. A distance on the optical axis from the object-side surface of the first lens element to the image-side surface of the sixth lens element is InTL. A length of outline curve from an axial point on any surface of any one of the six lens elements to a coordinate point of vertical height with a distance of a half of the entrance pupil diameter from the optical axis on the surface along an outline of the surface is denoted as ARE. The following relations are satisfied: $1.2 \leq f/HEP \leq 10.0$, $0 < InTL/HOS < 0.9$, and $0.9 \leq 2(ARE/HEP) \leq 1.5$.

The disclosure provides another optical image capturing system, in order from an object side to an image side, including a first, second, third, fourth, fifth, six lens elements and an image plane. The first lens element has positive refractive power and may have a convex object-side surface near the optical axis. The second lens element has refractive power. The third lens element has refractive power. The fourth lens element has refractive power. The fifth lens element has refractive power. The sixth lens element has refractive power and an object-side surface and an image-side surface of the sixth lens element are aspheric. At least two lens elements among the first through sixth lens elements respectively have at least one inflection point on at least one surface thereof, and at least one of the first through fourth lens elements has positive refractive power. Focal lengths of the first through sixth lens elements are f1, f2, f3, f4, f5 and f6 respectively. A focal length of the optical image capturing system is f. An entrance pupil diameter of the optical image capturing system is HEP. A on an optical axis distance from an object-side surface of the first lens element to the image plane is HOS. A distance on the optical axis from the object-side surface of the first lens element to the image-side surface of the sixth lens element is InTL A length of outline curve from an axial point on any surface of any one of the six lens elements to a coordinate point of vertical height with a distance of a half of the entrance pupil diameter from the optical axis on the surface along an outline of the surface is denoted as ARE. The following relations are satisfied: $1.2 \leq f/HEP \leq 10.0$, $0 < InTL/HOS < 0.9$, and $0.9 \leq 2(ARE/HEP) \leq 1.5$.

The disclosure provides another optical image capturing system, in order from an object side to an image side, including a first, second, third, fourth, fifth, sixth lens elements and an image plane. At least one surface among an object-side surface and an image-side surface of the sixth lens element has at least one inflection point. Wherein, the optical image capturing system consists of the six lens elements with refractive power. At least three lens elements among the first through sixth lens elements respectively have at least one inflection point on at least one surface thereof. The first lens element has positive refractive power. The second lens element has negative refractive power. The third lens element has refractive power. The fourth lens element has refractive power. The fifth lens element has refractive power. The sixth lens element has refractive power. Focal lengths of the first through sixth lens elements are f1, f2, f3, f4, f5 and f6 respectively. A focal length of the optical image capturing system is f. An entrance pupil diameter of the optical image capturing system is HEP. A distance on an optical axis from an object-side surface of the first lens element to the image plane is HOS. A distance on the optical axis from the object-side surface of the first lens element to the image-side surface of the sixth lens element is InTL. A length of outline curve from an axial point on any surface of any one of the six lens elements to a coordinate point of vertical height with a distance of a half of the entrance pupil diameter from the optical axis on the surface along an outline of the surface is denoted as ARE. The following relations are satisfied: 1.2≤f/HEP≤3.5, 0<InTL/HOS<0.9, and 0.9≤2(ARE/HEP)≤1.5.

The length of the outline curve of any surface of a signal lens element in the maximum effective half diameter position affects the functions of the surface aberration correction and the optical path difference in each view field. The longer outline curve may lead to a better function of aberration correction, but the difficulty of the production may become inevitable. Hence, the length of the outline curve of the maximum effective half diameter position of any surface of a signal lens element (ARS) has to be controlled, and especially, the ratio relations (ARS/TP) between the length of the outline curve of the maximum effective half diameter position of the surface (ARS) and the thickness of the lens element to which the surface belongs on the optical axis (TP) has to be controlled. For example, the length of the outline curve of the maximum effective half diameter position of the object-side surface of the first lens element is denoted as ARS11, and the thickness of the first lens element on the optical axis is TP1, and the ratio between both of them is ARS11/TP1. The length of the outline curve of the maximum effective half diameter position of the image-side surface of the first lens element is denoted as ARS12, and the ratio between ARS12 and TP1 is ARS12/TP1. The length of the outline curve of the maximum effective half diameter position of the object-side surface of the second lens element is denoted as ARS21, and the thickness of the second lens element on the optical axis is TP2, and the ratio between both of them is ARS21/TP2. The length of the outline curve of the maximum effective half diameter position of the image-side surface of the second lens element is denoted as ARS22, and the ratio between ARS22 and TP2 is ARS22/TP2. The ratio relations between the lengths of the outline curve of the maximum effective half diameter position of any surface of the other lens elements and the thicknesses of the lens elements to which the surfaces belong on the optical axis (TP) are denoted in the similar way.

The length of outline curve of half of an entrance pupil diameter of any surface of a single lens element especially affects the functions of the surface aberration correction and the optical path difference in each shared view field. The longer outline curve may lead to a better function of aberration correction, but the difficulty of the production may become inevitable. Hence, the length of outline curve of half of an entrance pupil diameter of any surface of a single lens element has to be controlled, and especially, the ratio relationship between the length of outline curve of half of an entrance pupil diameter of any surface of a single lens element and the thickness on the optical axis has to be controlled. For example, the length of outline curve of the half of the entrance pupil diameter of the object-side surface of the first lens element is denoted as ARE11, and the thickness of the first lens element on the optical axis is TP1, and the ratio thereof is ARE11/TP1. The length of outline curve of the half of the entrance pupil diameter of the image-side surface of the first lens element is denoted as ARE12, and the thickness of the first lens element on the optical axis is TP1, and the ratio thereof is ARE12/TP1. The length of outline curve of the half of the entrance pupil diameter of the object-side surface of the first lens element is denoted as ARE21, and the thickness of the second lens element on the optical axis is TP2, and the ratio thereof is ARE21/TP2. The length of outline curve of the half of the entrance pupil diameter of the image-side surface of the second lens element is denoted as ARE22, and the thickness of the second lens element on the optical axis is TP2, and the ratio thereof is ARE22/TP2. The ratio relationship of the remaining lens elements of the optical image capturing system can be referred as mentioned above.

The height of optical system (HOS) may be reduced to achieve the minimization of the optical image capturing system when the absolute value of f1 is larger than f6 (|f1|>f6).

When |f2|+|f3|+|f4|+|f5| and |f1|+|f6| are satisfied with above relations, at least one of the second through fifth lens elements may have weak positive refractive power or weak negative refractive power. The weak refractive power indicates that an absolute value of the focal length of a specific lens element is greater than 10. When at least one of the second through fifth lens elements has the weak positive refractive power, the positive refractive power of the first lens element can be shared, such that the unnecessary aberration will not appear too early. On the contrary, when at least one of the second through fifth lens elements has the weak negative refractive power, the aberration of the optical image capturing system can be corrected and fine tuned.

The sixth lens element may have negative refractive power and a concave image-side surface. Hereby, the back focal length is reduced for keeping the miniaturization, to miniaturize the lens element effectively. In addition, at least one of the object-side surface and the image-side surface of the sixth lens element may have at least one inflection point, such that the angle of incident with incoming light from an off-axis view field can be suppressed effectively and the aberration in the off-axis view field can be corrected further.

BRIEF DESCRIPTION OF THE DRAWINGS

The detailed structure, operating principle and effects of the present disclosure will now be described in more details hereinafter with reference to the accompanying drawings that show various embodiments of the present disclosure as follows.

FIG. 2C is a lateral aberration diagram of tangential fan, sagittal fan, the longest operation wavelength and the shortest operation wavelength passing through an edge of the entrance pupil and incident on the image plane by 0.7 HOI according to the second embodiment of the present application.

DETAILED DESCRIPTION OF THE PREFERRED EMBODIMENTS

Figure 1A:
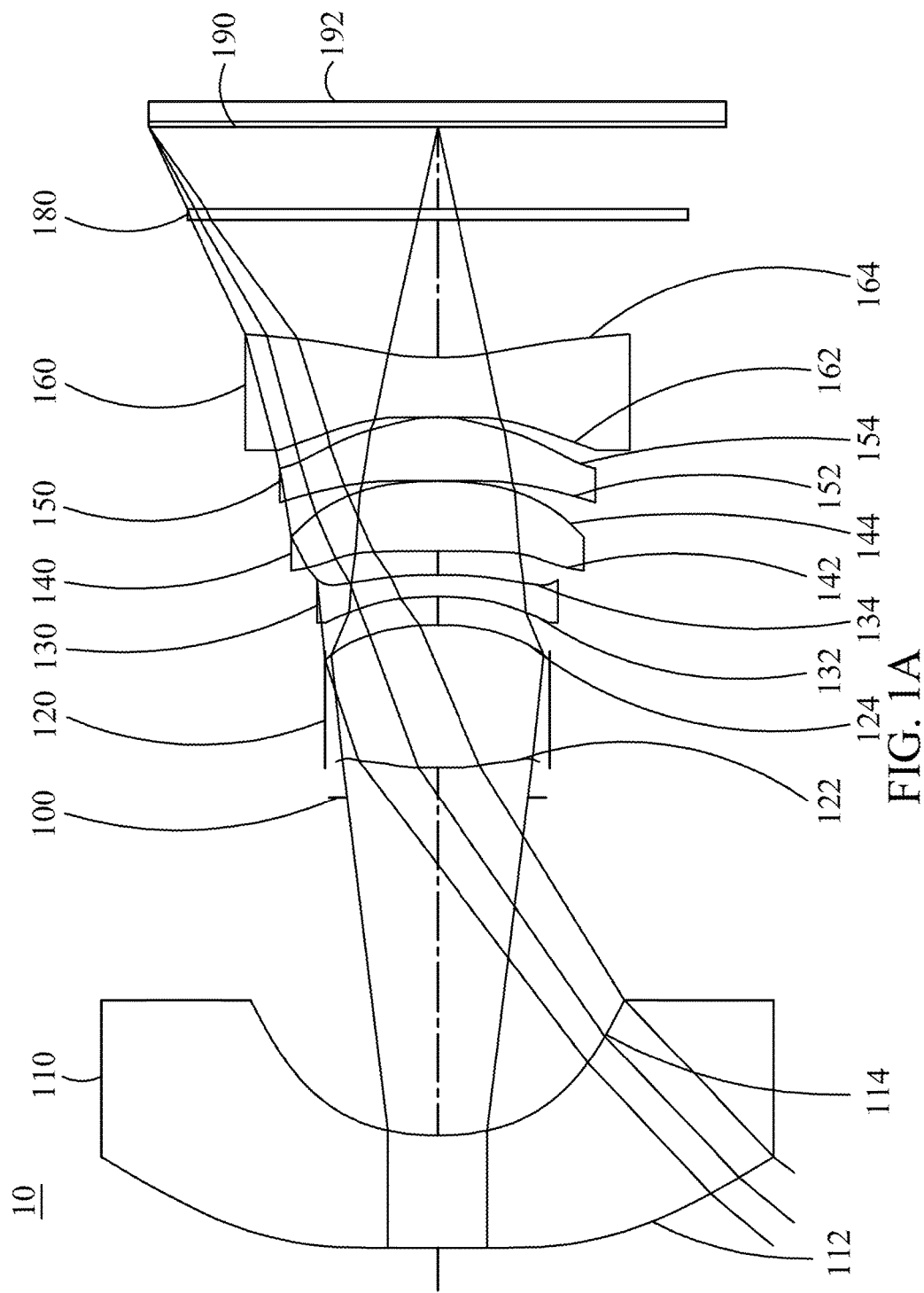
FIG. 1A is a schematic view of the optical image capturing system according to the first embodiment of the present application.

Reference will now be made in detail to the exemplary embodiments of the present disclosure, examples of which are illustrated in the accompanying drawings. Therefore, it is to be understood that the foregoing is illustrative of exemplary embodiments and is not to be construed as limited to the specific embodiments disclosed, and that modifications to the disclosed exemplary embodiments, as well as other exemplary embodiments, are intended to be included within the scope of the appended claims. These embodiments are provided so that this disclosure will be thorough and complete, and will fully convey the inventive concept to those skilled in the art. The relative proportions and ratios of elements in the drawings may be exaggerated or diminished in size for the sake of clarity and convenience in the drawings, and such arbitrary proportions are only illustrative and not limiting in any way. The same reference numbers are used in the drawings and the description to refer to the same or like parts.

It will be understood that, although the terms 'first', 'second', 'third', etc., may be used herein to describe various elements, these elements should not be limited by these terms. The terms are used only for the purpose of distinguishing one component from another component. Thus, a first element discussed below could be termed a second element without departing from the teachings of embodiments. As used herein, the term "or" includes any and all combinations of one or more of the associated listed items.

An optical image capturing system, in order from an object side to an image side, includes a first, second, third, fourth, fifth and sixth lens elements with refractive power and an image plane. The optical image capturing system may further include an image sensing device which is disposed on an image plane.

The optical image capturing system may use three sets of wavelengths which are 486.1 nm, 587.5 nm and 656.2 nm, respectively, wherein 587.5 nm is served as the primary reference wavelength and a reference wavelength for retrieving technical features. The optical image capturing system may also use five sets of wavelengths which are 470 nm, 510 nm, 555 nm, 610 nm and 650 nm, respectively, wherein 555 nm is served as the primary reference wavelength and a reference wavelength for retrieving technical features.

A ratio of the focal length f of the optical image capturing system to a focal length fp of each of lens elements with positive refractive power is PPR. A ratio of the focal length f of the optical image capturing system to a focal length fn of each of lens elements with negative refractive power is NPR. A sum of the PPR of all lens elements with positive refractive power is ΣPPR. A sum of the NPR of all lens elements with negative refractive powers is ΣNPR. It is beneficial to control the total refractive power and the total length of the optical image capturing system when following conditions are satisfied: 0.5≤ΣPPR/|ΣNPR|≤15. Preferably, the following relation may be satisfied: 1≤ΣPPR/|ΣNPR|≤3.0.

The optical image capturing system may further include an image sensing device which is disposed on an image plane. Half of a diagonal of an effective detection field of the image sensing device (imaging height or the maximum image height of the optical image capturing system) is HOI. A distance on the optical axis from the object-side surface of the first lens element to the image plane is HOS. The following relations are satisfied: HOS/HOI≤10 and 0.5≤HOS/f≤10. Preferably, the following relations may be satisfied: 1≤HOS/HOI≤5 and 1≤HOS/f≤7. Hereby, the miniaturization of the optical image capturing system can be maintained effectively, so as to be carried by lightweight portable electronic devices.

In addition, in the optical image capturing system of the disclosure, according to different requirements, at least one aperture stop may be arranged for reducing stray light and improving the imaging quality.

In the optical image capturing system of the disclosure, the aperture stop may be a front or middle aperture. The front aperture is the aperture stop between a photographed object and the first lens element. The middle aperture is the aperture stop between the first lens element and the image plane. If the aperture stop is the front aperture, a longer distance between the exit pupil and the image plane of the optical image capturing system can be formed, such that more optical elements can be disposed in the optical image capturing system and the efficiency of receiving images of the image sensing device can be raised. If the aperture stop is the middle aperture, the view angle of the optical image capturing system can be expended, such that the optical image capturing system has the same advantage that is owned by wide angle cameras. A distance from the aperture stop to the image plane is InS. The following relation is satisfied: 0.2≤InS/HOS≤1.1. Hereby, the miniaturization of the optical image capturing system can be maintained while the feature of the wild-angle lens element can be achieved.

In the optical image capturing system of the disclosure, a distance from the object-side surface of the first lens element to the image-side surface of the sixth lens element is InTL. A total central thickness of all lens elements with refractive power on the optical axis is ΣTP. The following relation is satisfied: 0.1≤ΣTP/InTL≤0.9. Hereby, contrast ratio for the image formation in the optical image capturing system and defect-free rate for manufacturing the lens element can be given consideration simultaneously, and a proper back focal length is provided to dispose other optical components in the optical image capturing system.

A curvature radius of the object-side surface of the first lens element is R1. A curvature radius of the image-side surface of the first lens element is R2. The following relation is satisfied: 0.001≤|R1/R2|≤20. Hereby, the first lens element may have proper strength of the positive refractive power, so as to avoid the longitudinal spherical aberration to increase too fast. Preferably, the following relation may be satisfied: 0.01≤|R1/R2|≤10.

A curvature radius of the object-side surface of the sixth lens element is R11. A curvature radius of the image-side surface of the sixth lens element is R12. The following relation is satisfied: −7<(R11−R12)/(R11+R12)<50. Hereby, the astigmatism generated by the optical image capturing system can be corrected beneficially.

A distance between the first lens element and the second lens element on the optical axis is IN12. The following relation is satisfied: IN12/f≤3.0. Hereby, the chromatic aberration of the lens elements can be improved, such that the performance can be increased.

A distance between the fifth lens element and the sixth lens element on the optical axis is IN56. The following relation is satisfied: IN56/f≤0.8. Hereby, the function of the lens elements can be improved.

Central thicknesses of the first lens element and the second lens element on the optical axis are TP1 and TP2, respectively. The following relation is satisfied: 0.1≤(TP1+IN12)/TP2≤10. Hereby, the sensitivity produced by the optical image capturing system can be controlled, and the performance can be increased.

Central thicknesses of the fifth lens element and the sixth lens element on the optical axis are TP5 and TP6, respectively, and a distance between the aforementioned two lens elements on the optical axis is IN56. The following relation is satisfied: 0.1≤(TP6+IN56)/TP5≤10. Hereby, the sensitivity produced by the optical image capturing system can be controlled and the total height of the optical image capturing system can be reduced.

Central thicknesses of the second lens element, the third lens element and the fourth lens element on the optical axis are TP2, TP3 and TP4, respectively. A distance between the second and the third lens elements on the optical axis is IN23, and a distance between the third and the fourth lens elements on the optical axis is IN45. A distance between an object-side surface of the first lens element and an image-side surface of sixth lens element is InTL. The following relation is satisfied: 0.1≤TP4/(IN34+TP4+IN45)<1. Hereby, the aberration generated by the process of moving the incident light can be adjusted slightly layer upon layer, and the total height of the optical image capturing system can be reduced.

In the optical image capturing system of the first embodiment, a distance perpendicular to the optical axis between a critical point C61 on an object-side surface of the sixth lens element and the optical axis is HVT61. A distance perpendicular to the optical axis between a critical point C62 on an image-side surface of the sixth lens element and the optical axis is HVT62. A distance in parallel with the optical axis from an axial point on the object-side surface of the sixth lens element to the critical point C61 is SGC61. A distance in parallel with the optical axis from an axial point on the image-side surface of the sixth lens element to the critical point C62 is SGC62. The following relations may be satisfied: 0 mm≤HVT61≤3 mm, 0 mm<HVT62≤6 mm, 0≤HVT61/HVT62, 0 mm≤|SGC61|≤0.5 mm; 0 mm<|SGC62|≤2 mm, and 0<|SGC62|/(|SGC62|+TP6)≤0.9. Hereby, the aberration of the off-axis view field can be corrected effectively.

The following relation is satisfied for the optical image capturing system of the disclosure: 0.2≤HVT62/HOI≤0.9. Preferably, the following relation may be satisfied: 0.3≤HVT62/HOI≤0.8. Hereby, the aberration of surrounding view field for the optical image capturing system can be corrected beneficially.

The following relation is satisfied for the optical image capturing system of the disclosure: 0≤HVT62/HOS≤0.5. Preferably, the following relation may be satisfied: 0.2≤HVT62/HOS≤0.45. Hereby, the aberration of surrounding view field for the optical image capturing system can be corrected beneficially.

In the optical image capturing system of the disclosure, a distance in parallel with an optical axis from an inflection point on the object-side surface of the sixth lens element which is nearest to the optical axis to an axial point on the object-side surface of the sixth lens element is denoted by SGI611. A distance in parallel with an optical axis from an inflection point on the image-side surface of the sixth lens element which is nearest to the optical axis to an axial point on the image-side surface of the sixth lens element is denoted by SGI621. The following relations are satisfied: 0<SGI611/(SGI611+TP6)≤0.9 and 0<SGI621/(SGI621+TP6)≤0.9. Preferably, the following relations may be satisfied: 0.1≤SGI611/(SGI611+TP6)≤0.6 and 0.1≤SGI621/(SGI621+TP6)≤0.6.

A distance in parallel with the optical axis from the inflection point on the object-side surface of the sixth lens element which is the second nearest to the optical axis to an axial point on the object-side surface of the sixth lens element is denoted by SGI612. A distance in parallel with an optical axis from an inflection point on the image-side surface of the sixth lens element which is the second nearest to the optical axis to an axial point on the image-side surface of the sixth lens element is denoted by SGI622. The following relations are satisfied: 0<SGI612/(SGI612+TP6)≤0.9 and 0<SGI622/(SGI622+TP6)≤0.9. Preferably, the following relations may be satisfied: 0.1≤SGI612/(SGI612+TP6)≤0.6 and 0.1≤SGI622/(SGI622+TP6)≤0.6.

A distance perpendicular to the optical axis between the inflection point on the object-side surface of the sixth lens element which is the nearest to the optical axis and the optical axis is denoted by HIF611. A distance perpendicular to the optical axis between an axial point on the image-side surface of the sixth lens element and an inflection point on the image-side surface of the sixth lens element which is the nearest to the optical axis is denoted by HIF621. The following relations are satisfied: 0.001 mm≤|HIF611|≤5 mm and 0.001 mm≤|HIF621|≤5 mm. Preferably, the following relations may be satisfied: 0.1 mm≤|HIF611|≤3.5 mm and 1.5 mm≤|HIF621|≤3.5 mm.

A distance perpendicular to the optical axis between the inflection point on the object-side surface of the sixth lens element which is the second nearest to the optical axis and the optical axis is denoted by HIF612. A distance perpendicular to the optical axis between an axial point on the image-side surface of the sixth lens element and an inflection point on the image-side surface of the sixth lens element which is the second nearest to the optical axis is denoted by HIF622. The following relations are satisfied: 0.001 mm≤|HIF612|≤5 mm and 0.001 mm≤|HIF622|≤5 mm. Preferably, the following relations may be satisfied: 0.1 mm≤|HIF622|≤3.5 mm and 0.1 mm≤|HIF612|≤3.5 mm.

A distance perpendicular to the optical axis between the inflection point on the object-side surface of the sixth lens element which is the third nearest to the optical axis and the optical axis is denoted by HIF613. A distance perpendicular to the optical axis between an axial point on the image-side surface of the sixth lens element and an inflection point on the image-side surface of the sixth lens element which is the third nearest to the optical axis is denoted by HIF623. The following relations are satisfied: 0.001 mm≤|HIF613|≤5 mm and 0.001 mm≤|HIF623|≤5 mm. Preferably, the following relations may be satisfied: 0.1 mm≤|HIF623|≤3.5 mm and 0.1 mm≤|HIF613|≤3.5 mm.

A distance perpendicular to the optical axis between the inflection point on the object-side surface of the sixth lens element which is the fourth nearest to the optical axis and the optical axis is denoted by HIF614. A distance perpendicular to the optical axis between an axial point on the image-side surface of the sixth lens element and an inflection point on the image-side surface of the sixth lens element which is the fourth nearest to the optical axis is denoted by HIF624. The following relations are satisfied: 0.001 mm≤|HIF614|≤5 mm and 0.001 mm≤|HIF624|≤5 mm. Preferably, the following relations may be satisfied: 0.1 mm≤|HIF624|≤3.5 mm and 0.1 mm≤|HIF614|≤3.5 mm.

In one embodiment of the optical image capturing system of the present disclosure, the chromatic aberration of the optical image capturing system can be corrected by alternatively arranging the lens elements with large Abbe number and small Abbe number.

The above Aspheric formula is:

$$z=ch^2/[1+[1-(k+1)c^2h^2]^{0.5}]+A4h^4+A6h^6+A8h^8+A10h^{10}+A12h^{12}+A14h^{14}+A16h^{16}+A18h^{18}+A20h^{20}+ \quad (1),$$

where z is a position value of the position along the optical axis and at the height h which reference to the surface apex; k is the conic coefficient, c is the reciprocal of curvature radius, and A4, A6, A8, A10, A12, A14, A16, A18, and A20 are high order aspheric coefficients.

The optical image capturing system provided by the disclosure, the lens elements may be made of glass or plastic material. If plastic material is adopted to produce the lens elements, the cost of manufacturing will be lowered effectively. If lens elements are made of glass, the heat effect can be controlled and the designed space arranged for the refractive power of the optical image capturing system can be increased. Besides, the object-side surface and the image-side surface of the first through sixth lens elements may be aspheric, so as to obtain more control variables. Comparing with the usage of traditional lens element made by glass, the number of lens elements used can be reduced and the aberration can be eliminated. Thus, the total height of the optical image capturing system can be reduced effectively.

In addition, in the optical image capturing system provided by the disclosure, if the lens element has a convex surface, the surface of the lens element adjacent to the optical axis is convex in principle. If the lens element has a concave surface, the surface of the lens element adjacent to the optical axis is concave in principle.

The optical image capturing system of the disclosure can be adapted to the optical image capturing system with automatic focus if required. With the features of a good aberration correction and a high quality of image formation, the optical image capturing system can be used in various application fields.

The optical image capturing system of the disclosure can include a driving module according to the actual requirements. The driving module may be coupled with the lens elements to enable the lens elements producing displacement. The driving module may be the voice coil motor (VCM) which is applied to move the lens to focus, or may be the optical image stabilization (OIS) which is applied to reduce the distortion frequency owing to the vibration of the lens while shooting.

At least one of the first, second, third, fourth, fifth and sixth lens elements of the optical image capturing system of the disclosure may further be designed as a light filtration element with a wavelength of less than 500 nm according to the actual requirement. The light filter element may be made by coating at least one surface of the specific lens element characterized of the filter function, and alternatively, may be made by the lens element per se made of the material which is capable of filtering short wavelength.

According to the above embodiments, the specific embodiments with figures are presented in detail as below.

The First Embodiment (Embodiment 1)

Figure 1B:
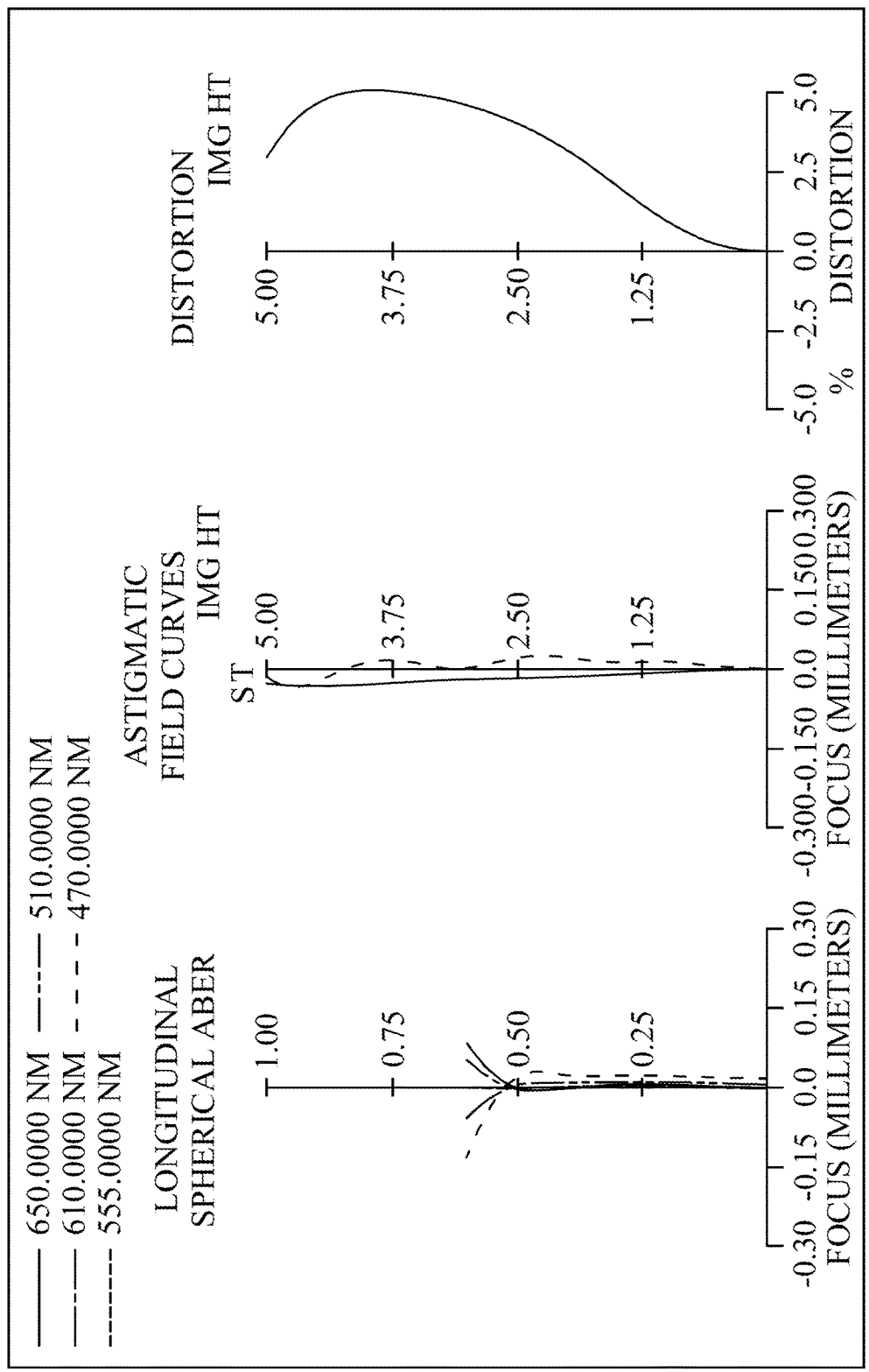
FIG. 1B is longitudinal spherical aberration curves, astigmatic field curves, and an optical distortion grid of the optical image capturing system in the order from left to right according to the first embodiment of the present application.
Figure 1C:
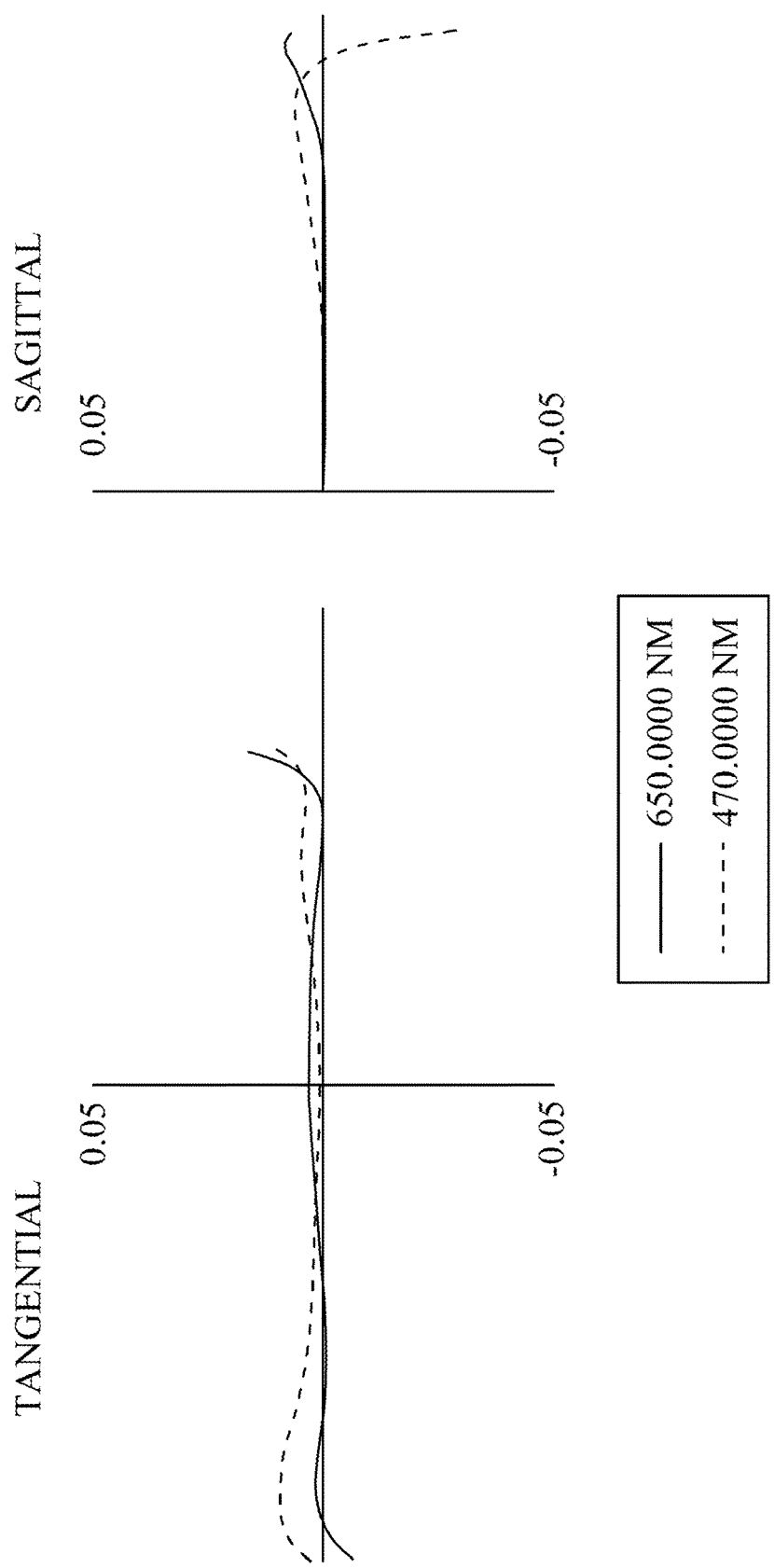
FIG. 1C is a lateral aberration diagram of tangential fan, sagittal fan, the longest operation wavelength and the shortest operation wavelength passing through an edge of the entrance pupil and incident on the image plane by 0.7 HOI according to the first embodiment of the present application.

Please refer to FIG. 1A and FIG. 1B. FIG. 1A is a schematic view of the optical image capturing system according to the first embodiment of the present application, FIG. 1B is longitudinal spherical aberration curves, astigmatic field curves, and an optical distortion curve of the optical image capturing system in the order from left to right according to the first embodiment of the present application, and FIG. 1C is a lateral aberration diagram of tangential fan, sagittal fan, the longest operation wavelength and the shortest operation wavelength passing through an edge of the entrance pupil and incident on the image plane by 0.7 HOI according to the first embodiment of the present application. As shown in FIG. 1A, in order from an object side to an image side, the optical image capturing system includes a first lens element 110, an aperture stop 100, a second lens element 120, a third lens element 130, a fourth lens element 140, a fifth lens element 150, a sixth lens element 160, an IR-bandstop filter 180, an image plane 190, and an image sensing device 192.

The first lens element 110 has negative refractive power and it is made of plastic material. The first lens element 110 has a concave object-side surface 112 and a concave image-side surface 114, both of the object-side surface 112 and the image-side surface 114 are aspheric, and the object-side surface 112 has two inflection points. The length of outline curve of the maximum effective half diameter position of the object-side surface of the first lens element is denoted as ARS11. The length of outline curve of the maximum effective half diameter position of the image-side surface of the first lens element is denoted as ARS12. The length of outline curve of a half of an entrance pupil diameter (HEP) of the object-side surface of the first lens element is denoted as ARE11, and the length of outline curve of the half of the entrance pupil diameter (HEP) of the image-side surface of the first lens element is denoted as ARE12. The thickness of the first lens element on the optical axis is TP1.

A distance in parallel with an optical axis from an inflection point on the object-side surface of the first lens element which is nearest to the optical axis to an axial point on the object-side surface of the first lens element is denoted by SGI111. A distance in parallel with an optical axis from an inflection point on the image-side surface of the first lens element which is nearest to the optical axis to an axial point on the image-side surface of the first lens element is denoted by SGI121. The following relations are satisfied: SGI111=−0.0031 mm and |SGI111|/(|SGI111|+TP1)=0.0016.

A distance in parallel with an optical axis from an inflection point on the object-side surface of the first lens element which is the second nearest to the optical axis to an axial point on the object-side surface of the first lens element is denoted by SGI112. A distance in parallel with an optical axis from an inflection point on the image-side surface of the first lens element which is the second nearest to the optical axis to an axial point on the image-side surface of the first lens element is denoted by SGI122. The following relations are satisfied: SGI112=1.3178 mm and |SGI112|/(|SGI112|+TP1)=0.4052.

A distance perpendicular to the optical axis from the inflection point on the object-side surface of the first lens element which is nearest to the optical axis to an axial point on the object-side surface of the first lens element is denoted by HIF111. A distance perpendicular to the optical axis from the inflection point on the image-side surface of the first lens element which is nearest to the optical axis to an axial point on the image-side surface of the first lens element is denoted by HIF121. The following relations are satisfied: HIF111=0.5557 mm and HIF111/HOI=0.1111.

A distance perpendicular to the optical axis from the inflection point on the object-side surface of the first lens element which is the second nearest to the optical axis to an axial point on the object-side surface of the first lens element is denoted by HIF112. A distance perpendicular to the optical axis from the inflection point on the image-side surface of the first lens element which is the second nearest to the optical axis to an axial point on the image-side surface of the first lens element is denoted by HIF121. The following relations are satisfied: HIF112=5.3732 mm and HIF112/HOI=1.0746.

The second lens element 120 has positive refractive power and it is made of plastic material. The second lens element 120 has a convex object-side surface 122 and a convex image-side surface 124, and both of the object-side surface 122 and the image-side surface 124 are aspheric. The object-side surface 122 has an inflection point. The length of outline curve of the maximum effective half diameter position of the object-side surface of the second lens element is denoted as ARS21, and the length of outline curve of the maximum effective half diameter position of the image-side surface of the second lens element is denoted as ARS22. The length of outline curve of a half of an entrance pupil diameter (HEP) of the object-side surface of the second lens element is denoted as ARE21, and the length of outline curve of the half of the entrance pupil diameter (HEP) of the image-side surface of the second lens element is denoted as ARE22. The thickness of the second lens element on the optical axis is TP2.

A distance in parallel with an optical axis from an inflection point on the object-side surface of the second lens element which is nearest to the optical axis to an axial point on the object-side surface of the second lens element is denoted by SGI211. A distance in parallel with an optical axis from an inflection point on the image-side surface of the second lens element which is nearest to the optical axis to an axial point on the image-side surface of the second lens element is denoted by SGI221. The following relations are satisfied: SGI211=0.1069 mm, |SGI211|/(|SGI211|+TP2)=0.0412, SGI221=0 mm and |SGI221 |/(|SGI221|+TP2)=0.

A distance perpendicular to the optical axis from the inflection point on the object-side surface of the second lens element which is nearest to the optical axis to an axial point on the object-side surface of the second lens element is denoted by HIF211. A distance perpendicular to the optical axis from the inflection point on the image-side surface of the second lens element which is nearest to the optical axis to an axial point on the image-side surface of the second lens element is denoted by HIF221. The following relations are satisfied: HIF211=1.1264 mm, HIF211/HOI=0.2253, HIF221=0 mm and HIF221/HOI=0.

The third lens element 130 has negative refractive power and it is made of plastic material. The third lens element 130 has a concave object-side surface 132 and a convex image-side surface 134, and both of the object-side surface 132 and the image-side surface 134 are aspheric. The object-side surface 132 and the image-side surface 134 both have an inflection point. The length of outline curve of the maximum effective half diameter position of the object-side surface of the third lens element is denoted as ARS31, and the length of outline curve of the maximum effective half diameter position of the image-side surface of the third lens element is denoted as ARS32. The length of outline curve of a half of an entrance pupil diameter (HEP) of the object-side surface of the third lens element is denoted as ARE31, and the length of outline curve of the half of the entrance pupil diameter (HEP) of the image-side surface of the third lens element is denoted as ARE32. The thickness of the third lens element on the optical axis is TP3.

A distance in parallel with an optical axis from an inflection point on the object-side surface of the third lens element which is nearest to the optical axis to an axial point on the object-side surface of the third lens element is denoted by SGI311. A distance in parallel with an optical axis from an inflection point on the image-side surface of the third lens element which is nearest to the optical axis to an axial point on the image-side surface of the third lens element is denoted by SGI321. The following relations are satisfied: SGI311=−0.3041 mm,|SGI311|/(|SGI311|+TP3)=0.4445, SGI321=−0.1172 mm and |SGI321|/(|SGI321|+TP3)=0.2357.

A distance perpendicular to the optical axis between the inflection point on the object-side surface of the third lens element which is nearest to the optical axis and the optical axis is denoted by HIF311. A distance perpendicular to the optical axis from the inflection point on the image-side surface of the third lens element which is nearest to the optical axis to an axial point on the image-side surface of the third lens element is denoted by HIF321. The following relations are satisfied: HIF311=1.5907 mm, HIF311/HOI=0.3181, HIF321=1.3380 mm and HIF321/HOI=0.2676.

The fourth lens element 140 has positive refractive power and it is made of plastic material. The fourth lens element 140 has a convex object-side surface 142 and a concave image-side surface 144, both of the object-side surface 142 and the image-side surface 144 are aspheric, the object-side surface 142 has two inflection points, and the image-side surface 144 has an inflection point. The length of outline curve of the maximum effective half diameter position of the object-side surface of the fourth lens element is denoted as ARS41, and the length of outline curve of the maximum effective half diameter position of the image-side surface of the fourth lens element is denoted as ARS42. The length of outline curve of a half of an entrance pupil diameter (HEP) of the object-side surface of the fourth lens element is denoted as ARE41, and the length of outline curve of the half of the entrance pupil diameter (HEP) of the image-side surface of the fourth lens element is denoted as ARE42. The thickness of the fourth lens element on the optical axis is TP4.

A distance in parallel with an optical axis from an inflection point on the object-side surface of the fourth lens element which is nearest to the optical axis to an axial point on the object-side surface of the fourth lens element is denoted by SGI411. A distance in parallel with an optical axis from an inflection point on the image-side surface of the fourth lens element which is nearest to the optical axis to an axial point on the image-side surface of the fourth lens element is denoted by SGI421. The following relations are satisfied: SGI411=0.0070 mm, |SGI411|/(|SGI411|+TP4)=0.0056, SGI421=−0.0006 mm and |SGI421|/(|SGI421|+TP4)=0.0005.

A distance in parallel with an optical axis from an inflection point on the object-side surface of the fourth lens element which is the second nearest to the optical axis to an axial point on the object-side surface of the fourth lens element is denoted by SGI412. A distance in parallel with an optical axis from an inflection point on the image-side surface of the fourth lens element which is the second nearest to the optical axis to an axial point on the image-side surface of the fourth lens element is denoted by SGI422. The following relations are satisfied: SGI412=−0.2078 mm and |SGI412|/(|SGI412|+TP4)=0.1439.

A distance perpendicular to the optical axis between the inflection point on the object-side surface of the fourth lens element which is nearest to the optical axis and the optical axis is denoted by HIF411. A distance perpendicular to the optical axis between the inflection point on the image-side surface of the fourth lens element which is nearest to the optical axis and the optical axis is denoted by HIF421. The following relations are satisfied: HIF411=0.4706 mm, HIF411/HOI=0.0941, HIF421=0.1721 mm and HIF421/HOI=0.0344.

A distance perpendicular to the optical axis between the inflection point on the object-side surface of the fourth lens element which is the second nearest to the optical axis and the optical axis is denoted by HIF412. A distance perpendicular to the optical axis between the inflection point on the image-side surface of the fourth lens element which is the second nearest to the optical axis and the optical axis is denoted by HIF422. The following relations are satisfied: HIF412=2.0421 mm and HIF412/HOI=0.4084.

The fifth lens element 150 has positive refractive power and it is made of plastic material. The fifth lens element 150 has a convex object-side surface 152 and a convex image-side surface 154, and both of the object-side surface 152 and the image-side surface 154 are aspheric. The object-side surface 152 has two inflection points and the image-side surface 154 has an inflection point. The length of outline curve of the maximum effective half diameter position of the object-side surface of the fifth lens element is denoted as ARS51, and the length of outline curve of the maximum effective half diameter position of the image-side surface of the fifth lens element is denoted as ARS52. The length of outline curve of a half of an entrance pupil diameter (HEP) of the object-side surface of the fifth lens element is denoted as ARE51, and the length of outline curve of the half of the entrance pupil diameter (HEP) of the image-side surface of the fifth lens element is denoted as ARE52. The thickness of the fifth lens element on the optical axis is TP5.

A distance in parallel with an optical axis from an inflection point on the object-side surface of the fifth lens element which is nearest to the optical axis to an axial point on the object-side surface of the fifth lens element is denoted by SGI511. A distance in parallel with an optical axis from an inflection point on the image-side surface of the fifth lens element which is nearest to the optical axis to an axial point on the image-side surface of the fifth lens element is denoted by SGI521. The following relations are satisfied: SGI511=0.00364 mm,|SGI511|/(|SGI511|+TP5)=0.00338, SGI521=−0.63365 mm and |SGI521|/(|SGI521|+TP5)=0.37154.

A distance in parallel with an optical axis from an inflection point on the object-side surface of the fifth lens element which is the second nearest to the optical axis to an axial point on the object-side surface of the fifth lens element is denoted by SGI512. A distance in parallel with an optical axis from an inflection point on the image-side surface of the fifth lens element which is the second nearest to the optical axis to an axial point on the image-side surface of the fifth lens element is denoted by SGI522. The following relations are satisfied: SGI512=−0.32032 mm and |SGI512|/(|SGI512|+TP5)=0.23009.

A distance in parallel with an optical axis from an inflection point on the object-side surface of the fifth lens element which is the third nearest to the optical axis to an axial point on the object-side surface of the fifth lens element is denoted by SGI513. A distance in parallel with an optical axis from an inflection point on the image-side surface of the fifth lens element which is the third nearest to the optical axis to an axial point on the image-side surface of the fifth lens element is denoted by SGI523. The following relations are satisfied: SGI513=0 mm, |SGI513|/(|SGI513|+TP5)=0, SGI523=0 mm and |SGI523|/(|SGI523|+TP5)=0.

A distance in parallel with an optical axis from an inflection point on the object-side surface of the fifth lens element which is the fourth nearest to the optical axis to an axial point on the object-side surface of the fifth lens element is denoted by SGI514. A distance in parallel with an optical axis from an inflection point on the image-side surface of the fifth lens element which is the fourth nearest to the optical axis to an axial point on the image-side surface of the fifth lens element is denoted by SGI524. The following relations are satisfied: SGI514=0 mm, |SGI514|/(|SGI514|+TP5)=0, SGI524=0 mm and |SGI524|/(|SGI524|+TP5)=0.

A distance perpendicular to the optical axis between the inflection point on the object-side surface of the fifth lens element which is nearest to the optical axis and the optical axis is denoted by HIF511. A distance perpendicular to the optical axis between the inflection point on the image-side surface of the fifth lens element which is nearest to the optical axis and the optical axis is denoted by HIF521. The following relations are satisfied: HIF511=0.28212 mm, HIF511/HOI=0.05642, HIF521=2.13850 mm and HIF521/HOI=0.42770.

A distance perpendicular to the optical axis between the inflection point on the object-side surface of the fifth lens element which is the second nearest to the optical axis and the optical axis is denoted by HIF512. A distance perpendicular to the optical axis between the inflection point on the image-side surface of the fifth lens element which is the second nearest to the optical axis and the optical axis is denoted by HIF522. The following relations are satisfied: HIF512=2.51384 mm and HIF512/HOI=0.50277.

A distance perpendicular to the optical axis between the inflection point on the object-side surface of the fifth lens element which is the third nearest to the optical axis and the optical axis is denoted by HIF513. A distance perpendicular to the optical axis between the inflection point on the image-side surface of the fifth lens element which is the third nearest to the optical axis and the optical axis is denoted by HIF523. The following relations are satisfied: HIF513=0 mm, HIF513/HOI=0, HIF523=0 mm and HIF523/HOI=0.

A distance perpendicular to the optical axis between the inflection point on the object-side surface of the fifth lens element which is the fourth nearest to the optical axis and the optical axis is denoted by HIF514. A distance perpendicular to the optical axis between the inflection point on the image-side surface of the fifth lens element which is the fourth nearest to the optical axis and the optical axis is denoted by HIF524. The following relations are satisfied: HIF514=0 mm, HIF514/HOI=0, HIF524=0 mm and HIF524/HOI=0.

The sixth lens element 160 has negative refractive power and it is made of plastic material. The sixth lens element 160 has a concave object-side surface 162 and a concave image-side surface 164, and the object-side surface 162 has two inflection points and the image-side surface 164 has an inflection point. Hereby, the angle of incident of each view field on the sixth lens element can be effectively adjusted and the spherical aberration can thus be improved. The length of outline curve of the maximum effective half diameter position of the object-side surface of the sixth lens element is denoted as ARS61, and the length of outline curve of the maximum effective half diameter position of the image-side surface of the sixth lens element is denoted as ARS62. The length of outline curve of a half of an entrance pupil diameter (HEP) of the object-side surface of the sixth lens element is denoted as ARE61, and the length of outline curve of the half of the entrance pupil diameter (HEP) of the image-side surface of the sixth lens element is denoted as ARE62. The thickness of the sixth lens element on the optical axis is TP6.

A distance in parallel with an optical axis from an inflection point on the object-side surface of the sixth lens element which is nearest to the optical axis to an axial point on the object-side surface of the sixth lens element is denoted by SGI611. A distance in parallel with an optical axis from an inflection point on the image-side surface of the sixth lens element which is nearest to the optical axis to an axial point on the image-side surface of the sixth lens element is denoted by SGI621. The following relations are satisfied: SGI611=−0.38558 mm, |SGI611|/(|SGI611|+TP6)=0.27212, SGI621=0.12386 mm and |SGI621|/(|SGI621|+TP6)=0.10722.

A distance in parallel with an optical axis from an inflection point on the object-side surface of the sixth lens element which is the second nearest to the optical axis to an axial point on the object-side surface of the sixth lens element is denoted by SGI612. A distance in parallel with an optical axis from an inflection point on the image-side surface of the sixth lens element which is the second nearest to the optical axis to an axial point on the image-side surface of the sixth lens element is denoted by SGI622. The following relations are satisfied: SGI612=−0.47400 mm, |SGI612|/(|SGI612|+TP6)=0.31488, SGI622=0 mm and |SGI622|/(|SGI622|+TP6)=0.

A distance perpendicular to the optical axis between the inflection point on the object-side surface of the sixth lens element which is nearest to the optical axis and the optical axis is denoted by HIF611. A distance perpendicular to the optical axis between the inflection point on the image-side surface of the sixth lens element which is nearest to the optical axis and the optical axis is denoted by HIF621. The following relations are satisfied: HIF611=2.24283 mm, HIF611/HOI=0.44857, HIF621=1.07376 mm and HIF621/HOI=0.21475.

A distance perpendicular to the optical axis between the inflection point on the object-side surface of the sixth lens element which is the second nearest to the optical axis and the optical axis is denoted by HIF612. A distance perpendicular to the optical axis between the inflection point on the image-side surface of the sixth lens element which is the second nearest to the optical axis and the optical axis is denoted by HIF622. The following relations are satisfied: HIF612=2.48895 mm and HIF612/HOI=0.49779.

A distance perpendicular to the optical axis between the inflection point on the object-side surface of the sixth lens element which is the third nearest to the optical axis and the optical axis is denoted by HIF613. A distance perpendicular to the optical axis between the inflection point on the image-side surface of the sixth lens element which is the third nearest to the optical axis and the optical axis is denoted by HIF623. The following relations are satisfied: HIF613=0 mm, HIF613/HOI=0, HIF623=0 mm and HIF623/HOI=0.

A distance perpendicular to the optical axis between the inflection point on the object-side surface of the sixth lens element which is the fourth nearest to the optical axis and the optical axis is denoted by HIF614. A distance perpendicular to the optical axis between the inflection point on the image-side surface of the sixth lens element which is the fourth nearest to the optical axis and the optical axis is denoted by HIF624. The following relations are satisfied: HIF614=0 mm, HIF614/HOI=0, HIF624=0 mm and HIF624/HOI=0.

The IR-bandstop filter 180 is made of glass material without affecting the focal length of the optical image capturing system and it is disposed between the sixth lens element 160 and the image plane 190.

In the optical image capturing system of the first embodiment, a focal length of the optical image capturing system is f, an entrance pupil diameter of the optical image capturing system is HEP, and half of a maximum view angle of the optical image capturing system is HAF. The detailed parameters are shown as below: f=4.075 mm, f/HEP=1.4, HAF=50.001 and tan(HAF)=1.1918.

In the optical image capturing system of the first embodiment, a focal length of the first lens element 110 is f1 and a focal length of the sixth lens element 160 is f6. The following relations are satisfied: f1=−7.828 mm, |f/f1|=0.52060, f6=−4.886 and |f1|>|f6|.

In the optical image capturing system of the first embodiment, focal lengths of the second lens element 120 to the fifth lens element 150 are f2, f3, f4 and f5, respectively. The following relations are satisfied: |f2|+|f3|+|f4|+|f5|=95.50815 mm, |f1|+|f6|=12.71352 mm and |f2|+|f3|+|f4|+|f5|>|f1|+|f6|.

A ratio of the focal length f of the optical image capturing system to a focal length fp of each of lens elements with positive refractive power is PPR. A ratio of the focal length f of the optical image capturing system to a focal length fn of each of lens elements with negative refractive power is NPR. In the optical image capturing system of the first embodiment, a sum of the PPR of all lens elements with positive refractive power is ΣPPR=f/f1+f/f3+f/f5=1.63290. A sum of all NPR of all lens elements with negative refractive powers is ΣNPR=|f/f1|+|f/f3|+|f/f6|=1.51305, ΣPPR/|ΣNPR|=1.07921. The following relations are also satisfied: f/f2=0.69101, |f/f3|=0.15834, |f/f4|=0.06883, |f/f5|=0.87305 and |f/f6|=0.83412.

In the optical image capturing system of the first embodiment, a distance from the object-side surface 112 of the first lens element to the image-side surface 164 of the sixth lens element is InTL. A distance from the object-side surface 112 of the first lens element to the image plane 190 is HOS. A distance from an aperture 100 to an image plane 190 is InS. Half of a diagonal length of an effective detection field of the image sensing device 192 is HOI. A distance from the image-side surface 164 of the sixth lens element to the image plane 190 is BFL. The following relations are satisfied: InTL+BFL=HOS, HOS=19.54120 mm, HOI=5.0 mm, HOS/HOI=3.90824, HOS/f=4.7952, InS=11.685 mm and InS/HOS=0.59794.

In the optical image capturing system of the first embodiment, a total central thickness of all lens elements with refractive power on the optical axis is ΣTP. The following relations are satisfied: ΣTP=8.13899 mm and ΣTP/InTL=0.52477. Hereby, contrast ratio for the image formation in the optical image capturing system and defect-free rate for manufacturing the lens element can be given consideration simultaneously, and a proper back focal length is provided to dispose other optical components in the optical image capturing system.

In the optical image capturing system of the first embodiment a curvature radius of the object-side surface 112 of the first lens element is R1. A curvature radius of the image-side surface 114 of the first lens element is R2. The following relation is satisfied: |R1/R2|=8.99987. Hereby, the first lens element may have proper strength of the positive refractive power, so as to avoid the longitudinal spherical aberration to increase too fast.

In the optical image capturing system of the first embodiment, a curvature radius of the object-side surface 162 of the sixth lens element is R11. A curvature radius of the image-side surface 164 of the sixth lens element is R12. The following relation is satisfied: (R11−R12)/(R11+R12)=1.27780. Hereby, the astigmatism generated by the optical image capturing system can be corrected beneficially.

In the optical image capturing system of the first embodiment, a sum of focal lengths of all lens elements with positive refractive power is ΣPP. The following relations are satisfied: ΣPP=f2+f4+f5=69.770 mm and f5/(f2+f4+f5)=0.067. Hereby, it is favorable for allocating the positive refractive power of the first lens element 110 to other positive lens elements and the significant aberrations generated in the process of moving the incident light can be suppressed.

In the optical image capturing system of the first embodiment, a sum of focal lengths of all lens elements with negative refractive power is ΣNP. The following relations are satisfied: ΣNP=f1+f3+f6=−38.451 mm and f6/(f1+f3+f6)=0.127. Hereby, it is favorable for allocating the negative refractive power of the sixth lens element 160 to other negative lens elements and the significant aberrations generated in the process of moving the incident light can be suppressed.

In the optical image capturing system of the first embodiment, a distance between the first lens element 110 and the second lens element 120 on the optical axis is IN12. The following relations are satisfied: IN12=6.418 mm and IN12/f=1.57491. Hereby, the chromatic aberration of the lens elements can be improved, such that the performance can be increased.

In the optical image capturing system of the first embodiment, a distance between the fifth lens element 150 and the sixth lens element 160 on the optical axis is IN56. The following relations are satisfied: IN56=0.025 mm and IN56/ f=0.00613. Hereby, the chromatic aberration of the lens elements can be improved, such that the performance can be increased.

In the optical image capturing system of the first embodiment, central thicknesses of the first lens element 110 and the second lens element 120 on the optical axis are TP1 and TP2, respectively. The following relations are satisfied: TP1=1.934 mm, TP2=2.486 mm and (TP1+IN12)/TP2=3.36005. Hereby, the sensitivity produced by the optical image capturing system can be controlled, and the performance can be increased.

In the optical image capturing system of the first embodiment, central thicknesses of the fifth lens element 150 and the sixth lens element 160 on the optical axis are TP5 and TP6, respectively, and a distance between the aforementioned two lens elements on the optical axis is IN56. The following relations are satisfied: TP5=1.072 mm, TP6=1.031 mm and (TP6+IN56)/TP5=0.98555. Hereby, the sensitivity produced by the optical image capturing system can be controlled and the total height of the optical image capturing system can be reduced.

In the optical image capturing system of the first embodiment, a distance between the third lens element 130 and the fourth lens element 140 on the optical axis is IN34. A distance between the fourth lens element 140 and the fifth lens element 150 on the optical axis is IN45. The following relations are satisfied: IN34=0.401 mm, IN45=0.025 mm and TP4 /(IN34+TP4+IN45)=0.74376. Hereby, the aberration generated by the process of moving the incident light can be adjusted slightly layer upon layer, and the total height of the optical image capturing system can be reduced.

In the optical image capturing system of the first embodiment, a distance in parallel with an optical axis from a maximum effective half diameter position to an axial point on the object-side surface 152 of the fifth lens element is InRS51. A distance in parallel with an optical axis from a maximum effective half diameter position to an axial point on the image-side surface 154 of the fifth lens element is InRS52. A central thickness of the fifth lens element 150 is TP5. The following relations are satisfied: InRS51=−0.34789 mm, InRS52=−0.88185 mm, |InRS51|/TP5=0.32458 and |InRS52|/TP5=0.82276. Hereby, it is favorable for manufacturing and forming the lens element and for maintaining the minimization for the optical image capturing system.

In the optical image capturing system of the first embodiment, a distance perpendicular to the optical axis between a critical point C51 on the object-side surface 152 of the fifth lens element and the optical axis is HVT51. A distance perpendicular to the optical axis between a critical point C52 on the image-side surface 154 of the fifth lens element and the optical axis is HVT52. The following relations are satisfied: HVT51=0.515349 mm and HVT52=0 mm.

In the optical image capturing system of the first embodiment, a distance in parallel with an optical axis from a maximum effective half diameter position to an axial point on the object-side surface 162 of the sixth lens element is InRS61. A distance in parallel with an optical axis from a maximum effective half diameter position to an axial point on the image-side surface 164 of the sixth lens element is InRS62. A central thickness of the sixth lens element 160 is TP6. The following relations are satisfied: InRS61=−0.58390 mm. InRS62=0.41976 mm, |InRS61|/TP6=0.56616 and |InRS62|/TP6=0.40700. Hereby, it is favorable for manufacturing and forming the lens element and for maintaining the minimization for the optical image capturing system.

In the optical image capturing system of the first embodiment, a distance perpendicular to the optical axis between a critical point C61 on the object-side surface 162 of the sixth lens element and the optical axis is HVT61. A distance perpendicular to the optical axis between a critical point C62 on the image-side surface 164 of the sixth lens element and the optical axis is HVT62. The following relations are satisfied: HVT61=0 mm and HVT62=0 mm.

In the optical image capturing system of the first embodiment, the following relation is satisfied: HVT51/HOI=0.1031. Hereby, the aberration of surrounding view field can be corrected.

In the optical image capturing system of the first embodiment, the following relation is satisfied: HVT51/HOS=0.02634. Hereby, the aberration of surrounding view field can be corrected.

In the optical image capturing system of the first embodiment, the second lens element 120, the third lens element 130 and the sixth lens element 160 have negative refractive power. An Abbe number of the second lens element is NA2. An Abbe number of the third lens element is NA3. An Abbe number of the sixth lens element is NA6. The following relation is satisfied: NA6/NA2≤1. Hereby, the chromatic aberration of the optical image capturing system can be corrected.

In the optical image capturing system of the first embodiment, TV distortion and optical distortion for image formation in the optical image capturing system are TDT and ODT, respectively. The following relations are satisfied: |TDT|=2.124% and |ODT|=5.076%.

In the optical image capturing system of the first embodiment, a lateral aberration of the longest operation wavelength of a visible light of a positive direction tangential fan of the optical image capturing system passing through an edge of the aperture and incident on the image plane by 0.7 view field is denoted as PLTA, which is 0.006 mm. A lateral aberration of the shortest operation wavelength of a visible light of the positive direction tangential fan of the optical image capturing system passing through the edge of the aperture and incident on the image plane by 0.7 view field is denoted as PSTA, which is 0.005 mm. A lateral aberration of the longest operation wavelength of a visible light of a negative direction tangential fan of the optical image capturing system passing through the edge of the aperture and incident on the image plane by 0.7 view field is denoted as NLTA, which is 0.004 mm. A lateral aberration of the shortest operation wavelength of a visible light of a negative direction tangential fan of the optical image capturing system passing through the edge of the aperture and incident on the image plane by 0.7 view field is denoted as NSTA, which is −0.007 mm. A lateral aberration of the longest operation wavelength of a visible light of a sagittal fan of the optical image capturing system passing through the edge of the aperture and incident on the image plane by 0.7 view field is denoted as SLTA, which is −0.003 mm. A lateral aberration of the shortest operation wavelength of a visible light of the sagittal fan of the optical image capturing system passing through the edge of the aperture and incident on the image plane by 0.7 view field is denoted as SSTA, which is 0.008 mm.

Please refer to the following Table 1 and Table 2.

The detailed data of the optical image capturing system of the first embodiment is as shown in Table 1.

TABLE 1

Data of the optical image capturing system
f = 4.075 mm, f/HEP = 1.4, HAF = 50.000 deg

| Surface # | | Curvature Radius | Thickness | Material | Index | Abbe # | Focal length |
|---|---|---|---|---|---|---|---|
| 0 | Object | Plano | Plano | | | | |
| 1 | Lens 1 | −40.99625704 | 1.934 | Plastic | 1.515 | 56.55 | −7.828 |
| 2 | | 4.555209289 | 5.923 | | | | |
| 3 | Ape. stop | Plano | 0.495 | | | | |
| 4 | Lens 2 | 5.333427366 | 2.486 | Plastic | 1.544 | 55.96 | 5.897 |
| 5 | | −6.781659971 | 0.502 | | | | |
| 6 | Lens 3 | −5.697794287 | 0.380 | Plastic | 1.642 | 22.46 | −25.738 |
| 7 | | −8.883957518 | 0.401 | | | | |
| 8 | Lens 4 | 13.19225664 | 1.236 | Plastic | 1.544 | 55.96 | 59.205 |
| 9 | | 21.55681832 | 0.025 | | | | |
| 10 | Lens 5 | 8.987806345 | 1.072 | Plastic | 1.515 | 56.55 | 4.668 |
| 11 | | −3.158875374 | 0.025 | | | | |
| 12 | Lens 6 | −29.46491425 | 1.031 | Plastic | 1.642 | 22.46 | −4.886 |
| 13 | | 3.593484273 | 2.412 | | | | |
| 14 | IR-bandstop filter | Plano | 0.200 | | 1.517 | 64.13 | |
| 15 | | Plano | 1.420 | | | | |
| 16 | Image plane | Plano | | | | | |

Reference wavelength (d-line) = 555 nm; shield position: The clear aperture of the first surface is 5.800 mm. The clear aperture of the third surface is 1.570 mm. The clear aperture of the fifth surface is 1.950 mm.

As for the parameters of the aspheric surfaces of the first embodiment, reference is made to Table 2.

TABLE 2

Aspheric Coefficients

| | Surface # | | | | | | |
|---|---|---|---|---|---|---|---|
| | 1 | 2 | 4 | 5 | 6 | 7 | 8 |
| k | 4.310876E+01 | −4.707622E+00 | 2.616025E+00 | 2.445397E+00 | 5.645686E+00 | −2.117147E+01 | −5.287220E+00 |
| A4 | 7.054243E−03 | 1.714312E−02 | −8.377541E−03 | −1.789549E−02 | −3.379055E−03 | −1.370959E−02 | −2.937377E−02 |
| A6 | −5.233264E−04 | −1.502232E−04 | −1.838068E−03 | −3.657520E−03 | −1.225453E−03 | 6.250200E−03 | 2.743532E−03 |
| A8 | 3.077890E−05 | −1.359611E−04 | 1.233332E−03 | −1.131622E−03 | −5.979572E−03 | −5.854426E−03 | −2.457574E−03 |
| A10 | −1.260650E−06 | 2.680747E−05 | −2.390895E−03 | 1.390351E−03 | 4.556449E−03 | 4.049451E−03 | 1.874319E−03 |
| A12 | 3.319093E−08 | −2.017491E−06 | 1.998555E−03 | −4.152857E−04 | −1.177175E−03 | −1.314592E−03 | −6.013661E−04 |
| A14 | −5.051600E−10 | 6.604615E−08 | −9.734019E−04 | 5.487286E−05 | 1.370522E−04 | 2.143097E−04 | 8.792480E−05 |
| A16 | 3.380000E−12 | −1.301630E−09 | 2.478373E−04 | −2.919339E−06 | −5.974015E−06 | −1.399894E−05 | −4.770527E−06 |

| | Surface # | | | | |
|---|---|---|---|---|---|
| | 9 | 10 | 11 | 12 | 13 |
| k | 6.200000E+01 | −2.114008E+01 | −7.699904E+00 | −6.155476E+01 | −3.120467E−01 |
| A4 | −1.359965E−01 | −1.263831E−01 | −1.927804E−02 | −2.492467E−02 | −3.521844E−02 |
| A6 | 6.628518E−02 | 6.965399E−02 | 2.478376E−03 | −1.835360E−03 | 5.629654E−03 |
| A8 | −2.129167E−02 | −2.116027E−02 | 1.438785E−03 | 3.201343E−03 | −5.466925E−04 |
| A10 | 4.396344E−03 | 3.819371E−03 | −7.013749E−04 | −8.990757E−04 | 2.231154E−05 |
| A12 | −5.542899E−04 | −4.040283E−04 | 1.253214E−04 | 1.245343E−04 | 5.548990E−07 |
| A14 | 3.768879E−05 | 2.280473E−05 | −9.943196E−06 | −8.788363E−06 | −9.396920E−08 |
| A16 | −1.052467E−06 | −5.165452E−07 | 2.898397E−07 | 2.494302E−07 | 2.728360E−09 |

The numerical related to the length of outline curve is shown according to table 1 and table 2.

First embodiment (Reference wavelength = 555 nm)

| ARE | ½(HEP) | ARE value | ARE − ½(HEP) | 2(ARE/HEP) % | TP | ARE/TP (%) |
|---|---|---|---|---|---|---|
| 11 | 1.455 | 1.455 | −0.00033 | 99.98% | 1.934 | 75.23% |
| 12 | 1.455 | 1.495 | 0.03957 | 102.72% | 1.934 | 77.29% |
| 21 | 1.455 | 1.465 | 0.00940 | 100.65% | 2.486 | 58.93% |
| 22 | 1.455 | 1.495 | 0.03950 | 102.71% | 2.486 | 60.14% |
| 31 | 1.455 | 1.486 | 0.03045 | 102.09% | 0.380 | 391.02% |
| 32 | 1.455 | 1.464 | 0.00830 | 100.57% | 0.380 | 385.19% |
| 41 | 1.455 | 1.458 | 0.00237 | 100.16% | 1.236 | 117.95% |
| 42 | 1.455 | 1.484 | 0.02825 | 101.94% | 1.236 | 120.04% |

-continued

First embodiment (Reference wavelength = 555 nm)

| | | | | | | |
|---|---|---|---|---|---|---|
| 51 | 1.455 | 1.462 | 0.00672 | 100.46% | 1.072 | 136.42% |
| 52 | 1.455 | 1.499 | 0.04335 | 102.98% | 1.072 | 139.83% |
| 61 | 1.455 | 1.465 | 0.00964 | 100.66% | 1.031 | 142.06% |
| 62 | 1.455 | 1.469 | 0.01374 | 100.94% | 1.031 | 142.45% |

| ARS | EHD | ARS value | ARS − EHD | (ARS/EHD) % | TP | ARS/TP (%) |
|---|---|---|---|---|---|---|
| 11 | 5.800 | 6.141 | 0.341 | 105.88% | 1.934 | 317.51% |
| 12 | 3.299 | 4.423 | 1.125 | 134.10% | 1.934 | 228.70% |
| 21 | 1.664 | 1.674 | 0.010 | 100.61% | 2.486 | 67.35% |
| 22 | 1.950 | 2.119 | 0.169 | 108.65% | 2.486 | 85.23% |
| 31 | 1.980 | 2.048 | 0.069 | 103.47% | 0.380 | 539.05% |
| 32 | 2.084 | 2.101 | 0.017 | 100.83% | 0.380 | 552.87% |
| 41 | 2.247 | 2.287 | 0.040 | 101.80% | 1.236 | 185.05% |
| 42 | 2.530 | 2.813 | 0.284 | 111.22% | 1.236 | 227.63% |
| 51 | 2.655 | 2.690 | 0.035 | 101.32% | 1.072 | 250.99% |
| 52 | 2.764 | 2.930 | 0.166 | 106.00% | 1.072 | 273.40% |
| 61 | 2.816 | 2.905 | 0.089 | 103.16% | 1.031 | 281.64% |
| 62 | 3.363 | 3.391 | 0.029 | 100.86% | 1.031 | 328.83% |

Table 1 is the detailed structure data to the first embodiment in FIG. 1A, wherein the unit of the curvature radius, the thickness, the distance, and the focal length is millimeters (mm). Surfaces 0-16 illustrate the surfaces from the object side to the image plane in the optical image capturing system. Table 2 is the aspheric coefficients of the first embodiment, wherein k is the conic coefficient in the aspheric surface formula, and A1-A20 are the first to the twentieth order aspheric surface coefficient. Besides, the tables in the following embodiments are referenced to the schematic view and the aberration graphs, respectively, and definitions of parameters in the tables are equal to those in the Table 1 and the Table 2, so the repetitious details will not be given here.

The Second Embodiment (Embodiment 2)

Figure 2A:
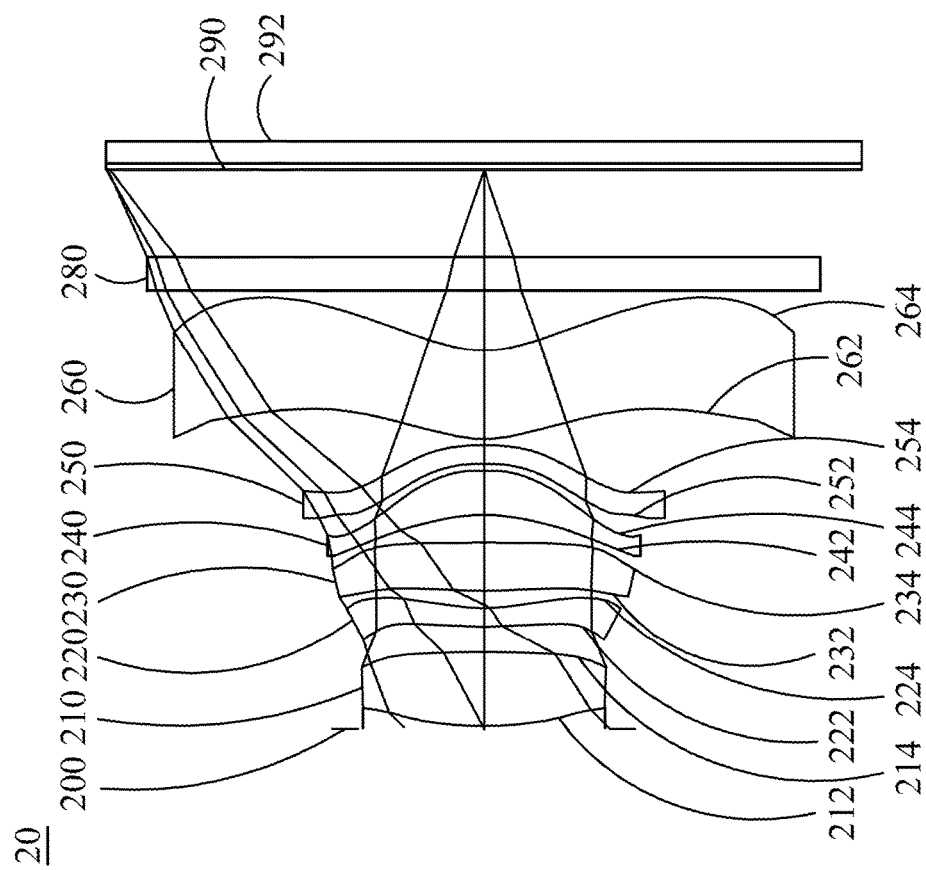
FIG. 2A is a schematic view of the optical image capturing system according to the second embodiment of the present application.
Figure 2B:
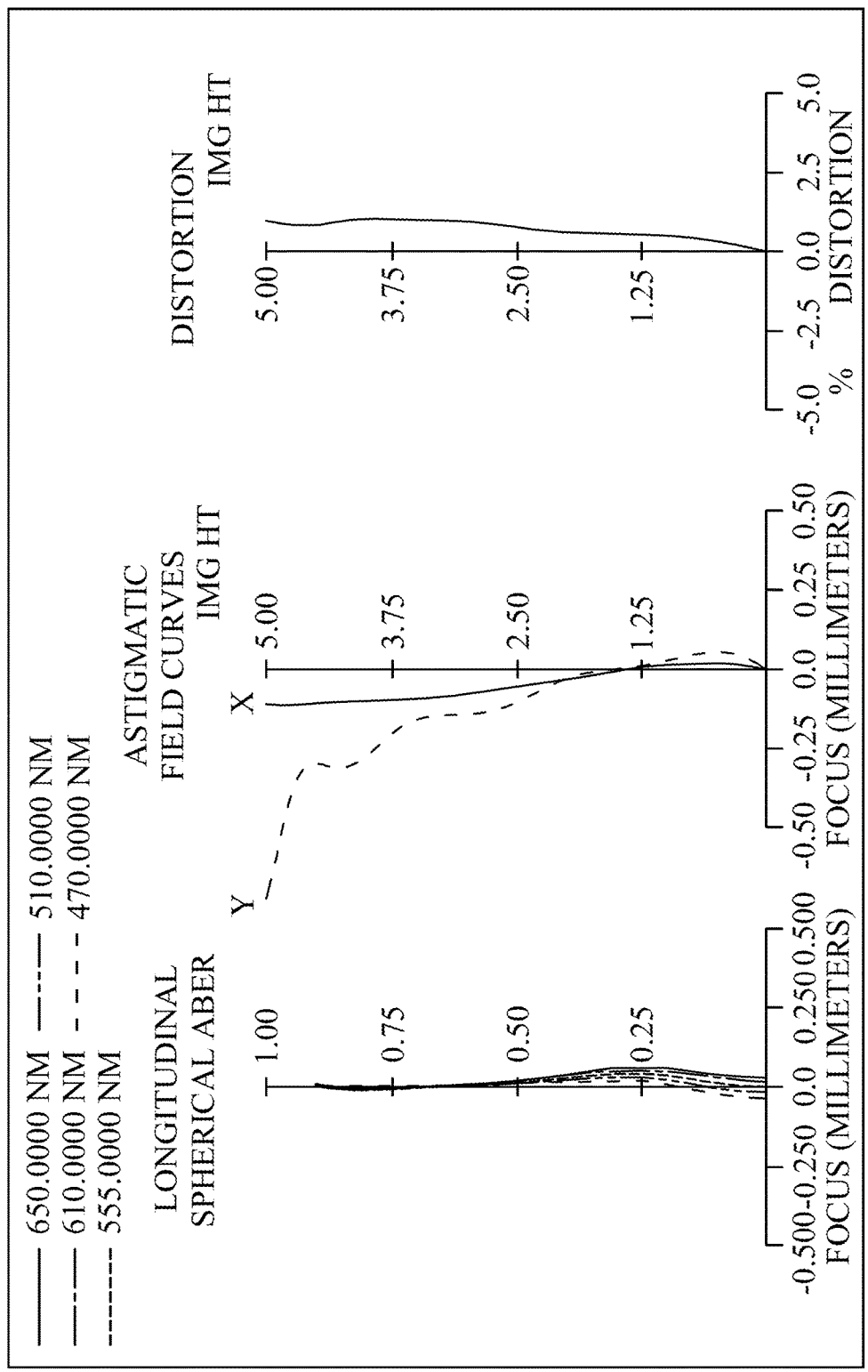
FIG. 2B is longitudinal spherical aberration curves, astigmatic field curves, and an optical distortion grid of the optical image capturing system in the order from left to right according to the second embodiment of the present application.

Please refer to FIG. 2A, FIG. 2B and FIG. 2C, FIG. 2A is a schematic view of the optical image capturing system according to the second embodiment of the present application. FIG. 2B is longitudinal spherical aberration curves, astigmatic field curves, and an optical distortion curve of the optical image capturing system in the order from left to right according to the second embodiment of the present application, and FIG. 2C is a lateral aberration diagram of tangential fan, sagittal fan, the longest operation wavelength and the shortest operation wavelength passing through an edge of the entrance pupil and incident on the image plane by 0.7 HOI according to the second embodiment of the present application. As shown in FIG. 2A, in order from an object side to an image side, the optical image capturing system includes an aperture stop 200, a first lens element 210, a second lens element 220, a third lens element 230, a fourth lens element 240, a fifth lens element 250, a sixth lens element 260, an IR-bandstop filter 280, an image plane 290, and an image sensing device 292.

The first lens element 210 has positive refractive power and it is made of plastic material. The first lens element 210 has a convex object-side surface 212 and a concave image-side surface 214, and both of the object-side surface 212 and the image-side surface 214 are aspheric and have an inflection point.

The second lens element 220 has negative refractive power and it is made of plastic material. The second lens element 220 has a convex object-side surface 222 and a convex image-side surface 224, and both of the object-side surface 222 and the image-side surface 224 are aspheric and have an inflection point.

The third lens element 230 has positive refractive power and it is made of plastic material. The third lens element 230 has a convex object-side surface 232 and a convex image-side surface 234, and both of the object-side surface 232 and the image-side surface 234 are aspheric. The object-side surface 232 has two infection points and the image-side surface 234 has an inflection point.

The fourth lens element 240 has positive refractive power and it is made of plastic material. The fourth lens element 240 has a concave object-side surface 242 and a convex image-side surface 244, and both of the object-side surface 242 and the image-side surface 244 are aspheric and have an inflection point.

The fifth lens element 250 has positive refractive power and it is made of plastic material. The fifth lens element 250 has a concave object-side surface 252 and a convex image-side surface 254, and both of the object-side surface 252 and the image-side surface 254 are aspheric and have two inflection points.

The sixth lens element 260 has positive refractive power and it is made of plastic material. The sixth lens element 260 has a convex object-side surface 262 and a concave image-side surface 264. Hereby, the back focal length is reduced to miniaturize the lens element effectively. In addition, the object-side surface 262 has three inflection points and the image-side surface 264 has an inflection point, such that the angle of incident with incoming light from an off-axis view field can be suppressed effectively and the aberration in the off-axis view field can be corrected further.

The IR-bandstop filter 280 is made of glass material without affecting the focal length of the optical image capturing system and it is disposed between the sixth lens element 260 and the image plane 290.

In the optical image capturing system of the second embodiment, a sum of focal lengths of all lens elements with positive refractive power is ΣPP. The following relation is satisfied: ΣPP=433.422 mm and f1/ΣPP=0.018. Hereby, it is favorable for allocating the positive refractive power of a single lens element to other positive lens elements and the significant aberrations generated in the process of moving the incident light can be suppressed.

In the optical image capturing system of the second embodiment, a sum of focal lengths of all lens elements with negative refractive power is ΣNP. The following relation is satisfied: ΣNP=−14.820 mm and f2/ΣNP=1.0. Hereby, it is favorable for allocating the negative refractive power of a single lens element to other negative lens elements.

Please refer to the following Table 3 and Table 4.

The detailed data of the optical image capturing system of the second embodiment is as shown in Table 3.

TABLE 3

Data of the optical image capturing system
f = 4.953 mm; f/HEP = 1.4; HAF = 45 deg

| Surface # | | Curvature Radius | Thickness | Material | Index | Abbe # | Focal length |
|---|---|---|---|---|---|---|---|
| 0 | Object | Plano | At infinity | | | | |
| 1 | Ape. stop | Plano | 0.050 | | | | |
| 2 | Lens 1 | 3.995478936 | 1.039 | Plastic | 1.544 | 55.96 | 7.807 |
| 3 | | 59.5076314 | 0.000 | | | | |
| 4 | Shading Sheet | Plano | 0.345 | | | | |
| 5 | Lens 2 | 4.998721852 | 0.250 | Plastic | 1.642 | 22.46 | −14.820 |
| 6 | | 3.191592237 | 0.222 | | | | |
| 7 | Lens 3 | 9.444021769 | 0.602 | Plastic | 1.544 | 55.96 | 12.604 |
| 8 | | −24.53241903 | 0.374 | | | | |
| 9 | Lens 4 | −2.1378009 | 0.566 | Plastic | 1.544 | 55.96 | 239.856 |
| 10 | | −2.325825141 | 0.090 | | | | |
| 11 | Lens 5 | −2.808128216 | 0.296 | Plastic | 1.642 | 22.46 | 156.951 |
| 12 | | −2.785001481 | 0.090 | | | | |
| 13 | Lens 6 | 1.844710742 | 1.177 | Plastic | 1.544 | 55.96 | 16.204 |
| 14 | | 1.800157486 | 0.799 | | | | |
| 15 | IR-bandstop filter | Plano | 0.463 | BK_7 | 1.517 | 64.13 | |
| 16 | | Plano | 1.157 | | | | |
| 17 | Image plane | Plano | 0.000 | | | | |

Reference wavelength (d-line) = 555 nm; shield position: clear aperture (CA) of the fourth plano = 1.580 mm As for the parameters of the aspheric surfaces of the second embodiment, reference is made to Table 4.

TABLE 4

Aspheric Coefficients

| | Surface # | | | | | | |
|---|---|---|---|---|---|---|---|
| | 2 | 3 | 5 | 6 | 7 | 8 | 9 |
| k | −1.961641E+00 | 2.439335E−01 | 6.855239E+00 | 1.737615E−01 | −2.545734E−01 | 4.183236E+01 | −2.340358E−01 |
| A4 | −1.006733E−02 | −3.150902E−02 | −7.815730E−02 | −6.234155E−02 | −3.384114E−03 | 2.817718E−02 | 9.996625E−02 |
| A6 | 2.618328E−02 | 1.097767E−02 | −6.165708E−03 | 4.449867E−03 | −1.215951E−02 | −3.225285E−02 | −8.277938E−02 |
| A8 | −4.122737E−02 | −7.587808E−03 | 2.775275E−02 | 1.102960E−02 | −1.281730E−03 | 2.312459E−02 | 7.455823E−02 |
| A10 | 3.329170E−02 | 9.216555E−04 | −2.670014E−02 | −9.363305E−03 | 1.642740E−03 | −1.263646E−02 | −3.777211E−02 |
| A12 | −1.522910E−02 | 7.172076E−04 | 1.087225E−02 | 2.756237E−03 | −9.005442E−05 | 3.312170E−03 | 1.003382E−02 |
| A14 | 3.650647E−03 | −2.972302E−04 | −2.111975E−03 | −3.444127E−04 | −3.635405E−05 | −3.738929E−04 | −1.329068E−03 |
| A16 | −3.635111E−04 | 3.186748E−05 | 1.482106E−04 | 1.448798E−05 | 3.607974E−06 | 1.446833E−05 | 7.051993E−05 |

| | Surface # | | | | |
|---|---|---|---|---|---|
| | 10 | 11 | 12 | 13 | 14 |
| k | −1.096038E−01 | −2.457226E−01 | −1.414328E−01 | −4.890481E+00 | −1.285742E+00 |
| A4 | −2.147220E−01 | −2.371507E−01 | −7.486442E−02 | −3.129158E−02 | −5.458921E−02 |
| A6 | 2.126566E−01 | 2.425273E−01 | 5.518559E−02 | 7.201426E−03 | 1.088385E−02 |
| A8 | −1.066437E−01 | −1.425446E−01 | −2.595232E−02 | −1.253499E−03 | −1.535375E−03 |
| A10 | 3.059359E−02 | 5.529110E−02 | 9.763182E−03 | 1.391165E−04 | 1.404926E−04 |
| A12 | −4.225953E−03 | −1.273438E−02 | −2.050258E−03 | −9.047444E−06 | −7.914381E−06 |
| A14 | 1.626831E−04 | 1.565544E−03 | 2.106285E−04 | 3.204900E−07 | 2.470624E−07 |
| A16 | 1.033356E−05 | −7.966336E−05 | −8.377410E−06 | −4.889580E−09 | −3.260760E−09 |

In the second embodiment, the presentation of the aspheric surface formula is similar to that in the first embodiment. Besides, the definitions of parameters in following tables are equal to those in the first embodiment, so the repetitious details will not be given here.

The following contents may be deduced from Table 3 and Table 4.

| Second embodiment (Primary reference wavelength = 587.5 nm) | | | | | |
|---|---|---|---|---|---|
| \|f/f1\| | \|f/f2\| | \|f/f3\| | \|f/f4\| | \|f/f5\| | \|f/f6\| |
| 0.63437 | 0.33419 | 0.39292 | 0.02065 | 0.03155 | 0.30564 |
| Σ PPR | Σ NPR | Σ PPR/\|Σ NPR\| | IN12/f | IN56/f | TP4/(IN34 + TP4 + IN45) |
| 0.63437 | 0.33419 | 0.39292 | 0.02065 | 0.03155 | 0.30564 |
| \|f1/f2\| | \|f2/f3\| | (TP1 + IN12)/TP2 | | (TP6 + IN56)/TP5 | |
| 0.52680 | 1.17575 | 5.37787 | | 5.08880 | |

| Second embodiment (Primary reference wavelength = 587.5 nm) | | | | | |
|---|---|---|---|---|---|
| HOS | InTL | HOS/HOI | InS/HOS | ODT % | TDT % |
| 7.45289 | 5.03991 | 1.49058 | 1.00404 | 1.01435 | 0.21978 |
| HVT51 | HVT52 | HVT61 | HVT62 | HVT62/HOI | HVT62/HOS |
| 0 | 1.96492 | 2.25246 | 2.90315 | 0.58063 | 0.38953 |
| TP2/TP3 | TP3/TP4 | InRS61 | InRS62 | \|InRS61\|/TP6 | \|InRS62\|/TP6 |
| 0.38677 | 1.09878 | 0.27595 | 0.25307 | 0.23342 | 0.21407 |
| PLTA | PSTA | NLTA | NSTA | SLTA | SSTA |
| −0.025 mm | 0.011 mm | −0.007 mm | −0.035 mm | −0.046 mm | −0.018 mm |

The numerical related to the length of outline curve is shown according to table 3 and table 4.

| Second embodiment (Reference wavelength = 587.5 nm) | | | | | | |
|---|---|---|---|---|---|---|
| ARE | ½(HEP) | ARE value | ARE − ½(HEP) | 2(ARE/HEP) % | TP | ARE/TP (%) |
| 11 | 1.728 | 1.754 | 0.025 | 101.46% | 1.039 | 168.78% |
| 12 | 1.765 | 1.830 | 0.065 | 103.70% | 1.039 | 176.13% |
| 21 | 1.620 | 1.686 | 0.066 | 104.06% | 0.250 | 674.51% |
| 22 | 1.770 | 1.796 | 0.026 | 101.46% | 0.250 | 718.32% |
| 31 | 1.770 | 1.776 | 0.006 | 100.36% | 0.602 | 295.06% |
| 32 | 1.770 | 1.807 | 0.037 | 102.07% | 0.602 | 300.08% |
| 41 | 1.770 | 1.834 | 0.064 | 103.60% | 0.566 | 324.14% |
| 42 | 1.770 | 1.990 | 0.220 | 112.45% | 0.566 | 351.83% |
| 51 | 1.770 | 1.920 | 0.150 | 108.48% | 0.296 | 648.72% |
| 52 | 1.770 | 1.895 | 0.125 | 107.06% | 0.296 | 640.24% |
| 61 | 1.770 | 1.811 | 0.041 | 102.34% | 1.177 | 153.87% |
| 62 | 1.770 | 1.848 | 0.079 | 104.44% | 1.177 | 157.03% |
| ARS | EHD | ARS value | ARS − EHD | (ARS/EHD) % | TP | ARS/TP (%) |
| 11 | 1.728 | 1.754 | 0.025 | 101.46% | 1.039 | 168.78% |
| 12 | 1.765 | 1.830 | 0.065 | 103.70% | 1.039 | 176.13% |
| 21 | 1.620 | 1.686 | 0.066 | 104.06% | 0.250 | 674.51% |
| 22 | 1.858 | 1.902 | 0.044 | 102.37% | 0.250 | 760.87% |
| 31 | 1.949 | 1.956 | 0.007 | 100.37% | 0.602 | 324.92% |
| 32 | 2.007 | 2.076 | 0.069 | 103.44% | 0.602 | 344.84% |
| 41 | 2.030 | 2.112 | 0.082 | 104.02% | 0.566 | 373.27% |
| 42 | 2.069 | 2.297 | 0.228 | 111.02% | 0.566 | 406.08% |
| 51 | 2.192 | 2.347 | 0.155 | 107.06% | 0.296 | 792.89% |
| 52 | 2.407 | 2.535 | 0.128 | 105.33% | 0.296 | 856.52% |
| 61 | 3.438 | 3.490 | 0.052 | 101.52% | 1.177 | 296.49% |
| 62 | 4.119 | 4.362 | 0.243 | 105.89% | 1.177 | 370.52% |

The following contents may be deduced from Table 3 and Table 4.

| Related inflection point values of second embodiment (Primary reference wavelength: 555 nm) | | | | | | | |
|---|---|---|---|---|---|---|---|
| HIF111 | 1.1925 | HIF111/HOI | 0.2385 | SGI111 | 0.1636 | \|SGI111\|/(\|SGI111\| + TP1) | 0.1423 |
| HIF121 | 0.2118 | HIF121/HOI | 0.0424 | SGI121 | 0.0003 | \|SGI121\|/(\|SGI121\| + TP1) | 0.0003 |
| HIF211 | 0.4952 | HIF211/HOI | 0.0990 | SGI211 | 0.0201 | \|SGI211\|/(\|SGI211\| + TP2) | 0.0744 |
| HIF221 | 0.7637 | HIF221/HOI | 0.1527 | SGI221 | 0.0719 | \|SGI221\|/(\|SGI221\| + TP2) | 0.2233 |
| HIF311 | 0.6513 | HIF311/HOI | 0.1303 | SGI311 | 0.0181 | \|SGI311\|/(\|SGI311\| + TP3) | 0.0272 |
| HIF312 | 1.5585 | HIF312/HOI | 0.3117 | SGI312 | −0.0246 | \|SGI312\|/(\|SGI312\| + TP3) | 0.0367 |
| HIF321 | 1.8081 | HIF321/HOI | 0.3616 | SGI321 | −0.2470 | \|SGI321\|/(\|SGI321\| + TP3) | 0.2764 |
| HIF411 | 1.7855 | HIF411/HOI | 0.3571 | SGI411 | −0.4637 | \|SGI411\|/(\|SGI411\| + TP4) | 0.4408 |
| HIF421 | 1.3364 | HIF421/HOI | 0.2673 | SGI421 | −0.5534 | \|SGI421\|/(\|SGI421\| + TP4) | 0.4847 |
| HIF511 | 1.1991 | HIF511/HOI | 0.2398 | SGI511 | −0.4045 | \|SGI511\|/(\|SGI511\| + TP5) | 0.6181 |
| HIF512 | 1.9791 | HIF512/HOI | 0.3958 | SGI512 | −0.6948 | \|SGI512\|/(\|SGI512\| + TP5) | 0.7354 |
| HIF521 | 1.3122 | HIF521/HOI | 0.2624 | SGI521 | −0.3940 | \|SGI521\|/(\|SGI521\| + TP5) | 0.6118 |

-continued

Related inflection point values of second embodiment (Primary reference wavelength: 555 nm)

| | | | | | | | |
|---|---|---|---|---|---|---|---|
| HIF522 | 2.1278 | HIF522/HOI | 0.4256 | SGI522 | −0.6217 | \|SGI522\|/(\|SGI522\| + TP5) | 0.7132 |
| HIF611 | 0.9083 | HIF611/HOI | 0.1817 | SGI611 | 0.1670 | \|SGI611\|/(\|SGI611\| + TP6) | 0.1238 |
| HIF612 | 3.0353 | HIF612/HOI | 0.6071 | SGI612 | 0.3263 | \|SGI612\|/(\|SGI612\| + TP6) | 0.2163 |
| HIF613 | 3.2055 | HIF613/HOI | 0.6411 | SGI613 | 0.3034 | \|SGI613\|/(\|SGI613\| + TP6) | 0.2042 |
| HIF621 | 1.1736 | HIF621/HOI | 0.2347 | SGI621 | 0.2888 | \|SGI621\|/(\|SGI621\| + TP6) | 0.1963 |

The Third Embodiment (Embodiment 3)

Figure 3A:
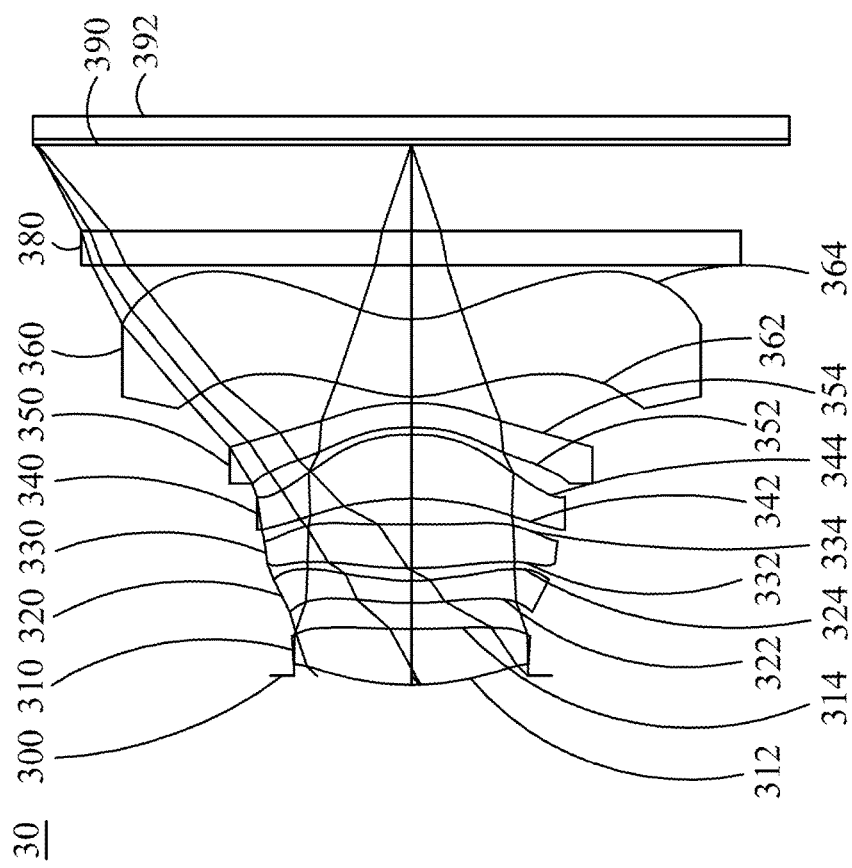
FIG. 3A is a schematic view of the optical image capturing system according to the third embodiment of the present application.
Figure 3B:
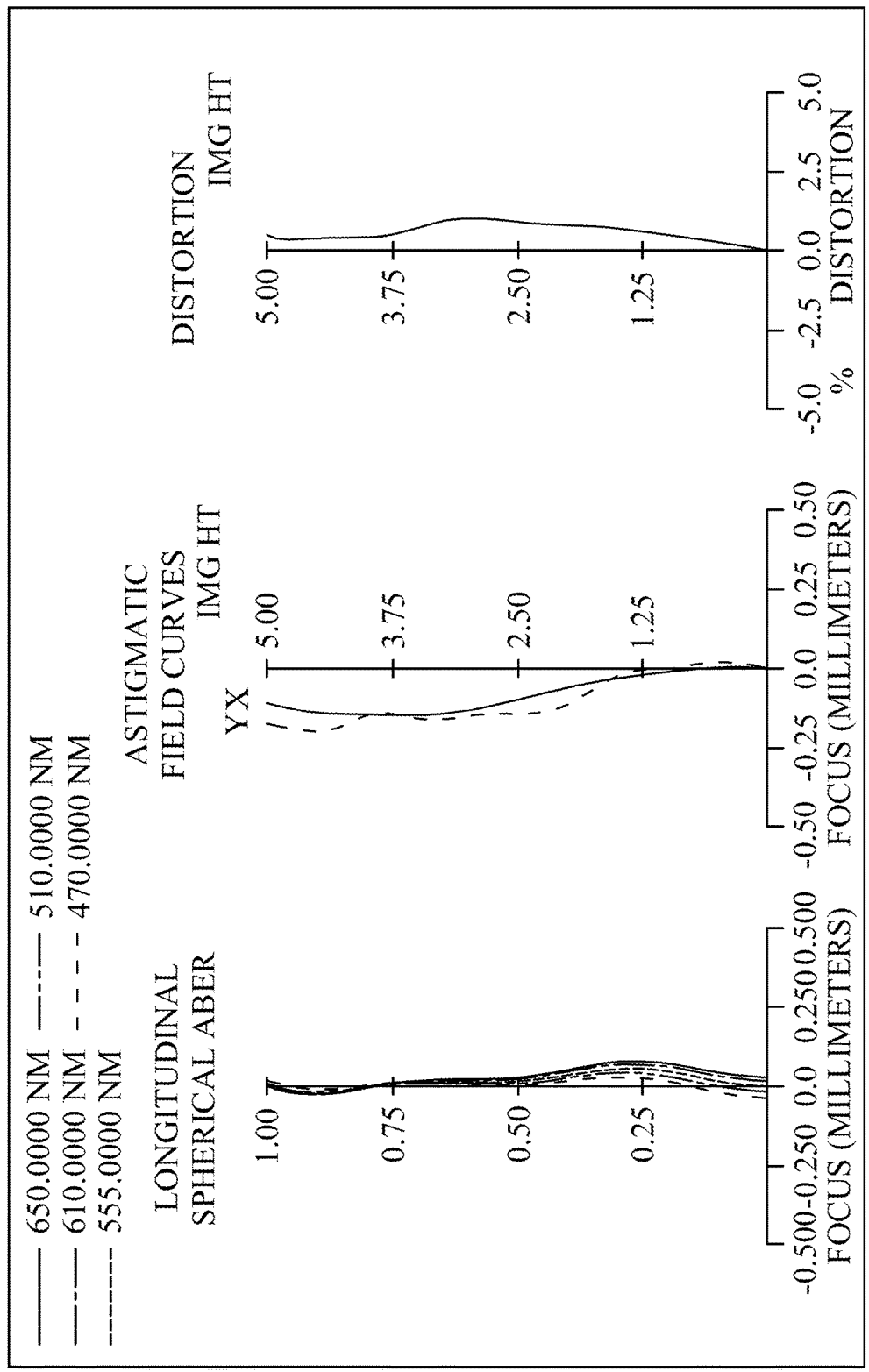
FIG. 3B is longitudinal spherical aberration curves, astigmatic field curves, and an optical distortion grid of the optical image capturing system in the order from left to right according to the third embodiment of the present application.
Figure 3C:
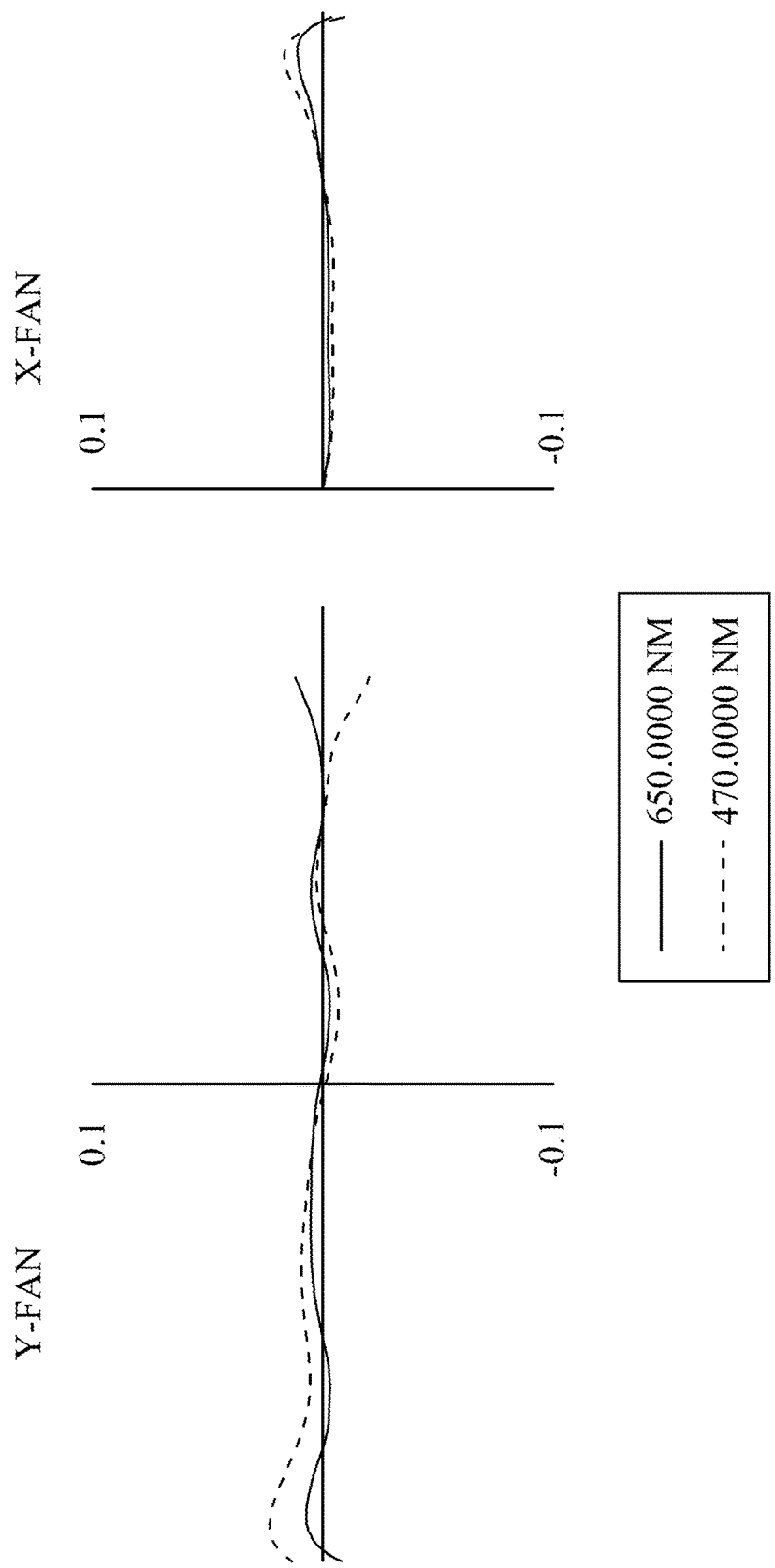
FIG. 3C is a lateral aberration diagram of tangential fan, sagittal fan, the longest operation wavelength and the shortest operation wavelength passing through an edge of the entrance pupil and incident on the image plane by 0.7 HOI according to the third embodiment of the present application.

Please refer to FIG. 3A, FIG. 3B and FIG. 3C, FIG. 3A is a schematic view of the optical image capturing system according to the third embodiment of the present application, FIG. 3B is longitudinal spherical aberration curves, astigmatic field curves, and an optical distortion curve of the optical image capturing system in the order from left to right according to the third embodiment of the present application, and FIG. 3C is a lateral aberration diagram of tangential fan, sagittal fan, the longest operation wavelength and the shortest operation wavelength passing through an edge of the entrance pupil and incident on the image plane by 0.7 HOI according to the third embodiment of the present application. As shown in FIG. 3A, in order from an object side to an image side, the optical image capturing system includes an aperture stop 300, a first lens element 310, a second lens element 320, a third lens element 330, a fourth lens element 340, a fifth lens element 350, a sixth lens element 360, an IR-bandstop filter 380, an image plane 390, and an image sensing device 392.

The first lens element 310 has positive refractive power and it is made of plastic material. The first lens element 310 has a convex object-side surface 312 and a concave image-side surface 314, and both of the object-side surface 312 and the image-side surface 314 are aspheric and have has an inflection point.

The second lens element 320 has negative refractive power and it is made of plastic material. The second lens element 320 has a convex object-side surface 322 and a concave image-side surface 324, and both of the object-side surface 322 and the image-side surface 324 are aspheric and have an inflection point.

The third lens element 330 has positive refractive power and it is made of plastic material. The third lens element 330 has a convex object-side surface 332 and a concave image-side surface 334, and both of the object-side surface 332 and the image-side surface 334 are aspheric and have two inflection points.

The fourth lens element 340 has positive refractive power and it is made of plastic material. The fourth lens element 340 has a concave object-side surface 342 and a convex image-side surface 344, and both of the object-side surface 342 and the image-side surface 344 are aspheric. The object-side surface 342 has three inflection points and the image-side surface 344 has an inflection point.

The fifth lens element 350 has positive refractive power and it is made of plastic material. The fifth lens element 350 has a concave object-side surface 352 and a convex image-side surface 354, and both of the object-side surface 352 and the image-side surface 354 are aspheric. The object-side surface 352 has two inflection points and the image-side surface 354 has four inflection points.

The sixth lens element 360 has positive refractive power and it is made of plastic material. The sixth lens element 360 has a convex object-side surface 362 and a concave image-side surface 364. Hereby, the back focal length is reduced to miniaturize the lens element effectively. In addition, the object-side surface 362 and image-side surface 364 both have an inflection point, such that the angle of incident with incoming light from an off-axis view field can be suppressed effectively and the aberration in the off-axis view field can be corrected further.

The IR-bandstop filter 380 is made of glass material without affecting the focal length of the optical image capturing system and it is disposed between the sixth lens element 360 and the image plane 390.

In the optical image capturing system of the third embodiment, a sum of focal lengths of all lens elements with positive refractive power is ΣPP. The following relation is satisfied: ΣPP=188.498 mm and f1/ΣPP=0.046. Hereby, it is favorable for allocating the positive refractive power of a single lens element to other positive lens elements and the significant aberrations generated in the process of moving the incident light can be suppressed.

In the optical image capturing system of the third embodiment, a sum of focal lengths of all lens elements with negative refractive power is ΣNP. The following relation is satisfied: ΣNP=−16.942 mm and f2/ΣNP=1.0. Hereby, it is favorable for allocating the negative refractive power of a single lens element to other negative lens elements.

Please refer to the following Table 5 and Table 6.

The detailed data of the optical image capturing system of the third embodiment is as shown in Table 5.

TABLE 5

Data of the optical image capturing system
f = 4.975 mm; f/HEP = 1.6; HAF = 45 deg

| Surface# | | Curvature Radius | Thickness | Material | Index | Abbe # | Focal length |
|---|---|---|---|---|---|---|---|
| 0 | Object | Plano | At infinity | | | | |
| 1 | Ape. Stop | Plano | −0.123 | | | | |
| 2 | Lens 1 | 3.438680241 | 0.751 | Plastic | 1.544 | 55.96 | 8.700 |
| 3 | | 11.50726925 | 0.000 | | | | |
| 4 | Shading Sheet | Plano | 0.352 | | | | |
| 5 | Lens 2 | 4.716064825 | 0.300 | Plastic | 1.642 | 22.46 | −16.942 |
| 6 | | 3.215874291 | 0.167 | | | | |
| 7 | Lens 3 | 5.37310874 | 0.589 | Plastic | 1.544 | 55.96 | 11.417 |

TABLE 5-continued

Data of the optical image capturing system
f = 4.975 mm; f/HEP = 1.6; HAF = 45 deg

| Surface# | | Curvature Radius | Thickness | Material | Index | Abbe # | Focal length |
|---|---|---|---|---|---|---|---|
| 8 | | 37.51330081 | 0.341 | | | | |
| 9 | Lens 4 | −3.817458875 | 0.871 | Plastic | 1.544 | 55.96 | 37.303 |
| 10 | | −3.4737115 | 0.097 | | | | |
| 11 | Lens 5 | −2.860111858 | 0.327 | Plastic | 1.642 | 22.46 | 38.669 |
| 12 | | −2.682306523 | 0.090 | | | | |
| 13 | Lens 6 | 1.908959697 | 1.036 | Plastic | 1.544 | 55.96 | 92.409 |
| 14 | | 1.603942117 | 0.729 | | | | |
| 15 | IR-bandstop filter | Plano | 0.463 | BK_7 | 1.517 | 64.13 | |
| 16 | | Plano | 1.067 | | | | |
| 17 | Image plane | Plano | | | | | |

Reference wavelength (d-line) = 555 nm; shield position. The clear aperture of the fourth surface is 1.550 mm.

As for the parameters of the aspheric surfaces of the third embodiment, reference is made to Table 6.

TABLE 6

Aspheric Coefficients

| Surface # | 2 | 3 | 5 | 6 | 7 | 8 | 9 |
|---|---|---|---|---|---|---|---|
| k | −2.085628E+00 | 2.439356E−01 | 6.706446E+00 | 2.080737E−01 | −2.545734E+01 | 4.183236E+01 | −2.043185E−01 |
| A4 | −1.115946E−02 | −1.449035E−02 | −5.872853E−02 | −5.649715E−02 | 1.608113E−02 | 3.227838E−02 | 2.109901E−02 |
| A6 | 3.428221E−02 | −1.305123E−02 | 9.725203E−03 | 1.509868E−02 | −4.478501E−02 | −5.302031E−02 | 1.478938E−02 |
| A8 | −4.993327E−02 | 1.564011E−02 | −1.801312E−02 | −6.814220E−03 | 3.187533E−02 | 3.503941E−02 | −5.448351E−02 |
| A10 | 3.953635E−02 | −1.348450E−02 | 1.910488E−02 | 4.966586E−03 | −1.242386E−02 | −2.084069E−02 | 3.805951E−02 |
| A12 | −1.842931E−02 | 5.786514E−03 | −1.297396E−02 | −3.220520E−03 | 1.899045E−03 | 8.046047E−03 | −1.077236E−02 |
| A14 | 4.615094E−03 | −1.278005E−03 | 4.099058E−03 | 8.337097E−04 | 7.843673E−05 | −1.625820E−03 | 1.271251E−03 |
| A16 | −4.950838E−04 | 1.107650E−04 | −5.014961E−04 | −7.168150E−05 | −3.115367E−05 | 1.321530E−04 | −4.378358E−05 |
| A18 | 5.065000E−11 | 0.000000E+00 | 0.000000E+00 | 0.000000E+00 | 0.000000E+00 | 0.000000E+00 | 0.000000E+00 |
| A20 | −4.980000E−11 | 0.000000E+00 | 0.000000E+00 | 0.000000E+00 | 0.000000E+00 | 0.000000E+00 | 0.000000E+00 |

| Surface # | 10 | 11 | 12 | 13 | 14 |
|---|---|---|---|---|---|
| k | −1.479008E−01 | −2.815444E−01 | −1.650796E−01 | −3.992221E+00 | −1.257079E+00 |
| A4 | −2.612404E−01 | −1.258625E−01 | 3.232059E−02 | −4.394994E−02 | −7.478522E−02 |
| A6 | 2.391956E−01 | 8.887666E−02 | −4.479161E−02 | 3.545002E−03 | 1.698028E−02 |
| A8 | −1.377034E−01 | −1.040803E−02 | 4.437671E−02 | 2.728426E−03 | −2.632893E−03 |
| A10 | 5.040766E−02 | −4.768864E−03 | −1.845551E−02 | −1.123773E−03 | 2.595745E−04 |
| A12 | −1.032729E−02 | 1.274375E−03 | 3.831477E−03 | 1.832750E−04 | −1.575611E−05 |
| A14 | 1.026347E−03 | −5.094577E−05 | −3.953097E−04 | −1.408575E−05 | 5.402099E−07 |
| A16 | −3.415701E−05 | −6.242368E−06 | 1.622541E−05 | 4.204356E−07 | −8.144580E−09 |

The presentation of the aspheric surface formula in the third embodiment is similar to that in the first embodiment. Besides, the definitions of parameters in following tables are equal to those in the first embodiment so the repetitious details will not be given here.

The following contents may be deduced from Table 5 and Table 6.

Third embodiment (Primary reference wavelength: 555 nm)

| |f/f1| | |f/f2| | |f/f3| | |f/f4| | |f/f5| | |f/f6| |
|---|---|---|---|---|---|
| 0.57187 | 0.29366 | 0.43577 | 0.13337 | 0.12866 | 0.05384 |

| Σ PPR | Σ NPR | Σ PPR/|Σ NPR| | IN12/f | IN56/f | TP4/(IN34 + TP4 + IN45) |
|---|---|---|---|---|---|
| 1.32352 | 0.29366 | 4.50690 | 0.07076 | 0.01809 | 0.66530 |

-continued

Third embodiment (Primary reference wavelength: 555 nm)

| |f1/f2| | |f2/f3| | (TP1 + IN12)/TP2 | (TP6 + IN56)/TP5 |
|---|---|---|---|
| 0.51351 | 1.48391 | 3.67707 | 3.44293 |

| HOS | InTL | HOS/HOI | InS/HOS | ODT % | TDT % |
|---|---|---|---|---|---|
| 7.26965 | 4.92053 | 1.45393 | 0.98313 | 1.02117 | 0.68523 |

| HVT51 | HVT52 | HVT61 | HVT62 | HVT62/HOI | HVT62/HOS |
|---|---|---|---|---|---|
| 0 | 0 | 1.85754 | 2.58775 | 0.51755 | 0.35597 |

-continued

| Third embodiment (Primary reference wavelength: 555 nm) | | | | | |
|---|---|---|---|---|---|
| TP2/TP3 | TP3/TP4 | InRS61 | InRS62 | \|InRS61\|/TP6 | \|InRS62\|/TP6 |
| 0.50971 | 0.67560 | −0.07003 | −0.06993 | 0.06761 | 0.06751 |
| PLTA | PSTA | NLTA | NSTA | SLTA | SSTA |
| −0.022 mm | 0.013 mm | 0.014 mm | −0.009 mm | −0.018 mm | −0.009 mm |

The numerical related to the length of outline curve is shown according to table 5 and table 6.

| Third embodiment (Reference wavelength = 587.5 nm) | | | | | | |
|---|---|---|---|---|---|---|
| ARE | ½(HEP) | ARE value | ARE − ½(HEP) | 2(ARE/HEP) % | TP | ARE/TP (%) |
| 11 | 1.555 | 1.586 | 0.031 | 101.99% | 0.751 | 211.12% |
| 12 | 1.555 | 1.568 | 0.013 | 100.85% | 0.751 | 208.76% |
| 21 | 1.555 | 1.584 | 0.029 | 101.89% | 0.300 | 528.03% |
| 22 | 1.555 | 1.566 | 0.011 | 100.71% | 0.300 | 521.91% |
| 31 | 1.555 | 1.558 | 0.004 | 100.23% | 0.589 | 264.78% |
| 32 | 1.555 | 1.564 | 0.009 | 100.60% | 0.589 | 265.73% |
| 41 | 1.555 | 1.592 | 0.038 | 102.41% | 0.871 | 182.77% |
| 42 | 1.555 | 1.730 | 0.175 | 111.27% | 0.871 | 198.58% |
| 51 | 1.555 | 1.634 | 0.079 | 105.09% | 0.327 | 499.64% |
| 52 | 1.555 | 1.600 | 0.045 | 102.89% | 0.327 | 489.22% |
| 61 | 1.555 | 1.584 | 0.029 | 101.88% | 1.036 | 152.91% |
| 62 | 1.555 | 1.625 | 0.070 | 104.49% | 1.036 | 156.84% |
| ARS | EHD | ARS value | ARS − EHD | (ARS/EHD) % | TP | ARS/TP (%) |
| 11 | 1.561 | 1.593 | 0.031 | 102.00% | 0.751 | 212.05% |
| 12 | 1.587 | 1.604 | 0.018 | 101.13% | 0.751 | 213.62% |
| 21 | 1.615 | 1.662 | 0.047 | 102.94% | 0.300 | 554.06% |
| 22 | 1.834 | 1.876 | 0.042 | 102.30% | 0.300 | 625.33% |
| 31 | 1.917 | 1.924 | 0.007 | 100.37% | 0.589 | 326.90% |
| 32 | 1.952 | 1.991 | 0.040 | 102.03% | 0.589 | 338.32% |
| 41 | 1.984 | 2.037 | 0.053 | 102.65% | 0.871 | 233.79% |
| 42 | 2.046 | 2.266 | 0.221 | 110.78% | 0.871 | 260.17% |
| 51 | 2.115 | 2.280 | 0.165 | 107.82% | 0.327 | 697.28% |
| 52 | 2.417 | 2.496 | 0.079 | 103.27% | 0.327 | 763.23% |
| 61 | 2.967 | 3.081 | 0.114 | 103.85% | 1.036 | 297.45% |
| 62 | 3.850 | 4.212 | 0.362 | 109.40% | 1.036 | 406.64% |

The following contents may be deduced from Table 5 and Table 6.

| Related inflection point values of third embodiment (Primary reference wavelength: 555 nm) | | | | | | | |
|---|---|---|---|---|---|---|---|
| HIF111 | 1.2209 | HIF111/HOI | 0.2442 | SGI111 | 0.2042 | \|SGI111\|/(\|SGI111\| + TP1) | 0.2138 |
| HIF121 | 0.5959 | HIF121/HOI | 0.1192 | SGI121 | 0.0132 | \|SGI121\|/(\|SGI121\| + TP1) | 0.0173 |
| HIF211 | 0.6247 | HIF211/HOI | 0.1249 | SGI211 | 0.0342 | \|SGI211\|/(\|SGI211\| + TP2) | 0.1024 |
| HIF221 | 0.8802 | HIF221/HOI | 0.1760 | SGI221 | 0.0948 | \|SGI221\|/(\|SGI221\| + TP2) | 0.2401 |
| HIF311 | 0.7629 | HIF311/HOI | 0.1526 | SGI311 | 0.0483 | \|SGI311\|/(\|SGI311\| + TP3) | 0.0758 |
| HIF312 | 1.6243 | HIF312/HOI | 0.3249 | SGI312 | 0.0583 | \|SGI312\|/(\|SGI312\| + TP3) | 0.0901 |
| HIF321 | 0.6678 | HIF321/HOI | 0.1336 | SGI321 | 0.0088 | \|SGI321\|/(\|SGI321\| + TP3) | 0.0147 |
| HIF322 | 1.7707 | HIF322/HOI | 0.3541 | SGI322 | −0.1673 | \|SGI322\|/(\|SGI322\| + TP3) | 0.2213 |
| HIF411 | 1.3064 | HIF411/HOI | 0.2613 | SGI411 | −0.2209 | \|SGI411\|/(\|SGI411\| + TP4) | 0.2023 |
| HIF412 | 1.6746 | HIF412/HOI | 0.3349 | SGI412 | −0.3321 | \|SGI412\|/(\|SGI412\| + TP4) | 0.2760 |
| HIF413 | 1.8692 | HIF413/HOI | 0.3738 | SGI413 | −0.3853 | \|SGI413\|/(\|SGI413\| + TP4) | 0.3066 |
| HIF421 | 1.3422 | HIF421/HOI | 0.2684 | SGI421 | −0.5050 | \|SGI421\|/(\|SGI421\| + TP4) | 0.3669 |
| HIF511 | 1.0465 | HIF511/HOI | 0.2093 | SGI511 | −0.2509 | \|SGI511\|/(\|SGI511\| + TP5) | 0.4342 |
| HIF512 | 1.5111 | HIF512/HOI | 0.3022 | SGI512 | −0.4390 | \|SGI512\|/(\|SGI512\| + TP5) | 0.5731 |
| HIF521 | 1.1184 | HIF521/HOI | 0.2237 | SGI521 | −0.2144 | \|SGI521\|/(\|SGI521\| + TP5) | 0.3960 |
| HIF522 | 1.6488 | HIF522/HOI | 0.3298 | SGI522 | −0.3710 | \|SGI522\|/(\|SGI522\| + TP5) | 0.5315 |
| HIF523 | 2.0430 | HIF523/HOI | 0.4086 | SGI523 | −0.4813 | \|SGI523\|/(\|SGI523\| + TP5) | 0.5954 |
| HIF524 | 2.2614 | HIF524/HOI | 0.4523 | SGI524 | −0.5462 | \|SGI524\|/(\|SGI524\| + TP5) | 0.6255 |
| HIF611 | 0.8117 | HIF611/HOI | 0.1623 | SGI611 | 0.1363 | \|SGI611\|/(\|SGI611\| + TP6) | 0.1163 |
| HIF621 | 1.0439 | HIF621/HOI | 0.2088 | SGI621 | 0.2607 | \|SGI621\|/(\|SGI621\| + TP6) | 0.2011 |

The Fourth Embodiment (Embodiment 4)

Figure 4A:
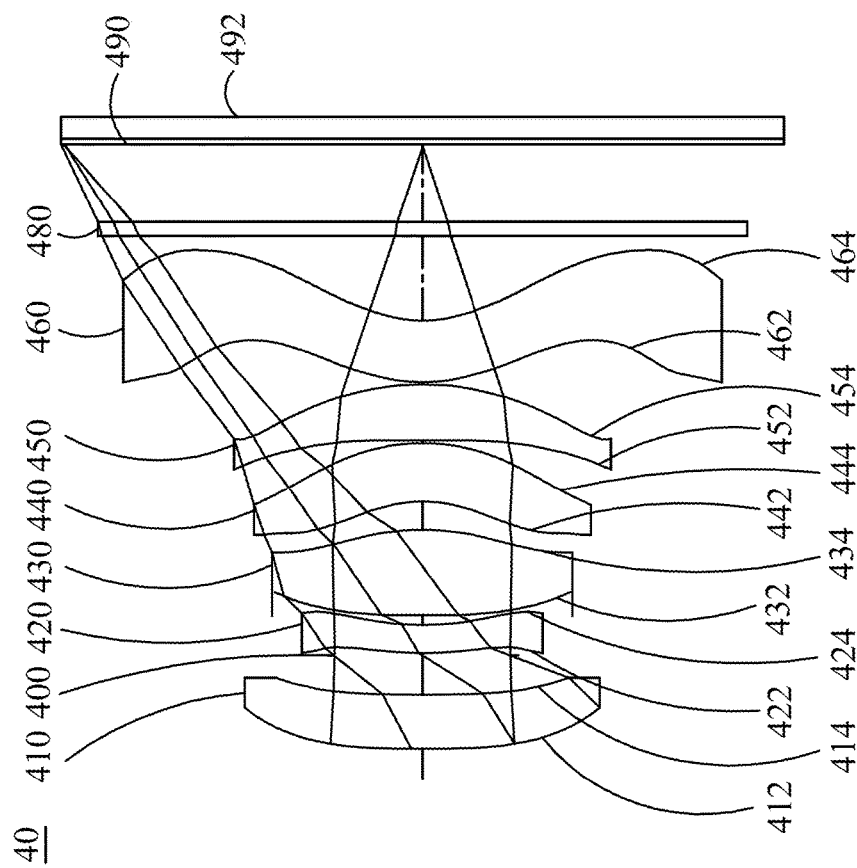
FIG. 4A is a schematic view of the optical image capturing system according to the fourth embodiment of the present application.
Figure 4B:
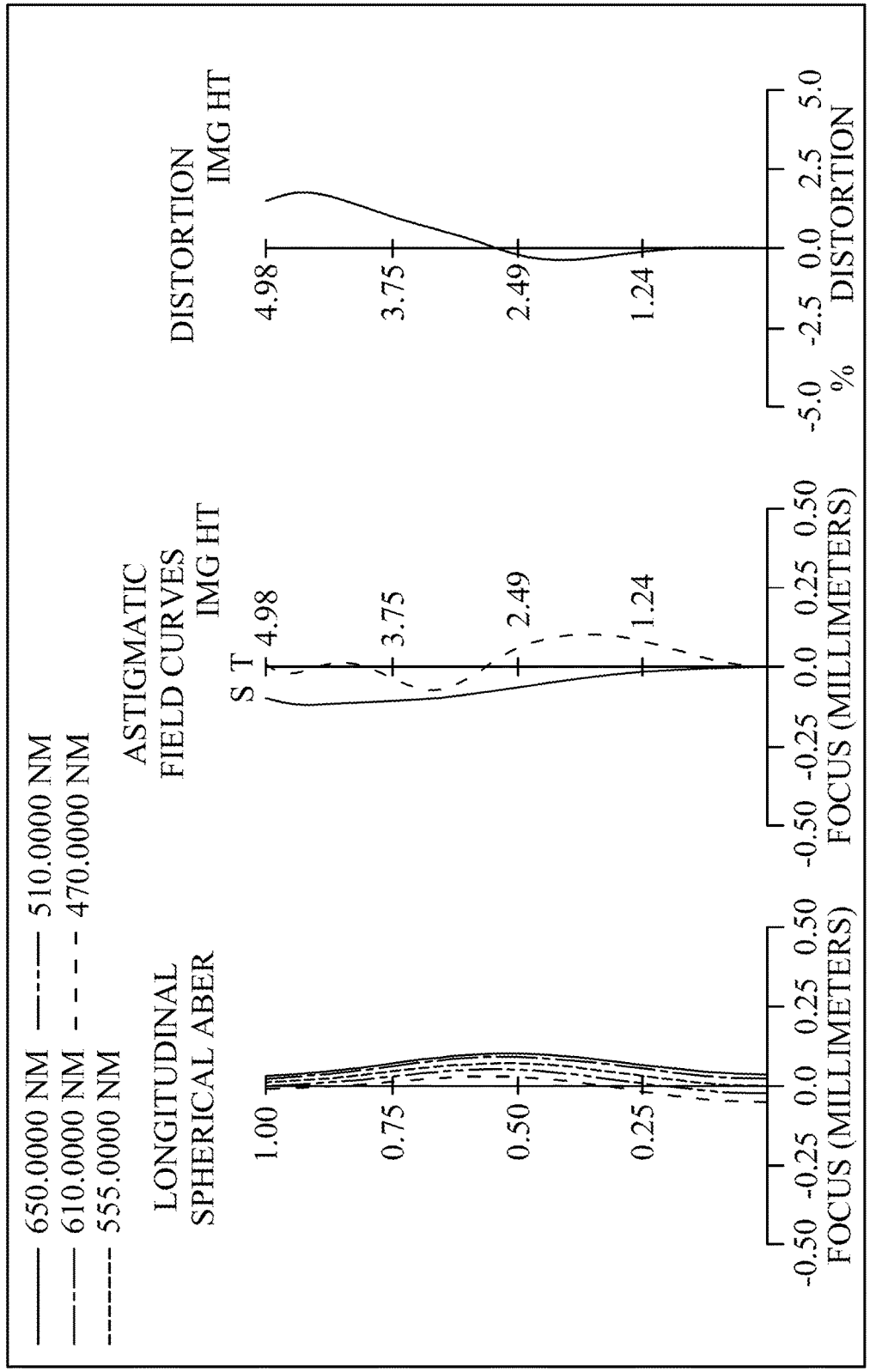
FIG. 4B is longitudinal spherical aberration curves, astigmatic field curves, and an optical distortion grid of the optical image capturing system in the order from left to right according to the fourth embodiment of the present application.
Figure 4C:
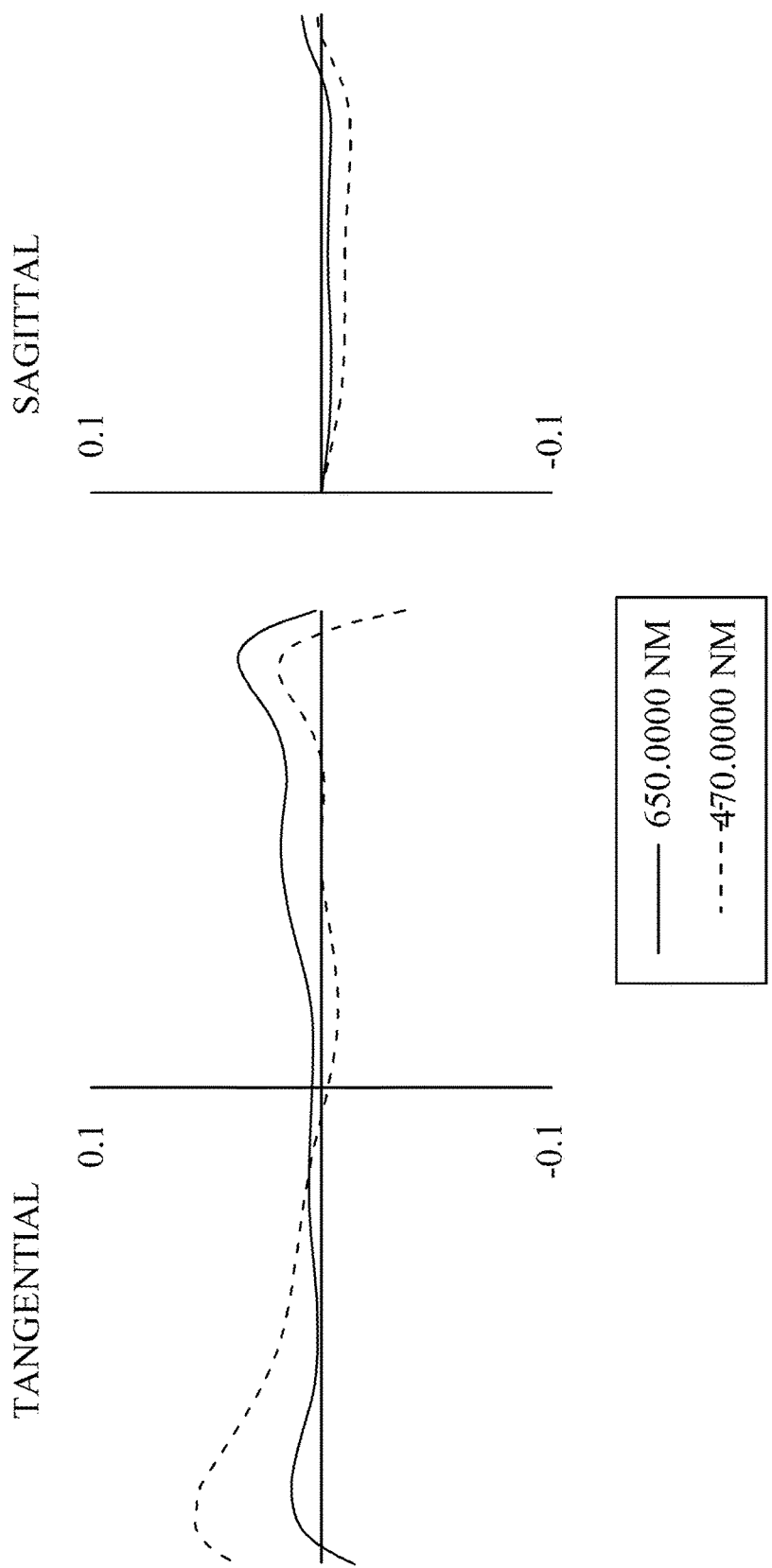
FIG. 4C is a lateral aberration diagram of tangential fan, sagittal fan, the longest operation wavelength and the shortest operation wavelength passing through an edge of the entrance pupil and incident on the image plane by 0.7 HOI according to the fourth embodiment of the present application.

Please refer to FIG. 4A, FIG. 4B and FIG. 4C, FIG. 4A is a schematic view of the optical image capturing system according to the fourth embodiment of the present application, FIG. 4B is longitudinal spherical aberration curves, astigmatic field curves, and an optical distortion curve of the optical image capturing system in the order from left to right according to the fourth embodiment of the present application, and FIG. 4C is a lateral aberration diagram of tangential fan, sagittal fan, the longest operation wavelength and the shortest operation wavelength passing through an edge of the entrance pupil and incident on the image plane by 0.7 HOI according to the fourth embodiment of the present application. As shown in FIG. 4A, in order from an object side to an image side, the optical image capturing system includes a first lens element 410, an aperture stop 400, a second lens element 420, a third lens element 430, a fourth lens element 440, a fifth lens element 450, a sixth lens element 460, an IR-bandstop filter 480, an image plane 490, and an image sensing device 492.

The first lens element 410 has positive refractive power and it is made of plastic material. The first lens element 410 has a convex object-side surface 412 and a concave image-side surface 414, and both of the object-side surface 412 and the image-side surface 414 are aspheric.

The second lens element 420 has negative refractive power and it is made of plastic material. The second lens element 420 has a convex object-side surface 422 and a concave image-side surface 424, and both of the object-side surface 422 and the image-side surface 424 are aspheric and have an inflection point.

The third lens element 430 has positive refractive power and it is made of plastic material. The third lens element 430 has a convex object-side surface 432 and a convex image-side surface 434, and both of the object-side surface 432 and the image-side surface 434 are aspheric. The image-side surface 434 has an inflection point.

The fourth lens element 440 has negative refractive power and it is made of plastic material. The fourth lens element 440 has a concave object-side surface 442 and a convex image-side surface 444, and both of the object-side surface 442 and the image-side surface 444 are aspheric and have two inflection points.

The fifth lens element 450 has positive refractive power and it is made of plastic material. The fifth lens element 450 has a convex object-side surface 452 and a convex image-side surface 454, and both of the object-side surface 452 and the image-side surface 454 are aspheric. The image-side surface 454 has an inflection point.

The sixth lens element 460 has negative refractive power and it is made of plastic material. The sixth lens element 460 has a convex object-side surface 462 and a concave image-side surface 464. Hereby, the back focal length is reduced to miniaturize the lens element effectively. In addition, the object-side surface 462 has two inflection points and the image-side surface 464 has an inflection point, such that the angle of incident with incoming light from an off-axis view field can be suppressed effectively and the aberration in the off-axis view field can be corrected further.

The IR-bandstop filter 480 is made of plastic material without affecting the focal length of the optical image capturing system and it is disposed between the sixth lens element 460 and the image plane 490.

In the optical image capturing system of the fourth embodiment, a sum of focal lengths of all lens elements with positive refractive power is ΣPP. The following relation is satisfied: ΣPP=47.676 mm and f1/ΣPP=0.7537. Hereby, it is favorable for allocating the positive refractive power of a single lens element to other positive lens elements and the significant aberrations generated in the process of moving the incident light can be suppressed.

In the optical image capturing system of the fourth embodiment, a sum of focal lengths of all lens elements with negative refractive power is ΣNP. The following relation is satisfied: ΣNP=−80.546 mm and f2/ΣNP=0.423. Hereby, it is favorable for allocating the negative refractive power of a single lens element to other negative lens elements.

Please refer to the following Table 7 and Table 8.

The detailed data of the optical image capturing system of the fourth embodiment is as shown in Table 7.

TABLE 7

Data of the optical image capturing system
f = 4.111 mm; f/HEP = 1.6; HAF = 50 deg

| Surface # | | Curvature Radius | Thickness | Material | Index | Abbe # | Focal length |
|---|---|---|---|---|---|---|---|
| 0 | Object | Plano | At infinity | | | | |
| 1 | Lens 1 | 17.34656208 | 0.761 | Plastic | 1.642 | 22.46 | 35.902 |
| 2 | | 67.13151839 | 0.552 | | | | |
| 3 | Ape. stop | Plano | 0.035 | | | | |
| 4 | Lens 2 | 5.047189235 | 0.395 | Plastic | 1.642 | 22.46 | −34.078 |
| 5 | | 3.981478296 | 0.132 | | | | |
| 6 | Lens 3 | 16.68310252 | 1.200 | Plastic | 1.544 | 55.96 | 5.332 |
| 7 | | −3.435271485 | 0.400 | | | | |
| 8 | Lens 4 | −1.847104712 | 0.829 | Plastic | 1.544 | 55.96 | −14.926 |
| 9 | | −2.767193112 | 0.035 | | | | |
| 10 | Lens 5 | 59548.81632 | 0.787 | Plastic | 1.544 | 55.96 | 6.443 |
| 11 | | −3.51665046 | 0.035 | | | | |
| 12 | Lens 6 | 2.429934365 | 0.862 | Plastic | 1.642 | 22.46 | −31.543 |
| 13 | | 1.868748779 | 1.192 | | | | |
| 14 | IR-bandstop filter | Plano | 0.200 | BK_7 | 1.517 | 64.13 | |
| 15 | | Plano | 1.097 | | | | |
| 16 | Image plane | Plano | | | | | |

Reference wavelength (d-line) = 555 nm

As for the parameters of the aspheric surfaces of the fourth embodiment, reference is made to Table 8.

TABLE 8

Aspheric Coefficients

| Surface # | 1 | 2 | 4 | 5 | 6 | 7 | 8 |
|---|---|---|---|---|---|---|---|
| k | 5.554860E−02 | 1.395180E−09 | −2.588400E−10 | 1.650050E−09 | −6.200000E−01 | −5.516332E−01 | −5.127197E−01 |
| A4 | 9.903745E−03 | 1.835753E−02 | −1.814708E−02 | 4.519014E−04 | 1.534036E−02 | 3.827013E−03 | 4.677542E−02 |
| A6 | 5.268991E−05 | −1.628823E−03 | −6.386123E−03 | −1.637551E−02 | −7.588269E−04 | 6.392777E−03 | 4.704409E−03 |
| A8 | 1.339594E−05 | 1.133817E−05 | −1.679457E−03 | 4.872018E−03 | 4.351936E−06 | −7.161817E−04 | −7.474037E−04 |
| A10 | 0.000000E+00 | 0.000000E+00 | 0.000000E+00 | −8.428907E−04 | 0.000000E+00 | 0.000000E+00 | 0.000000E+00 |
| A12 | 0.000000E+00 | 0.000000E+00 | 0.000000E+00 | 0.000000E+00 | 0.000000E+00 | 0.000000E+00 | 0.000000E+00 |
| A14 | 0.000000E+00 | 0.000000E+00 | 0.000000E+00 | 0.000000E+00 | 0.000000E+00 | 0.000000E+00 | 0.000000E+00 |
| A16 | 0.000000E+00 | 0.000000E+00 | 0.000000E+00 | 0.000000E+00 | 0.000000E+00 | 0.000000E+00 | 0.000000E+00 |

| Surface # | 9 | 10 | 11 | 12 | 13 |
|---|---|---|---|---|---|
| k | −2.150950E−01 | 1.075242E−06 | −5.600000E−13 | −7.074972E−01 | −9.147335E−01 |
| A4 | −1.186631E−02 | −2.111275E−02 | 1.405716E−02 | −1.780381E−02 | −2.779886E−02 |
| A6 | 6.444206E−03 | 3.278762E−03 | −4.191465E−03 | −9.001808E−04 | 1.226077E−03 |
| A8 | −4.255366E−04 | −2.485104E−04 | 4.942612E−04 | 5.914431E−05 | −3.324507E−05 |
| A10 | 0.000000E+00 | 5.217018E−06 | 0.000000E+00 | 1.641048E−07 | 1.730271E−07 |
| A12 | 0.000000E+00 | 0.000000E+00 | 0.000000E+00 | 0.000000E+00 | 0.000000E+00 |
| A14 | 0.000000E+00 | 0.000000E+00 | 0.000000E+00 | 0.000000E+00 | 0.000000E+00 |
| A16 | 0.000000E+00 | 0.000000E+00 | 0.000000E+00 | 0.000000E+00 | 0.000000E+00 |

The presentation of the aspheric surface formula in the fourth embodiment is similar to that in the first embodiment. Besides the definitions of parameters in following tables are equal to those in the first embodiment so the repetitious details will not be given here.

The following contents may be deduced from Table 7 and Table 8.

Fourth embodiment (Primary reference wavelength: 587.5 nm)

| |f/f1| | |f/f2| | |f/f3| | |f/f4| | |f/f5| | |f/f6| |
|---|---|---|---|---|---|
| 0.11452 | 0.12065 | 0.77112 | 0.27546 | 0.63812 | 0.13034 |

| Σ PPR | Σ NPR | Σ PPR/|Σ NPR| | IN12/f | IN56/f | TP4/(IN34 + TP4 + IN45) |
|---|---|---|---|---|---|
| 1.52376 | 0.52646 | 2.89437 | 0.14267 | 0.00851 | 0.65563 |

| |f1/f2| | |f2/f3| | (TP1 + IN12)/TP2 | | (TP6 + IN56)/TP5 | |
|---|---|---|---|---|---|
| 1.05352 | 6.39138 | 3.41260 | | 1.14018 | |

Fourth embodiment (Primary reference wavelength: 587.5 nm)

| HOS | InTL | HOS/HOI | InS/HOS | ODT % | TDT % |
|---|---|---|---|---|---|
| 8.51142 | 6.02256 | 1.70228 | 0.84582 | 1.75704 | 1.43721 |

| HVT51 | HVT52 | HVT61 | HVT62 | HVT62/HOI | HVT62/HOS |
|---|---|---|---|---|---|
| 0.014042 | 2.57282 | 2.36839 | 3.10690 | 0.62138 | 0.36503 |

| TP2/TP3 | TP3/TP4 | InRS61 | InRS62 | |InRS61|/TP6 | |InRS62|/TP6 |
|---|---|---|---|---|---|
| 0.32899 | 1.44788 | 0.20720 | 0.55678 | 0.24032 | 0.64577 |

| PLTA | PSTA | NLTA | NSTA | SLTA | SSTA |
|---|---|---|---|---|---|
| −0.040 mm | 0.003 mm | 0.044 mm | −0.016 mm | 0.002 mm | 0.009 mm |

The numerical related to the length of outline curve is shown according to table 7 and table 8.

Fourth embodiment (Reference wavelength = 587.5 nm)

| | ARE | ½(HEP) | ARE value | ARE − ½(HEP) | 2(ARE/HEP) % | TP | ARE/TP (%) |
|---|---|---|---|---|---|---|---|
| | 11 | 1.285 | 1.287 | 0.003 | 100.20% | 0.761 | 169.26% |
| | 12 | 1.285 | 1.286 | 0.001 | 100.11% | 0.761 | 169.10% |
| | 21 | 1.285 | 1.288 | 0.003 | 100.22% | 0.395 | 326.16% |
| | 22 | 1.285 | 1.297 | 0.012 | 100.95% | 0.395 | 328.53% |
| | 31 | 1.285 | 1.288 | 0.004 | 100.28% | 1.200 | 107.37% |
| | 32 | 1.285 | 1.305 | 0.020 | 101.59% | 1.200 | 108.77% |
| | 41 | 1.285 | 1.335 | 0.050 | 103.87% | 0.829 | 161.02% |
| | 42 | 1.285 | 1.335 | 0.051 | 103.94% | 0.829 | 161.13% |
| | 51 | 1.285 | 1.286 | 0.001 | 100.06% | 0.787 | 163.38% |
| | 52 | 1.285 | 1.308 | 0.023 | 101.82% | 0.787 | 166.26% |
| | 61 | 1.285 | 1.326 | 0.041 | 103.17% | 0.862 | 153.74% |
| | 62 | 1.285 | 1.350 | 0.065 | 105.09% | 0.862 | 156.60% |

-continued

Fourth embodiment (Reference wavelength = 587.5 nm)

| ARS | EHD | ARS value | ARS − EHD | (ARS/EHD) % | TP | ARS/TP (%) |
|---|---|---|---|---|---|---|
| 11 | 2.476 | 2.599 | 0.123 | 104.97% | 0.761 | 341.70% |
| 12 | 2.045 | 2.069 | 0.024 | 101.16% | 0.761 | 271.95% |
| 21 | 1.353 | 1.356 | 0.003 | 100.25% | 0.395 | 343.56% |
| 22 | 1.682 | 1.697 | 0.015 | 100.87% | 0.395 | 429.77% |
| 31 | 1.936 | 1.967 | 0.031 | 101.62% | 1.200 | 163.93% |
| 32 | 2.097 | 2.127 | 0.031 | 101.46% | 1.200 | 177.29% |
| 41 | 2.207 | 2.271 | 0.064 | 102.89% | 0.829 | 273.98% |
| 42 | 2.353 | 2.541 | 0.188 | 108.00% | 0.829 | 306.57% |
| 51 | 2.507 | 2.551 | 0.044 | 101.75% | 0.787 | 324.24% |
| 52 | 2.631 | 2.774 | 0.143 | 105.44% | 0.787 | 352.56% |
| 61 | 3.381 | 3.553 | 0.172 | 105.09% | 0.862 | 412.09% |
| 62 | 4.181 | 4.487 | 0.306 | 107.32% | 0.862 | 520.39% |

The following contents may be deduced from Table 7 and Table 8.

Related inflection point values of fourth embodiment (Primary reference wavelength: 555 nm)

| | | | | | | | |
|---|---|---|---|---|---|---|---|
| HIF211 | 0.7565 | HIF211/HOI | 0.1513 | SGI211 | 0.0497 | |SGI211|/(|SGI211| + TP2) | 0.1118 |
| HIF221 | 0.9861 | HIF221/HOI | 0.1972 | SGI221 | 0.1130 | |SGI221|/(|SGI221| + TP2) | 0.2226 |
| HIF321 | 1.1648 | HIF321/HOI | 0.2330 | SGI321 | −0.1795 | |SGI321|/(|SGI321| + TP3) | 0.1301 |
| HIF411 | 1.0196 | HIF411/HOI | 0.2039 | SGI411 | −0.2377 | |SGI411|/(|SGI411| + TP4) | 0.2229 |
| HIF412 | 1.9786 | HIF412/HOI | 0.3957 | SGI412 | −0.4501 | |SGI412|/(|SGI412| + TP4) | 0.3520 |
| HIF421 | 1.6809 | HIF421/HOI | 0.3362 | SGI421 | −0.5306 | |SGI421|/(|SGI421| + TP4) | 0.3903 |
| HIF422 | 2.2824 | HIF422/HOI | 0.4565 | SGI422 | −0.8432 | |SGI422|/(|SGI422| + TP4) | 0.5043 |
| HIF521 | 2.0437 | HIF521/HOI | 0.4087 | SGI521 | −0.5646 | |SGI521|/(|SGI521| + TP5) | 0.4178 |
| HIF611 | 1.3736 | HIF611/HOI | 0.2747 | SGI611 | 0.3291 | |SGI611|/(|SGI611| + TP6) | 0.2762 |
| HIF612 | 3.2319 | HIF612/HOI | 0.6464 | SGI612 | 0.2927 | |SGI612|/(|SGI612| + TP6) | 0.2534 |
| HIF621 | 1.4948 | HIF621/HOI | 0.2990 | SGI621 | 0.4803 | |SGI621|/(|SGI621| + TP6) | 0.3578 |

The Fifth Embodiment (Embodiment 5)

Figure 5A:
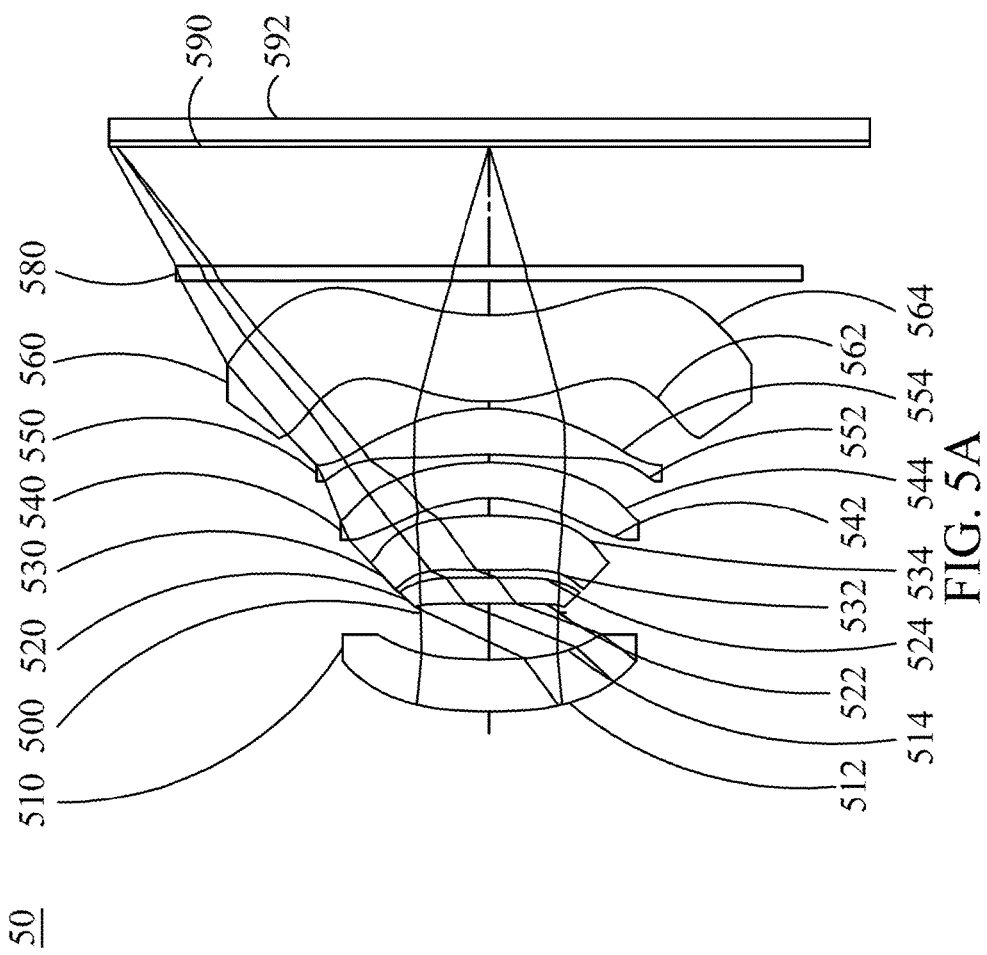
FIG. 5A is a schematic view of the optical image capturing system according to the fifth embodiment of the present application.
Figure 5B:
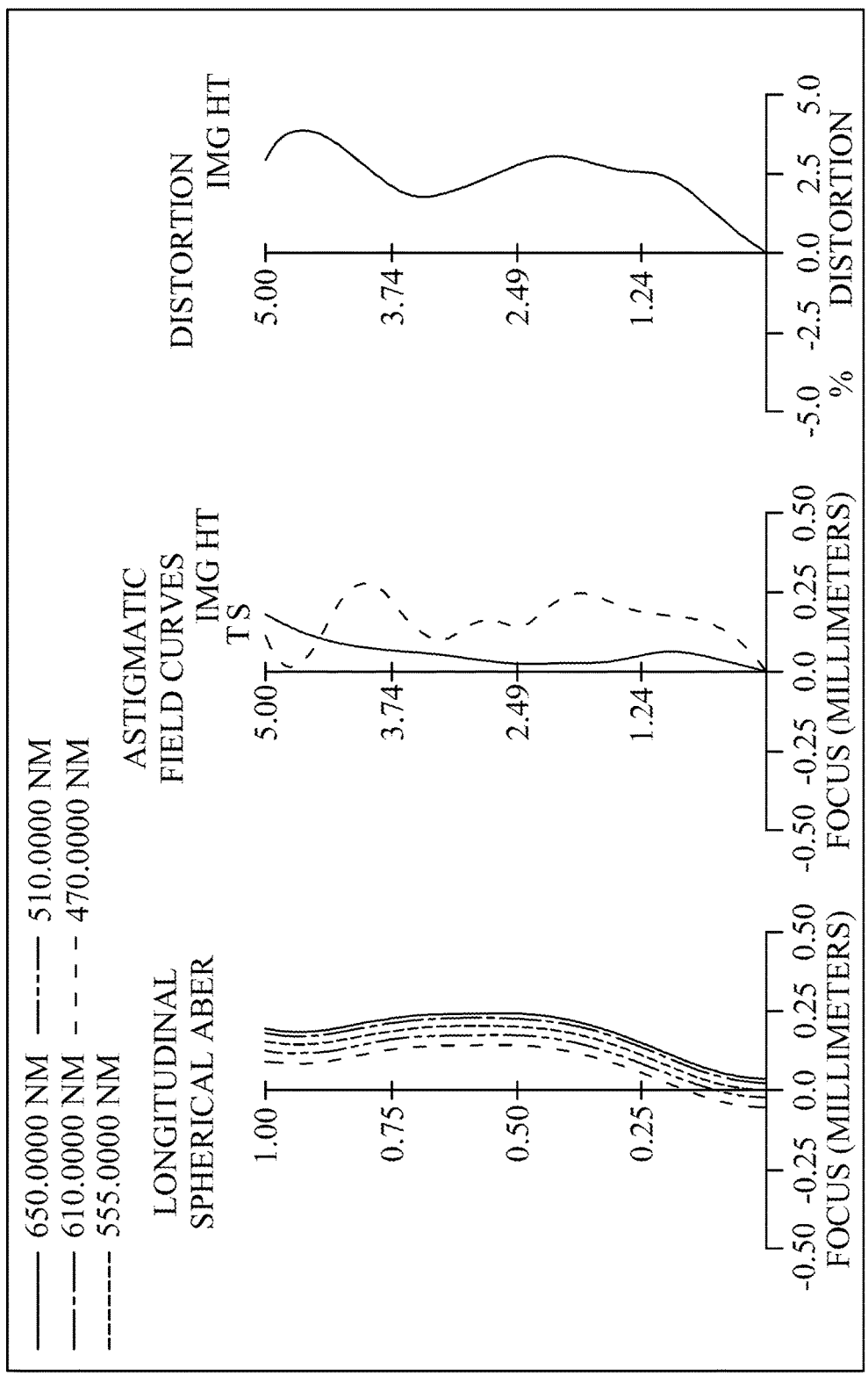
FIG. 5B is longitudinal spherical aberration curves, astigmatic field curves, and an optical distortion grid of the optical image capturing system in the order from left to right according to the fifth embodiment of the present application.
Figure 5C:
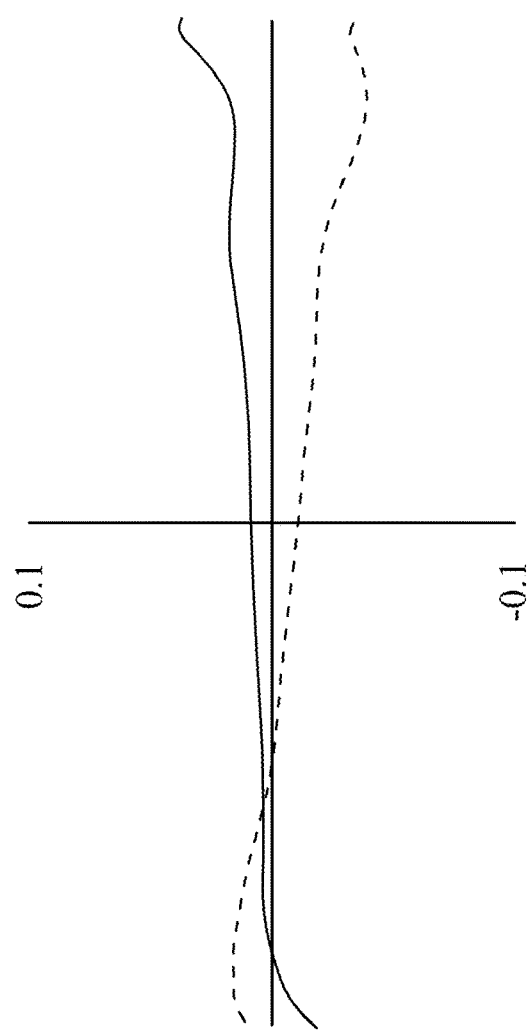
FIG. 5C is a lateral aberration diagram of tangential fan, sagittal fan, the longest operation wavelength and the shortest operation wavelength passing through an edge of the entrance pupil and incident on the image plane by 0.7 HOI according to the fifth embodiment of the present application.

Please refer to FIG. 5A, FIG. 5B and FIG. 5C, FIG. 5A is a schematic view of the optical image capturing system according to the fifth embodiment of the present application, FIG. 5B is longitudinal spherical aberration curves, astigmatic field curves, and an optical distortion curve of the optical image capturing system in the order from left to right according to the fifth embodiment of the present application, and FIG. 5C is a lateral aberration diagram of tangential fan, sagittal fan, the longest operation wavelength and the shortest operation wavelength passing through an edge of the entrance pupil and incident on the image plane by 0.7 HOI according to the fifth embodiment of the present application. As shown in FIG. 5A, in order from an object side to an image side, the optical image capturing system includes a first lens element 510, an aperture stop 500, a second lens element 520, a third lens element 530, a fourth lens element 540, a fifth lens element 550, a sixth lens element 560, an IR-bandstop filter 580, an image plane 590, and an image sensing device 592.

The first lens element 510 has positive refractive power and it is made of plastic material. The first lens element 510 has a convex object-side surface 512 and a concave image-side surface 514, and both of the object-side surface 512 and the image-side surface 514 are aspheric.

The second lens element 520 has negative refractive power and it is made of plastic material. The second lens element 520 has a convex object-side surface 522 and a concave image-side surface 524, and both of the object-side surface 522 and the image-side surface 524 are aspheric and have an inflection point.

The third lens element 530 has positive refractive power and it is made of plastic material. The third lens element 530 has a convex object-side surface 532 and a convex image-side surface 534, and both of the object-side surface 532 and the image-side surface 534 are aspheric. The object-side surface 532 has two inflection points and the image-side surface 534 has an inflection point.

The fourth lens element 540 has negative refractive power and it is made of plastic material. The fourth lens element 540 has a concave object-side surface 542 and a convex image-side surface 544, and both of the object-side surface 542 and the image-side surface 544 are aspheric and have an inflection point.

The fifth lens element 550 has positive refractive power and it is made of plastic material. The fifth lens element 550 has a concave object-side surface 552 and a convex image-side surface 554, and both of the object-side surface 552 and the image-side surface 554 are aspheric. The object-side surface 552 has three inflection points and the image-side surface 554 has an inflection point.

The sixth lens element 560 has positive refractive power and it is made of plastic material. The sixth lens element 560 has a convex object-side surface 562 and a concave image-side surface 564. Hereby, the back focal length is reduced to miniaturize the lens element effectively. In addition, the object-side surface 562 has two inflection points and the image-side surface 564 has an inflection point, such that the angle of incident with incoming light from an off-axis view field can be suppressed effectively and the aberration in the off-axis view field can be corrected further.

The IR-bandstop filter 580 is made of glass material without affecting the focal length of the optical image capturing system and it is disposed between the sixth lens element 560 and the image plane 590.

In the optical image capturing system of the fifth embodiment, a sum of focal lengths of all lens elements with positive refractive power is ΣPP. The following relation is satisfied: ΣPP=162.005 mm and f1/ΣPP=0.852. Hereby, it is favorable for allocating the positive refractive power of a single lens element to other positive lens elements and the significant aberrations generated in the process of moving the incident light can be suppressed.

In the optical image capturing system of the fifth embodiment, a sum of focal lengths of all lens elements with negative refractive power is ΣNP. The following relation is satisfied: ΣNP=−171.598 mm and f2/ΣNP=0.932. Hereby, it is favorable for allocating the negative refractive power of a single lens element to other negative lens elements.

Please refer to the following Table 9 and Table 10. The detailed data of the optical image capturing system of the fifth embodiment is as shown in Table 9.

The presentation of the aspheric surface formula in the fifth embodiment is similar to that in the first embodiment. Besides the definitions of parameters in following tables are equal to those in the first embodiment so the repetitious details will not be given here.

The following contents may be deduced from Table 9 and Table 10.

| Fifth embodiment (Primary reference wavelength: 587.5 nm) | | | | | |
|---|---|---|---|---|---|
| |f/f1| | |f/f2| | |f/f3| | |f/f4| | |f/f5| | |f/f6| |
| 0.02410 | 0.02079 | 0.45166 | 0.28666 | 0.54902 | 0.31554 |

TABLE 9

Data of the optical image capturing system
f = 3.326 mm; f/HEP = 1.7; HAF = 54.997 deg

| Surface # | | Curvature Radius | Thickness | Material | Index | Abbe # | Focal length |
|---|---|---|---|---|---|---|---|
| 0 | Object | Plano | At infinity | | | | |
| 1 | Lens 1 | 6.681753882 | 0.702 | Plastic | 1.642 | 22.46 | 138.040 |
| 2 | | 6.914548873 | 0.628 | | | | |
| 3 | Ape. Stop | Plano | 0.129 | | | | |
| 4 | Lens 2 | 82.35806969 | 0.351 | Plastic | 1.544 | 55.96 | −159.994 |
| 5 | | 42.3203389 | 0.100 | | | | |
| 6 | Lens 3 | 9.473683495 | 0.735 | Plastic | 1.544 | 55.96 | 7.365 |
| 7 | | −6.834435187 | 0.243 | | | | |
| 8 | Lens 4 | −2.128070835 | 0.490 | Plastic | 1.544 | 55.96 | −11.604 |
| 9 | | −3.545749782 | 0.100 | | | | |
| 10 | Lens 5 | −10.19254308 | 0.627 | Plastic | 1.544 | 55.96 | 6.059 |
| 11 | | −2.541819156 | 0.100 | | | | |
| 12 | Lens 6 | 2.816746668 | 1.166 | Plastic | 1.642 | 22.46 | 10.542 |
| 13 | | 4.058679118 | 0.461 | | | | |
| 14 | IR-bandstop filter | Plano | 0.200 | BK_7 | 1.517 | 64.13 | |
| 15 | | Plano | 1.620 | | | | |
| 16 | Image plane | Plano | | | | | |

Reference wavelength (d-line) = 555 nm; shield position: clear aperture (CA) of the first plano = 1.970 mm; clear aperture (CA) of the fifth plano = 1.210 mm As for the parameters of the aspheric surfaces of the fifth embodiment, reference is made to Table 10.

TABLE 10

Aspheric Coefficients

| Surface # | 1 | 2 | 4 | 5 | 6 | 7 | 8 |
|---|---|---|---|---|---|---|---|
| k | 0.000000E+00 | 0.000000E+00 | 0.000000E+00 | 0.000000E+00 | 0.000000E+00 | 0.000000E+00 | 0.000000E+00 |
| A4 | 2.835656E−02 | 6.370060E−02 | −6.180874E−02 | −8.882535E−02 | −1.237852E−01 | 2.695004E−02 | 1.205456E−01 |
| A6 | −6.233198E−03 | −6.080604E−02 | 1.930073E−01 | 8.883206E−03 | 1.375984E−01 | −2.104317E−01 | −2.742641E−01 |
| A8 | 2.677624E−03 | 8.130283E−02 | −6.381346E−01 | 1.845246E−02 | −3.811348E−01 | 2.721081E−01 | 2.883468E−01 |
| A10 | −1.186971E−04 | −7.039792E−02 | 1.192921E+00 | −7.200306E−02 | 5.357589E−01 | −2.257568E−01 | −1.468376E−01 |
| A12 | −2.920694E−04 | 3.606312E−02 | −1.325914E+00 | 3.806542E−02 | −4.678795E−01 | 1.155652E−01 | 3.964669E−02 |
| A14 | 1.065180E−04 | −9.868588E−03 | 7.983282E−01 | 9.247433E−03 | 2.123531E−01 | −3.308663E−02 | −5.422279E−03 |
| A16 | −1.154680E−05 | 1.092361E−03 | −2.058566E−01 | −8.137112E−03 | −3.627640E−02 | 3.984448E−03 | 2.970141E−04 |

| Surface # | 9 | 10 | 11 | 12 | 13 |
|---|---|---|---|---|---|
| k | 0.000000E+00 | 0.000000E+00 | −1.492782E−02 | −1.295286E−01 | −2.647596E−02 |
| A4 | 2.947361E−02 | −6.852074E−03 | 4.032468E−02 | 1.120730E−02 | 3.931182E−02 |
| A6 | −8.481391E−02 | 4.197502E−02 | −4.333732E−02 | −2.941921E−02 | −2.974786E−02 |
| A8 | 8.561316E−02 | −3.277696E−02 | 3.133523E−02 | 8.325070E−03 | 7.422920E−03 |
| A10 | −4.401118E−02 | 1.295738E−02 | −1.202019E−02 | −1.414167E−03 | −1.067041E−03 |
| A12 | 1.237212E−02 | −3.034365E−03 | 2.530156E−03 | 1.073489E−04 | 8.877732E−05 |
| A14 | −1.899300E−03 | 3.776192E−04 | −2.701599E−04 | 5.160513E−07 | −3.941874E−06 |
| A16 | 1.275659E−04 | −1.868229E−05 | 1.156612E−05 | −3.128510E−07 | 7.201570E−08 |

Fifth embodiment (Primary reference wavelength: 587.5 nm)

| ΣPPR | ΣNPR | ΣPPR/\|ΣNPR\| | IN12/f | IN56/f | TP4/(IN34 + TP4 + IN45) |
|---|---|---|---|---|---|
| 1.34031 | 0.30745 | 4.35944 | 0.22573 | 0.03006 | 0.59129 |
| \|f1/f2\| | \|f2/f3\| | (TP1 + IN12)/TP2 | | (TP6 + IN56)/TP5 | |
| 0.86278 | 21.72459 | 4.12447 | | 1.98651 | |
| HOS | InTL | HOS/HOI | InS/HOS | ODT % | TDT % |
| 7.64213 | 5.36107 | 1.52843 | 0.82688 | 3.90083 | 2.13558 |

Fifth embodiment (Primary reference wavelength: 587.5 nm)

| HVT51 | HVT52 | HVT61 | HVT62 | HVT62/HOI | HVT62/HOS |
|---|---|---|---|---|---|
| 0 | 2.29182 | 1.64543 | 2.01953 | 0.40391 | 0.26426 |
| TP2/TP3 | TP3/TP4 | InRS61 | InRS62 | \|InRS61\|/TP6 | \|InRS62\|/TP6 |
| 0.47878 | 1.47903 | −0.45322 | −0.68042 | 0.39357 | 0.59087 |
| PLTA | PSTA | NLTA | NSTA | SLTA | SSTA |
| −0.036 mm | 0.040 mm | 0.012 mm | −0.020 mm | 0.021 mm | 0.048 mm |

The numerical related to the length of outline curve is shown according to table 9 and table 10.

Fifth embodiment (Reference wavelength = 555 nm)

| ARE | 1/2(HEP) | ARE value | ARE − 1/2(HEP) | 2(ARE/HEP) % | TP | ARE/TP (%) |
|---|---|---|---|---|---|---|
| 11 | 0.979 | 0.986 | 0.006 | 100.65% | 0.702 | 140.48% |
| 12 | 0.979 | 0.988 | 0.009 | 100.89% | 0.702 | 140.80% |
| 21 | 0.979 | 0.981 | 0.002 | 100.18% | 0.351 | 279.21% |
| 22 | 0.979 | 0.986 | 0.007 | 100.73% | 0.351 | 280.76% |
| 31 | 0.979 | 0.987 | 0.008 | 100.80% | 0.735 | 134.31% |
| 32 | 0.979 | 0.991 | 0.011 | 101.17% | 0.735 | 134.80% |
| 41 | 0.979 | 1.011 | 0.031 | 103.22% | 0.490 | 206.11% |
| 42 | 0.979 | 0.993 | 0.013 | 101.37% | 0.490 | 202.42% |
| 51 | 0.979 | 0.980 | 0.000 | 100.05% | 0.627 | 156.21% |
| 52 | 0.979 | 1.000 | 0.021 | 102.12% | 0.627 | 159.45% |
| 61 | 0.979 | 0.997 | 0.018 | 101.79% | 1.166 | 85.46% |
| 62 | 0.979 | 0.992 | 0.012 | 101.26% | 1.166 | 85.01% |
| ARS | EHD | ARS value | ARS − EHD | (ARS/EHD)% | TP | ARS/TP (%) |
| 11 | 1.970 | 2.160 | 0.190 | 109.63% | 0.702 | 307.79% |
| 12 | 1.506 | 1.563 | 0.058 | 103.83% | 0.702 | 222.81% |
| 21 | 1.029 | 1.032 | 0.004 | 100.35% | 0.351 | 293.76% |
| 22 | 1.210 | 1.254 | 0.044 | 103.61% | 0.351 | 356.82% |
| 31 | 1.267 | 1.336 | 0.069 | 105.44% | 0.735 | 181.73% |
| 32 | 1.595 | 1.810 | 0.215 | 113.48% | 0.735 | 246.24% |
| 41 | 1.880 | 1.982 | 0.102 | 105.43% | 0.490 | 404.17% |
| 42 | 1.996 | 2.229 | 0.232 | 111.62% | 0.490 | 454.42% |
| 51 | 2.208 | 2.284 | 0.076 | 103.46% | 0.627 | 364.14% |
| 52 | 2.311 | 2.466 | 0.155 | 106.72% | 0.627 | 393.21% |
| 61 | 2.714 | 3.028 | 0.314 | 111.58% | 1.166 | 259.60% |
| 62 | 3.507 | 3.948 | 0.441 | 112.58% | 1.166 | 338.45% |

The following contents may be deduced from Table 9 and Table 10.

Related inflection point values of fifth embodiment (Primary reference wavelength: 555 nm)

| HIF211 | 0.1465 | HIF211/HOI | 0.0293 | SGI211 | 0.0001 | \|SGI211\|/(\|SGI211\| + TP2) | 0.0003 |
|---|---|---|---|---|---|---|---|
| HIF221 | 0.1546 | HIF221/HOI | 0.0309 | SGI221 | 0.0002 | \|SGI221\|/(\|SGI221\| + TP2) | 0.0007 |
| HIF311 | 0.2916 | HIF311/HOI | 0.0583 | SGI311 | 0.0037 | \|SGI311\|/(\|SGI311\| + TP3) | 0.0051 |
| HIF312 | 1.1870 | HIF312/HOI | 0.2374 | SGI312 | −0.1950 | \|SGI312\|/(\|SGI312\| + TP3) | 0.2097 |
| HIF321 | 1.5175 | HIF321/HOI | 0.3035 | SGI321 | −0.5421 | \|SGI321\|/(\|SGI321\| + TP3) | 0.4245 |
| HIF411 | 1.1053 | HIF411/HOI | 0.2211 | SGI411 | −0.2762 | \|SGI411\|/(\|SGI411\| + TP4) | 0.3572 |
| HIF421 | 1.8710 | HIF421/HOI | 0.3742 | SGI421 | −0.6834 | \|SGI421\|/(\|SGI421\| + TP4) | 0.5790 |
| HIF511 | 0.7033 | HIF511/HOI | 0.1407 | SGI511 | −0.0233 | \|SGI511\|/(\|SGI511\| + TP5) | 0.0357 |
| HIF512 | 1.2097 | HIF512/HOI | 0.2419 | SGI512 | −0.0457 | \|SGI512\|/(\|SGI512\| + TP5) | 0.0677 |
| HIF513 | 2.1162 | HIF513/HOI | 0.4232 | SGI513 | −0.2948 | \|SGI513\|/(\|SGI513\| + TP5) | 0.3188 |
| HIF521 | 1.7929 | HIF521/HOI | 0.3586 | SGI521 | −0.5763 | \|SGI521\|/(\|SGI521\| + TP5) | 0.4777 |
| HIF611 | 1.0277 | HIF611/HOI | 0.2055 | SGI611 | 0.1796 | \|SGI611\|/(\|SGI611\| + TP6) | 0.1349 |
| HIF612 | 2.4386 | HIF612/HOI | 0.4877 | SGI612 | −0.1839 | \|SGI612\|/(\|SGI612\| + TP6) | 0.1377 |
| HIF621 | 1.2087 | HIF621/HOI | 0.2417 | SGI621 | 0.2022 | \|SGI621\|/(\|SGI621\| + TP6) | 0.1494 |

The Sixth Embodiment (Embodiment 6)

Figure 6A:
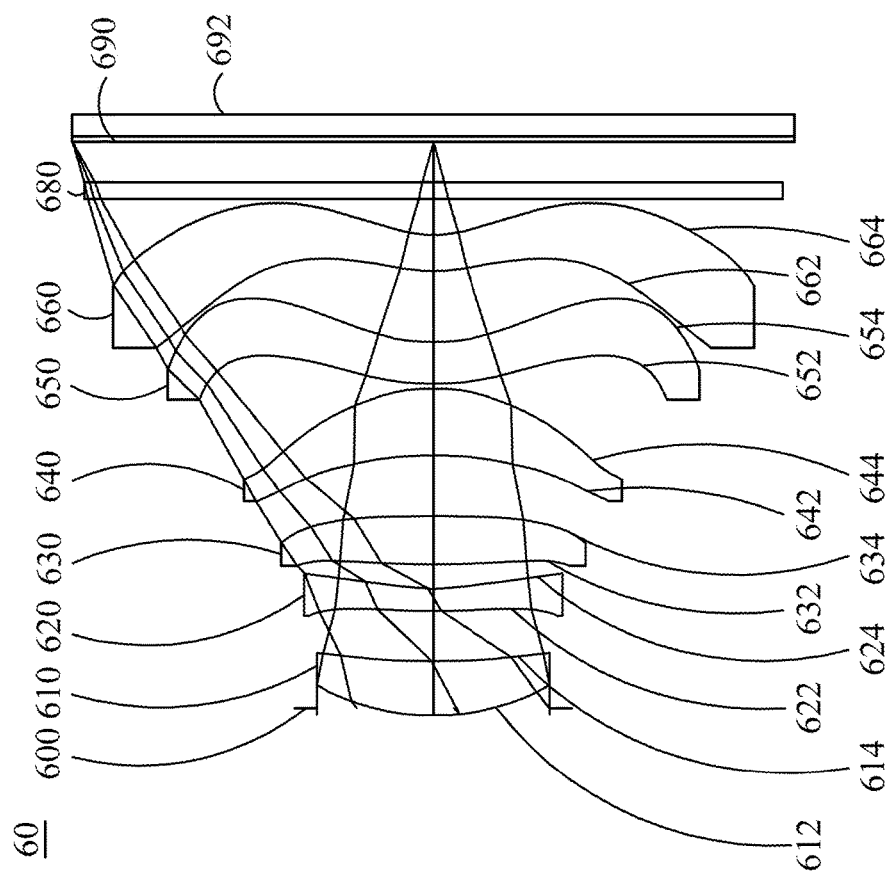
FIG. 6A is a schematic view of the optical image capturing system according to the sixth embodiment of the present application.
Figure 6B:
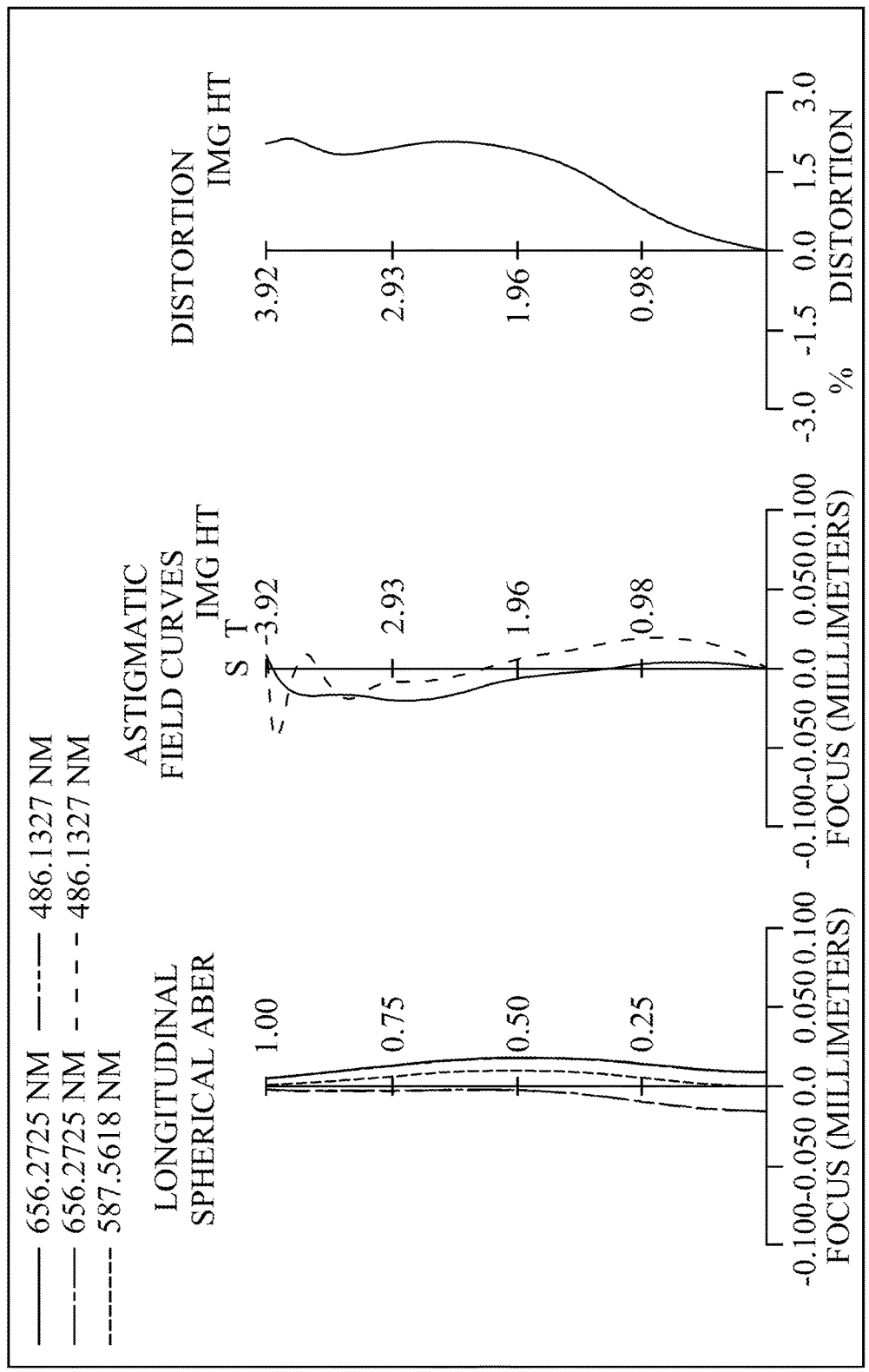
FIG. 6B is longitudinal spherical aberration curves, astigmatic field curves, and an optical distortion grid of the optical image capturing system in the order from left to right according to the sixth embodiment of the present application.
Figure 6C:
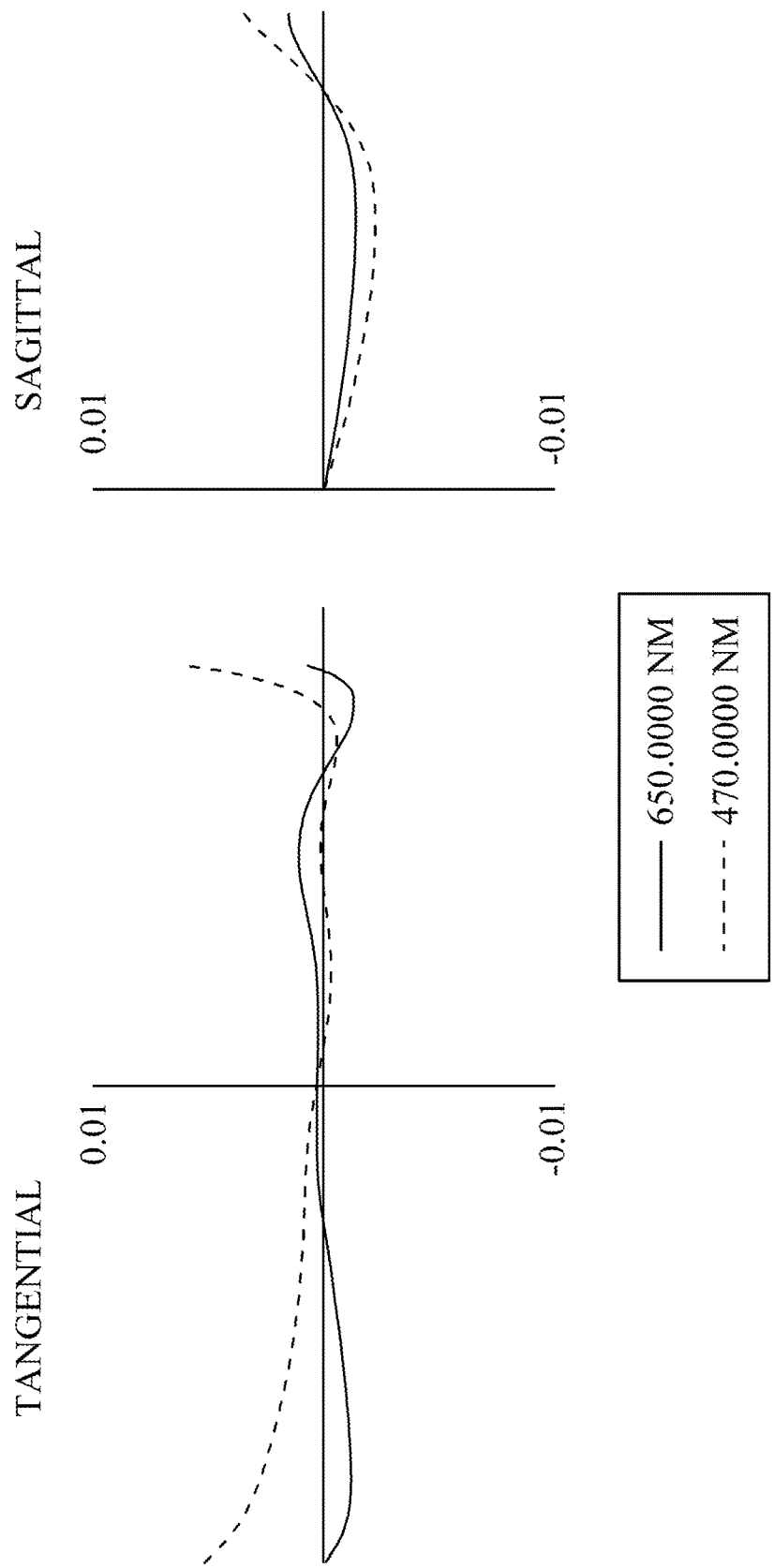
FIG. 6C is a lateral aberration diagram of tangential fan, sagittal fan, the longest operation wavelength and the shortest operation wavelength passing through an edge of the entrance pupil and incident on the image plane by 0.7 HOI according to the sixth embodiment of the present application.

Please refer to FIG. 6A, FIG. 6B and FIG. 6C, FIG. 6A is a schematic view of the optical image capturing system according to the sixth Embodiment of the present application, FIG. 6B is longitudinal spherical aberration curves, astigmatic field curves, and an optical distortion curve of the optical image capturing system in the order from left to right according to the sixth Embodiment of the present application, and FIG. 6C is a lateral aberration diagram of tangential fan, sagittal fan, the longest operation wavelength and the shortest operation wavelength passing through an edge of the entrance pupil and incident on the image plane by 0.7 HOI according to the sixth embodiment of the present application. As shown in FIG. 6A, in order from an object side to an image side, the optical image capturing system includes an aperture stop 600, a first lens element 610, a second lens element 620, a third lens element 630, a fourth lens element 640, a fifth lens element 650, a sixth lens element 660, an IR-bandstop filter 680, an image plane 690, and an image sensing device 692.

The first lens element 610 has positive refractive power and it is made of plastic material. The first lens element 610 has a convex object-side surface 612 and a concave image-side surface 614, and both of the object-side surface 612 and the image-side surface 614 are aspheric.

The second lens element 620 has negative refractive power and it is made of plastic material. The second lens element 620 has a convex object-side surface 622 and a concave image-side surface 624, and both of the object-side surface 622 and the image-side surface 624 are aspheric. The object-side surface 622 has an inflection point and the image-side surface 624 has an inflection point.

The third lens element 630 has positive refractive power and it is made of plastic material. The third lens element 630 has a convex object-side surface 632 and a convex image-side surface 634, and both of the object-side surface 632 and the image-side surface 634 are aspheric. The object-side surface 632 has an inflection point.

The fourth lens element 640 has positive refractive power and it is made of plastic material. The fourth lens element 640 has a concave object-side surface 642 and a convex image-side surface 644, and both of the object-side surface 642 and the image-side surface 644 are aspheric and have an inflection point.

The fifth lens element 650 has negative refractive power and it is made of plastic material. The fifth lens element 650 has a convex object-side surface 652 and a concave image-side surface 654, and both of the object-side surface 652 and the image-side surface 654 are aspheric and have an inflection point.

The sixth lens element 660 has negative refractive power and it is made of plastic material. The sixth lens element 660 has a convex object-side surface 662 and a concave image-side surface 664. The object-side surface 662 has three inflection points and the image-side surface 664 has an inflection point. Hereby, the back focal length is reduced to miniaturize the lens element effectively. In addition, the angle of incident with incoming light from an off-axis view field can be suppressed effectively and the aberration in the off-axis view field can be corrected further.

The IR-bandstop filter 680 is made of plastic material without affecting the focal length of the optical image capturing system and it is disposed between the sixth lens element 660 and the image plane 690.

In the optical image capturing system of the sixth embodiment, a sum of focal lengths of all lens elements with positive refractive power is ΣPP. The following relations are satisfied: ΣPP=22.243 mm and f1/ΣPP=0.294. Hereby, it is favorable for allocating the positive refractive power of a single lens element to other positive lens elements and the significant aberrations generated in the process of moving the incident light can be suppressed.

In the optical image capturing system of the sixth embodiment, a sum of focal lengths of all lens elements with negative refractive power is ΣNP. The following relations are satisfied: ΣNP=−34.287 mm and f2/ΣNP=0.278. Hereby, it is favorable for allocating the negative refractive power of a single lens element to other negative lens elements.

Please refer to the following Table 11 and Table 12.
The detailed data of the optical image capturing system of the sixth Embodiment is as shown in Table 11.

TABLE 11

Data of the optical image capturing system
f = 4.563 mm; f/HEP = 1.8; HAF = 40.000 deg

| Surface # | | Curvature Radius | Thickness | Material | Index | Abbe # | Focal length |
|---|---|---|---|---|---|---|---|
| 0 | Object | Plano | At infinity | | | | |
| 1 | Shading Sheet | Plano | 1.000 | | | | |
| 2 | Ape. stop | Plano | −0.085 | | | | |
| 3 | Lens 1 | 2.579290664 | 0.606 | Plastic | 1.565 | 58.00 | 6.549 |
| 4 | | 7.734889904 | 0.556 | | | | |
| 5 | Lens 2 | 5.556318651 | 0.253 | Plastic | 1.650 | 21.40 | −9.536 |
| 6 | | 2.888331595 | 0.269 | | | | |
| 7 | Lens 3 | 7.728664802 | 0.537 | Plastic | 1.565 | 58.00 | 10.256 |
| 8 | | −22.86501904 | 0.680 | | | | |
| 9 | Lens 4 | −4.66250381 | 0.743 | Plastic | 1.565 | 58.00 | 5.438 |
| 10 | | −1.962479007 | 0.050 | | | | |
| 11 | Lens 5 | 2.41460167 | 0.464 | Plastic | 1.583 | 30.20 | −15.936 |
| 12 | | 1.782475086 | 0.799 | | | | |
| 13 | Lens 6 | 2.078176161 | 0.397 | Plastic | 1.565 | 54.50 | −8.815 |
| 14 | | 1.366326724 | 0.400 | | | | |

TABLE 11-continued

| Data of the optical image capturing system f = 4.563 mm; f/HEP = 1.8; HAF = 40.000 deg | | | | | | |
|---|---|---|---|---|---|---|
| Surface # | Curvature Radius | Thickness | Material | Index | Abbe # | Focal length |
| 15 | IR-bandstop filter | Plano | 0.200 | BK_7 | 1.517 | 64.13 |
| 16 | | Plano | 0.445 | | | |
| 17 | Image plane | Plano | | | | |

Reference wavelength (d-line) = 555 nm; shield position: clear aperture (CA) of the first plano = 1.900 mm; clear aperture (CA) of the fifth plano = 1.350 mm As for the parameters of the aspheric surfaces of the sixth Embodiment, reference is made to Table 12.

TABLE 12

| | Aspheric Coefficients | | | | | | |
|---|---|---|---|---|---|---|---|
| Surface # | 3 | 4 | 5 | 6 | 7 | 8 | 9 |
| k | −1.965330E−01 | −5.000000E+01 | −1.977522E+01 | 1.561681E+00 | −6.455515E−01 | −1.008752E+01 | −1.265114E+01 |
| A4 | 4.026434E−03 | 1.013456E−02 | −7.128416E−02 | −9.428671E−02 | −2.599203E−02 | −2.490729E−02 | −2.979570E−02 |
| A6 | 2.336774E−03 | −2.971436E−03 | 1.975980E−02 | 2.900219E−02 | 1.157674E−03 | −2.651769E−05 | 1.626347E−03 |
| A8 | −4.089523E−04 | 9.681266E−04 | −6.821332E−03 | −8.979447E−03 | −3.039551E−04 | 3.595911E−04 | 5.929791E−04 |
| A10 | 2.399946E−04 | −3.267278E−04 | 7.492140E−04 | 1.029104E−03 | −6.128456E−04 | −4.705564E−04 | −1.404506E−05 |
| A12 | 0.000000E+00 | 0.000000E+00 | 0.000000E+00 | 0.000000E+00 | 0.000000E+00 | 0.000000E+00 | 0.000000E+00 |
| A14 | 0.000000E+00 | 0.000000E+00 | 0.000000E+00 | 0.000000E+00 | 0.000000E+00 | 0.000000E+00 | 0.000000E+00 |
| A16 | 0.000000E+00 | 0.000000E+00 | 0.000000E+00 | 0.000000E+00 | 0.000000E+00 | 0.000000E+00 | 0.000000E+00 |

| Surface # | 10 | 11 | 12 | 13 | 14 |
|---|---|---|---|---|---|
| k | −1.071704E+00 | −1.802359E+00 | −2.574175E+00 | −1.160409E+01 | −5.450052E+00 |
| A4 | −5.029708E−03 | −3.219111E−02 | −2.248485E−02 | −4.553388E−02 | −2.712084E−02 |
| A6 | −1.656088E−04 | 1.885319E−03 | 6.073019E−04 | 3.495820E−03 | 1.106529E−03 |
| A8 | −3.525839E−04 | 1.425334E−04 | −3.453233E−05 | −3.180846E−05 | 4.771164E−05 |
| A10 | 1.886284E−04 | −1.613797E−04 | −6.029119E−06 | −2.611113E−05 | −1.019275E−06 |
| A12 | 0.000000E+00 | 3.597321E−05 | 5.934568E−07 | 4.841602E−06 | −1.085111E−07 |
| A14 | 0.000000E+00 | −3.203031E−06 | −1.151533E−07 | −2.688688E−07 | −9.429300E−09 |
| A16 | 0.000000E+00 | 0.000000E+00 | 0.000000E+00 | 0.000000E+00 | 0.000000E+00 |

In the sixth Embodiment, the presentation of the aspheric surface formula is similar to that in the first embodiment. Besides, the definitions of parameters in following tables are equal to those in the first embodiment, so the repetitious details will not be given here.

The following contents may be deduced from Table 11 and Table 12.

| Sixth Embodiment (Primary reference wavelength: 555 nm) | | | | | |
|---|---|---|---|---|---|
| |f/f1| | |f/f2| | |f/f3| | |f/f4| | |f/f5| | |f/f6| |
| 0.69678 | 0.47855 | 0.44493 | 0.83919 | 0.28635 | 0.51768 |
| Σ PPR | Σ NPR | Σ PPR/|Σ NPR| | IN12/f | IN56/f | TP4/(IN34 + TP4 + IN45) |
| 1.98090 | 1.28258 | 1.54447 | 0.12194 | 0.17511 | 0.50444 |
| |f1/f2| | |f2/f3| | (TP1 + IN12)/TP2 | | (TP6 + IN56)/TP5 | |
| 0.68680 | 0.92975 | 4.58532 | | 2.57619 | |
| HOS | InTL | HOS/HOI | InS/HOS | ODT % | TDT % |
| 6.39538 | 5.35447 | 1.63439 | 0.98672 | 2.20237 | 0.32047 |

| Sixth Embodiment (Primary reference wavelength: 555 nm) | | | | | |
|---|---|---|---|---|---|
| HVT51 | HVT52 | HVT61 | HVT62 | HVT62/HOI | HVT62/HOS |
| 1.8222 | 1.98075 | 1.21254 | 1.73115 | 0.44241 | 0.27069 |
| TP2/TP3 | TP3/TP4 | InRS61 | InRS62 | |InRS61|/TP6 | |InRS62|/TP6 |
| 0.47179 | 0.72292 | −0.87802 | −0.58316 | 2.21158 | 1.46888 |
| PLTA | PSTA | NLTA | NSTA | SLTA | SSTA |
| 0.006 mm | 0.001 mm | 0.006 mm | −0.00009 mm | 0.004 mm | 0.002 mm |

The numerical related to the length of outline curve is shown according to table 11 and table 12.

| Sixth embodiment (Reference wavelength = 555 nm) | | | | | | |
|---|---|---|---|---|---|---|
| ARE | 1/2(HEP) | ARE value | ARE − 1/2(HEP) | 2(ARE/HEP) % | TP | ARE/TP (%) |
| 11 | 1.270 | 1.333 | 0.06354 | 105.00% | 0.606 | 220.17% |
| 12 | 1.270 | 1.274 | 0.00440 | 100.35% | 0.606 | 210.41% |
| 21 | 1.270 | 1.273 | 0.00358 | 100.28% | 0.253 | 502.45% |
| 22 | 1.270 | 1.279 | 0.00975 | 100.77% | 0.253 | 504.88% |
| 31 | 1.270 | 1.270 | 0.00042 | 100.03% | 0.537 | 236.46% |
| 32 | 1.270 | 1.277 | 0.00710 | 100.56% | 0.537 | 237.70% |
| 41 | 1.270 | 1.294 | 0.02450 | 101.93% | 0.743 | 174.18% |
| 42 | 1.270 | 1.358 | 0.08801 | 106.93% | 0.743 | 182.73% |
| 51 | 1.270 | 1.296 | 0.02619 | 102.06% | 0.464 | 279.11% |
| 52 | 1.270 | 1.319 | 0.04928 | 103.88% | 0.464 | 284.08% |
| 61 | 1.270 | 1.278 | 0.00870 | 100.69% | 0.397 | 322.00% |
| 62 | 1.270 | 1.309 | 0.03926 | 103.09% | 0.397 | 329.70% |
| ARS | EHD | ARS value | ARS − EHD | (ARS/EHD)% | TP | ARS/TP (%) |
| 11 | 1.385 | 1.474 | 0.088 | 106.37% | 0.606 | 243.38% |
| 12 | 1.361 | 1.366 | 0.005 | 100.40% | 0.606 | 225.59% |
| 21 | 1.350 | 1.357 | 0.007 | 100.49% | 0.253 | 535.36% |
| 22 | 1.505 | 1.517 | 0.012 | 100.82% | 0.253 | 598.79% |
| 31 | 1.545 | 1.556 | 0.010 | 100.67% | 0.537 | 289.66% |
| 32 | 1.701 | 1.776 | 0.075 | 104.42% | 0.537 | 330.74% |
| 41 | 1.959 | 2.054 | 0.095 | 104.83% | 0.743 | 276.41% |
| 42 | 2.076 | 2.368 | 0.292 | 114.05% | 0.743 | 318.72% |
| 51 | 2.555 | 2.830 | 0.275 | 110.75% | 0.464 | 609.53% |
| 52 | 2.893 | 3.367 | 0.475 | 116.41% | 0.464 | 725.25% |
| 61 | 3.021 | 3.347 | 0.326 | 110.79% | 0.397 | 843.15% |
| 62 | 3.479 | 3.833 | 0.353 | 110.15% | 0.397 | 965.39% |

The following contents may be deduced from Table 11 and Table 12.

| Related inflection point values of sixth Embodiment (Primary reference wavelength: 555 nm) | | | | | | | |
|---|---|---|---|---|---|---|---|
| HIF211 | 0.4489 | HIF211/HOI | 0.1147 | SGI211 | 0.0149 | \| SGI211 \|/(\| SGI211 \| + TP2) | 0.0554 |
| HIF221 | 0.7922 | HIF221/HOI | 0.2025 | SGI221 | 0.0832 | \| SGI221 \|/(\| SGI221 \| + TP2) | 0.2472 |
| HIF222 | 1.3566 | HIF222/HOI | 0.3467 | SGI222 | 0.1641 | \| SGI222 \|/(\| SGI222 \| + TP2) | 0.3931 |
| HIF311 | 0.6531 | HIF311/HOI | 0.1669 | SGI311 | 0.0230 | \| SGI311 \|/(\| SGI311 \| + TP3) | 0.0410 |
| HIF411 | 1.6839 | HIF411/HOI | 6.4303 | SGI411 | −0.4018 | \| SGI411 \|/(\| SGI411 \| + TP4) | 0.3510 |
| HIF421 | 1.6943 | HIF421/HOI | 0.4330 | SGI421 | −0.7544 | \| SGI421 \|/(\| SGI421 \| + TP4) | 0.5038 |
| HIF511 | 1.0132 | HIF511/HOI | 0.2589 | SGI511 | 0.1737 | \| SGI511 \|/(\| SGI511 \| + TP5) | 0.2722 |
| HIF521 | 1.0665 | HIF521/HOI | 0.2726 | SGI521 | 0.2553 | \| SGI521 \|/(\| SGI521 \| + TP5) | 0.3548 |
| HIF611 | 0.6028 | HIF611/HOI | 0.1541 | SGI611 | 0.0678 | \| SGI611 \|/(\| SGI611 \| + TP6) | 0.1458 |
| HIF612 | 2.6002 | HIF612/HOI | 0.6645 | SGI612 | −0.5213 | \| SGI612 \|/(\| SGI612 \| + TP6) | 0.5677 |
| HIF613 | 2.7986 | HIF613/HOI | 0.7152 | SGI613 | −0.6859 | \| SGI613 \|/(\| SGI613 \| + TP6) | 0.6334 |
| HIF621 | 0.7866 | HIF621/HOI | 0.2010 | SGI621 | 0.1659 | \| SGI621 \|/(\| SGI621 \| + TP6) | 0.2947 |

The Seventh Embodiment (Embodiment 7)

Figure 7A:
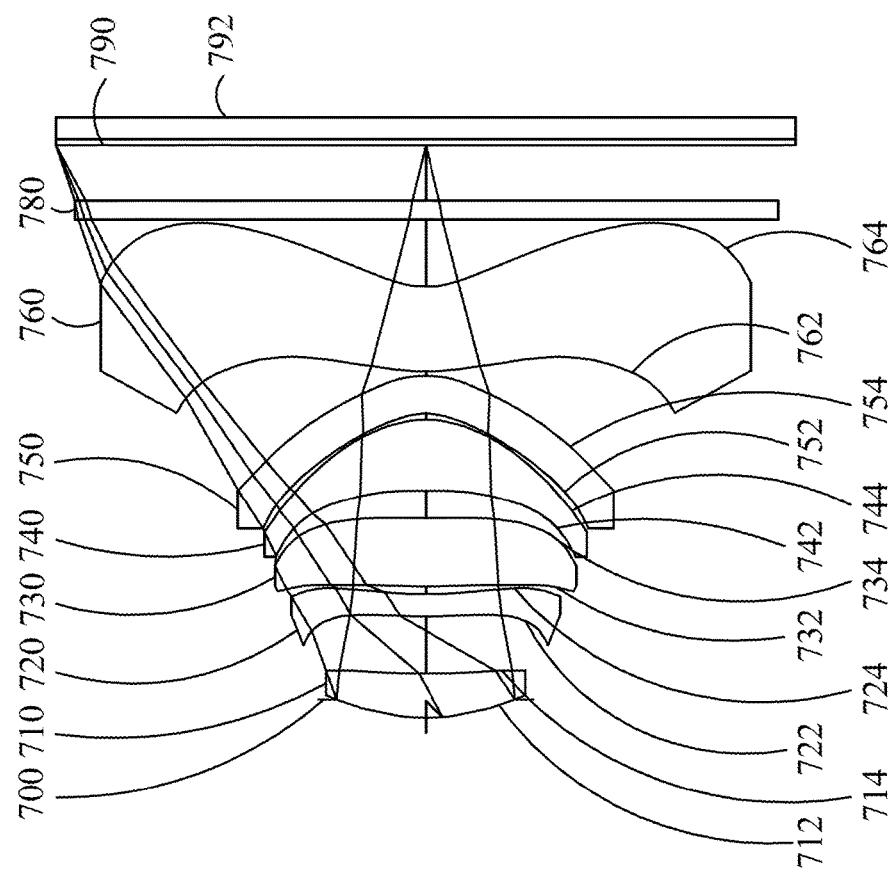
FIG. 7A is a schematic view of the optical image capturing system according to the seventh embodiment of the present application.
Figure 7B:
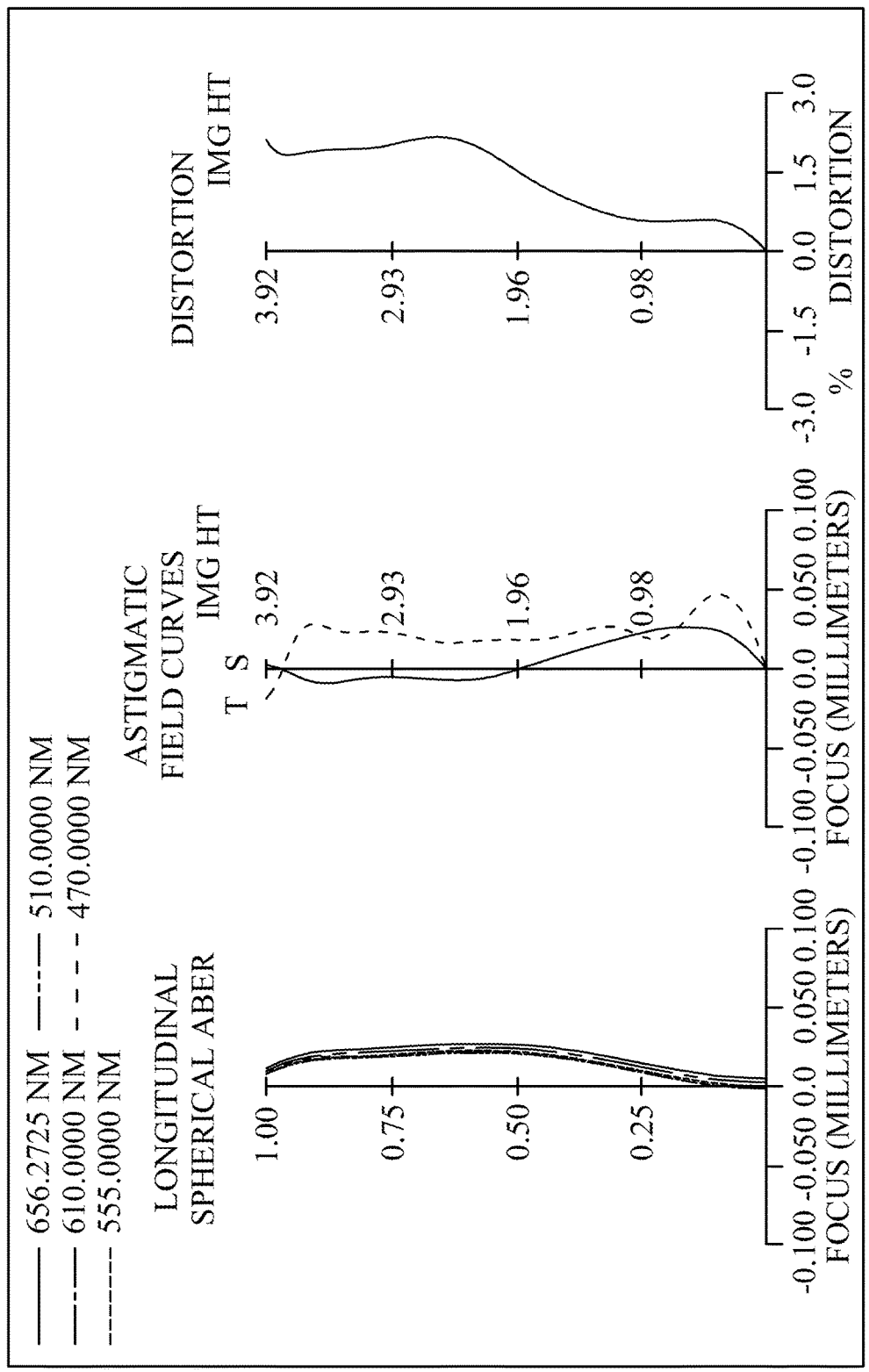
FIG. 7B is longitudinal spherical aberration curves, astigmatic field curves, and an optical distortion grid of the optical image capturing system in the order from left to right according to the seventh embodiment of the present application.
Figure 7C:
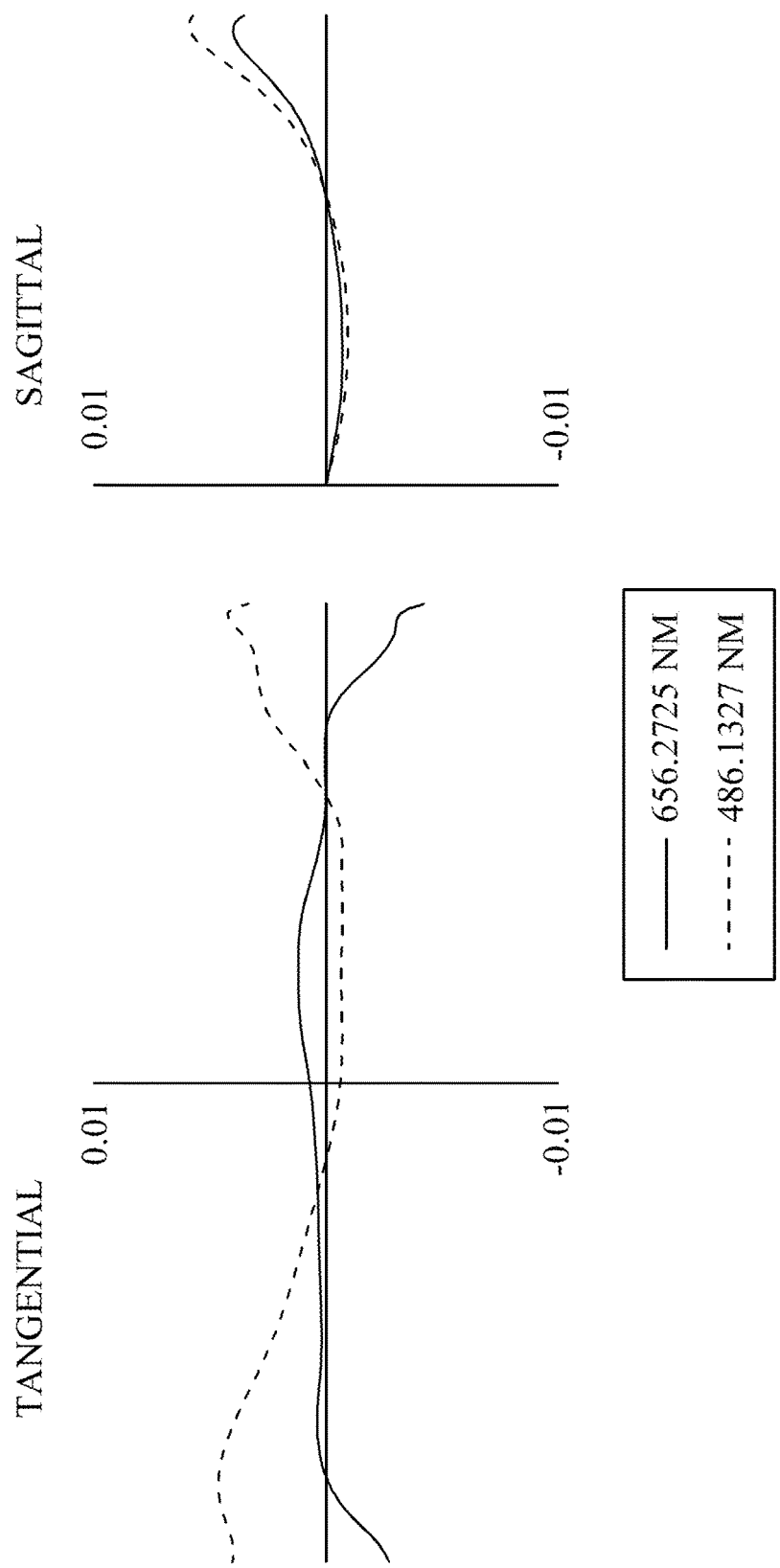
FIG. 7C is a lateral aberration diagram of tangential fan, sagittal fan, the longest operation wavelength and the shortest operation wavelength passing through an edge of the entrance pupil and incident on the image plane by 0.7 HOI according to the seventh embodiment of the present application.

Please refer to FIG. 7A, FIG. 7B and FIG. 7C, FIG. 7A is a schematic view of the optical image capturing system according to the seventh Embodiment of the present application, FIG. 7B is longitudinal spherical aberration curves, astigmatic field curves, and an optical distortion curve of the optical image capturing system in the order from left to right according to the seventh Embodiment of the present application, and FIG. 7C is a lateral aberration diagram of tangential fan, sagittal fan, the longest operation wavelength and the shortest operation wavelength passing through an edge of the entrance pupil and incident on the image plane by 0.7 HOI according to the seventh embodiment of the present application. As shown in FIG. 7A, in order from an object side to an image side, thee optical image capturing system includes an aperture stop 700, a first lens element 710, a second lens element 720, a third lens element 730, a fourth lens element 740, a fifth lens element 750, a sixth lens element 760, an IR-bandstop filter 780, an image plane 790, and an image sensing device 792.

The first lens element 710 has positive refractive power and it is made of plastic material. The first lens element 710 has a convex object-side surface 712 and a concave image-side surface 714, and both of the object-side surface 712 and the image-side surface 714 are aspheric. The image-side surface 714 has an inflection point.

The second lens element 720 has negative refractive power and it is made of plastic material. The second lens element 720 has a convex object-side surface 722 and a concave image-side surface 724, and both of the object-side surface 722 and the image-side surface 724 are aspheric and have an inflection point.

The third lens element 730 has positive refractive power and it is made of plastic material. The third lens element 730 has a convex object-side surface 732 and a convex image-side surface 734, and both of the object-side surface 732 and the image-side surface 734 are aspheric. The object-side surface 732 has an inflection point.

The fourth lens element 740 has positive refractive power and it is made of plastic material. The fourth lens element 740 has a concave object-side surface 742 and a convex image-side surface 744, and both of the object-side surface 742 and the image-side surface 744 are aspheric. The image-side surface 744 has an inflection point.

The fifth lens element 750 has negative refractive power and it is made of plastic material. The fifth lens element 750 has a concave object-side surface 752 and a convex image-side surface 754, and both of the object-side surface 752 and the image-side surface 754 are aspheric. The image-side surface 754 has an inflection point.

The sixth lens element 760 has negative refractive power and it is made of plastic material. The sixth lens element 760 has a convex object-side surface 762 and a concave image-side surface 764. The object-side surface 762 and the image-side surface 764 both have an inflection point. Hereby, the back focal length is reduced to miniaturize the lens element effectively. In addition, the angle of incident with incoming light from an off-axis view field can be suppressed effectively and the aberration in the off-axis view field can be corrected further.

The IR-bandstop filter 780 is made of glass material without affecting the focal length of the optical image capturing system and it is disposed between the sixth lens element 760 and the image plane 790.

In the optical image capturing system of the seventh embodiment, a sum of focal lengths of all lens elements with positive refractive power is ΣPP. The following relations are satisfied: ΣPP=19.725 mm and f1/ΣPP=0.314. Hereby, it is favorable for allocating the positive refractive power of a single lens element to other positive lens elements and the significant aberrations generated in the process of moving the incident light can be suppressed.

In the optical image capturing system of the seventh embodiment, a sum of focal lengths of all lens elements with negative refractive power ΣNP. The following relations are satisfied: ΣNP=−30.530 mm and f2/ΣNP=0.376. Hereby, it is favorable for allocating the negative refractive power of a single lens element to other negative lens elements.

Please refer to the following Table 13 and Table 14.

The detailed data of the optical image capturing system of the seventh Embodiment is as shown in Table 13.

TABLE 13

Data of the optical image capturing system
f = 3.826 mm; f/HEP = 2.0; HAF = 45.011 deg

| Surface # | | Curvature Radius | Thickness | Material | Index | Abbe # | Focal length |
|---|---|---|---|---|---|---|---|
| 0 | Object | Plano | At infinity | | | | |
| 1 | Ape. stop | Plano | −0.177 | | | | |
| 2 | Lens 1 | 2.451628472 | 0.456 | Plastic | 1.565 | 58 | 6.2089 |
| 3 | | 7.593955211 | 0.605 | | | | |
| 4 | Lens 2 | 9.20476938 | 0.230 | Plastic | 1.65 | 21.4 | −11.5891 |
| 5 | | 4.101911628 | 0.081 | | | | |
| 6 | Lens 3 | 8.266818278 | 0.720 | Plastic | 1.565 | 58 | 11.1367 |
| 7 | | −25.5153165 | 0.284 | | | | |
| 8 | Lens 4 | −4.110161954 | 0.741 | Plastic | 1.565 | 58 | 2.4422 |
| 9 | | −1.10031385 | 0.057 | | | | |
| 10 | Lens 5 | −0.852339838 | 0.399 | Plastic | 1.65 | 21.4 | −14.5421 |
| 11 | | −1.109749857 | 0.050 | | | | |
| 12 | Lens 6 | 2.197528479 | 0.892 | Plastic | 1.583 | 30.2 | −4.5196 |
| 13 | | 1.019069274 | 0.700 | | | | |
| 14 | IR-bandstop filter | Plano | 0.200 | BK_7 | 1.517 | 64.13 | |
| 15 | | Plano | 0.581 | | | | |
| 16 | Image plane | Plano | | | | | |

Reference wavelength (d-line) = 555 nm

As for the parameters of the aspheric surfaces of the seventh Embodiment, reference is made to Table 14.

TABLE 14

Aspheric Coefficients

| Surface # | 2 | 3 | 4 | 5 | 6 | 7 | 8 |
|---|---|---|---|---|---|---|---|
| k | −6.708971E+00 | 2.366389E−01 | −5.000000E+01 | −2.108209E+01 | −5.000000E+01 | 5.000000E+01 | −8.505141E+00 |
| A4 | 5.687816E−02 | −8.721802E−03 | −5.793894E−02 | −4.239361E−02 | −4.739335E−02 | −3.104705E−02 | −3.653360E−02 |
| A6 | −2.726341E−02 | −1.657761E−02 | −1.055616E−02 | 1.344941E−02 | 9.539779E−03 | −4.275211E−03 | −7.299408E−04 |
| A8 | 1.566366E−02 | 9.455618E−03 | −4.356157E−03 | −1.287968E−02 | 4.180823E−03 | −1.116079E−03 | −2.048637E−03 |
| A10 | −1.079401E−02 | −1.226395E−02 | −9.042318E−03 | 2.260505E−03 | −1.936540E−03 | −1.320171E−03 | −1.322170E−03 |
| A12 | 0.000000E+00 | 0.000000E+00 | 0.000000E+00 | 0.000000E+00 | 0.000000E+00 | 0.000000E+00 | 0.000000E+00 |
| A14 | 0.000000E+00 | 0.000000E+00 | 0.000000E+00 | 0.000000E+00 | 0.000000E+00 | 0.000000E+00 | 0.000000E+00 |
| A16 | 0.000000E+00 | 0.000000E+00 | 0.000000E+00 | 0.000000E+00 | 0.000000E+00 | 0.000000E+00 | 0.000000E+00 |

| Surface # | 9 | 10 | 11 | 12 | 13 |
|---|---|---|---|---|---|
| k | −3.098627E+00 | −3.307933E+00 | −2.965300E+00 | −1.896969E+01 | −4.723456E+00 |
| A4 | −5.896215E−02 | −3.670965E−02 | −1.310974E−02 | −2.075990E−02 | −1.628749E−02 |
| A6 | 8.525515E−04 | 5.668904E−03 | 8.713727E−04 | 1.455101E−03 | 2.125293E−03 |
| A8 | 2.330987E−03 | −2.711504E−04 | −4.868056E−04 | −5.434359E−04 | −2.267018E−04 |
| A10 | −5.259619E−04 | −2.036266E−04 | −9.688778E−05 | 2.943673E−05 | 2.292451E−06 |
| A12 | 0.000000E+00 | −4.185495E−05 | −1.134496E−05 | 1.910955E−05 | 1.263752E−06 |

TABLE 14-continued

| Aspheric Coefficients | | | | | |
|---|---|---|---|---|---|
| A14 | 0.000000E+00 | −6.120895E−05 | 1.120284E−05 | −2.291830E−06 | −7.065258E−08 |
| A16 | 0.000000E+00 | 0.000000E+00 | 0.000000E+00 | 0.000000E+00 | 0.000000E+00 |

In the seventh Embodiment, the presentation of the aspheric surface formula is similar to that in the first embodiment. Besides, the definitions of parameters in following tables are equal to those in the first embodiment, so the repetitious details will not be given here.

The following contents may be deduced from Table 13 and Table 14.

| Seventh Embodiment (Primary reference wavelength: 555 nm) | | | | | |
|---|---|---|---|---|---|
| \|f/f1\| | \|f/f2\| | \|f/f3\| | \|f/f4\| | \|f/f5\| | \|f/f6\| |
| 0.61819 | 0.33287 | 0.34463 | 1.57178 | 0.26319 | 0.85036 |
| Σ PPR | Σ NPR | Σ PPR/\|Σ NPR\| | IN12/f | IN56/f | TP4/(IN34 + TP4 + IN45) |
| 2.53460 | 1.44642 | 1.75233 | 0.15820 | 0.01307 | 0.68454 |
| \|f1/f2\| | \|f2/f3\| | (TP1 + IN12)/TP2 | | (TP6 + IN56)/TP5 | |
| 0.53846 | 1.03532 | 4.61583 | | 2.35880 | |

| Seventh Embodiment (Primary reference wavelength: 555 nm) | | | | | |
|---|---|---|---|---|---|
| HOS | InTL | HOS/HOI | InS/HOS | ODT % | TDT % |
| 5.99858 | 4.51664 | 1.53260 | 0.97041 | 2.13021 | 0.335779 |
| HVT51 | HVT52 | HVT61 | HVT62 | HVT62/HOI | HVT62/HOS |
| 0 | 0 | 1.41631 | 2.38961 | 0.61053 | 0.39836 |
| TP2/TP3 | TP3/TP4 | InRS61 | InRS62 | \|InRS61\|/TP6 | \|InRS62\|/TP6 |
| 0.31962 | 0.97083 | −0.27838 | 0.02112 | 0.31204 | 0.02368 |
| PLTA | PSTA | NLTA | NSTA | SLTA | SSTA |
| 0.004 mm | −0.005 mm | 0.005 mm | −0.003 mm | 0.006 mm | 0.003 mm |

The numerical related to the length of outline curve is shown according to table 13 and table 14.

| Seventh embodiment (Reference wavelength = 555 nm) | | | | | | |
|---|---|---|---|---|---|---|
| ARE | 1/2(HEP) | ARE value | ARE − 1/2(HEP) | 2(ARE/HEP) % | TP | ARE/TP (%) |
| 11 | 0.957 | 0.981 | 0.02386 | 102.49% | 0.456 | 215.00% |
| 12 | 0.957 | 0.958 | 0.00070 | 100.07% | 0.456 | 209.92% |
| 21 | 0.957 | 0.959 | 0.00212 | 100.22% | 0.230 | 417.15% |
| 22 | 0.957 | 0.959 | 0.00178 | 100.19% | 0.230 | 417.00% |
| 31 | 0.957 | 0.957 | −0.00005 | 99.99% | 0.720 | 133.03% |
| 32 | 0.957 | 0.959 | 0.00211 | 100.22% | 0.720 | 133.32% |
| 41 | 0.957 | 0.971 | 0.01342 | 101.40% | 0.741 | 130.96% |
| 42 | 0.957 | 1.041 | 0.08413 | 108.79% | 0.741 | 140.50% |
| 51 | 0.957 | 1.046 | 0.08916 | 109.31% | 0.399 | 262.01% |
| 52 | 0.957 | 1.025 | 0.06766 | 107.07% | 0.399 | 256.63% |
| 61 | 0.957 | 0.965 | 0.00791 | 100.83% | 0.892 | 108.19% |
| 62 | 0.957 | 1.003 | 0.04614 | 104.82% | 0.892 | 112.48% |
| ARS | EHD | ARS value | ARS − EHD | (ARS/EHD)% | TP | ARS/TP (%) |
| 11 | 0.975 | 1.000 | 0.025 | 102.58% | 0.456 | 219.21% |
| 12 | 1.054 | 1.055 | 0.001 | 100.07% | 0.456 | 231.22% |
| 21 | 1.202 | 1.246 | 0.044 | 103.67% | 0.230 | 541.80% |
| 22 | 1.420 | 1.435 | 0.015 | 101.04% | 0.230 | 623.80% |
| 31 | 1.475 | 1.477 | 0.002 | 100.13% | 0.720 | 205.22% |
| 32 | 1.592 | 1.773 | 0.181 | 111.40% | 0.720 | 246.40% |
| 41 | 1.581 | 1.836 | 0.255 | 116.13% | 0.741 | 247.72% |
| 42 | 1.709 | 2.163 | 0.454 | 126.56% | 0.741 | 291.87% |
| 51 | 1.714 | 2.172 | 0.458 | 126.74% | 0.399 | 543.90% |
| 52 | 1.989 | 2.379 | 0.390 | 119.60% | 0.399 | 595.68% |
| 61 | 2.535 | 2.661 | 0.125 | 104.95% | 0.892 | 298.23% |
| 62 | 3.445 | 3.806 | 0.361 | 110.48% | 0.892 | 426.63% |

The following contents may be deduced from Table 13 and Table 14.

| Related inflection point values of seventh Embodiment (Primary reference wavelength: 555 nm) | | | | | | | |
|---|---|---|---|---|---|---|---|
| HIF121 | 0.6570 | HIF121/HOI | 0.1678 | SGI121 | 0.0257 | SGI121 \|/(\| SGI121 \| + TP1) | 0.0533 |
| HIF211 | 0.3620 | HIF211/HOI | 0.0925 | SGI211 | 0.0060 | SGI211 \|/(\| SGI211 \| + TP2) | 0.0233 |
| HIF221 | 0.5754 | HIF221/HOI | 0.1470 | SGI221 | 0.0327 | SGI221 \|/(\| SGI221 \| + TP2) | 0.1245 |
| HIF311 | 0.4435 | HIF311/HOI | 0.1133 | SGI311 | 0.0097 | SGI311 \|/(\| SGI311 \| + TP3) | 0.0134 |
| HIF521 | 1.8502 | HIF521/HOI | 0.4727 | SGI521 | −1.0585 | SGI521 \|/(\| SGI521 \| + TP5) | 0.7260 |
| HIF611 | 0.6678 | HIF611/HOI | 0.1706 | SGI611 | 0.0731 | SGI611 \|/(\| SGI611 \| + TP6) | 0.0757 |
| HIF621 | 0.9079 | HIF621/HOI | 0.2320 | SGI621 | 0.2606 | SGI621 \|/(\| SGI621 \| + TP6) | 0.2261 |

The Eighth Embodiment (Embodiment 8)

Figure 8A:
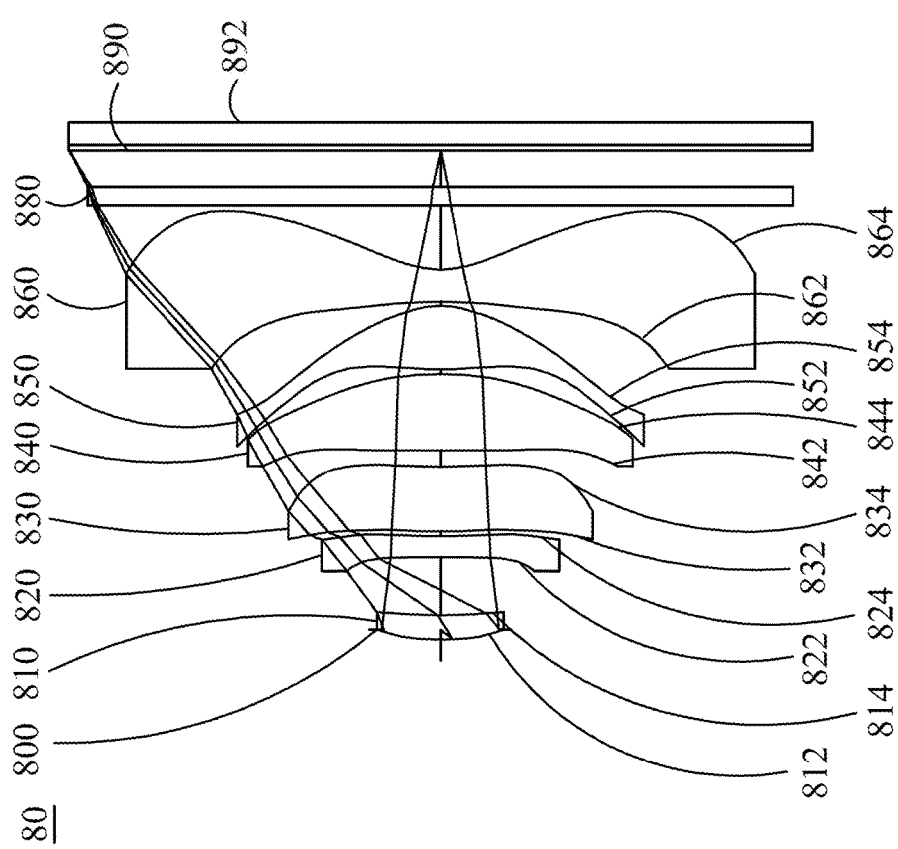
FIG. 8A is a schematic view of the optical image capturing system according to the eighth embodiment of the present application.
Figure 8B:
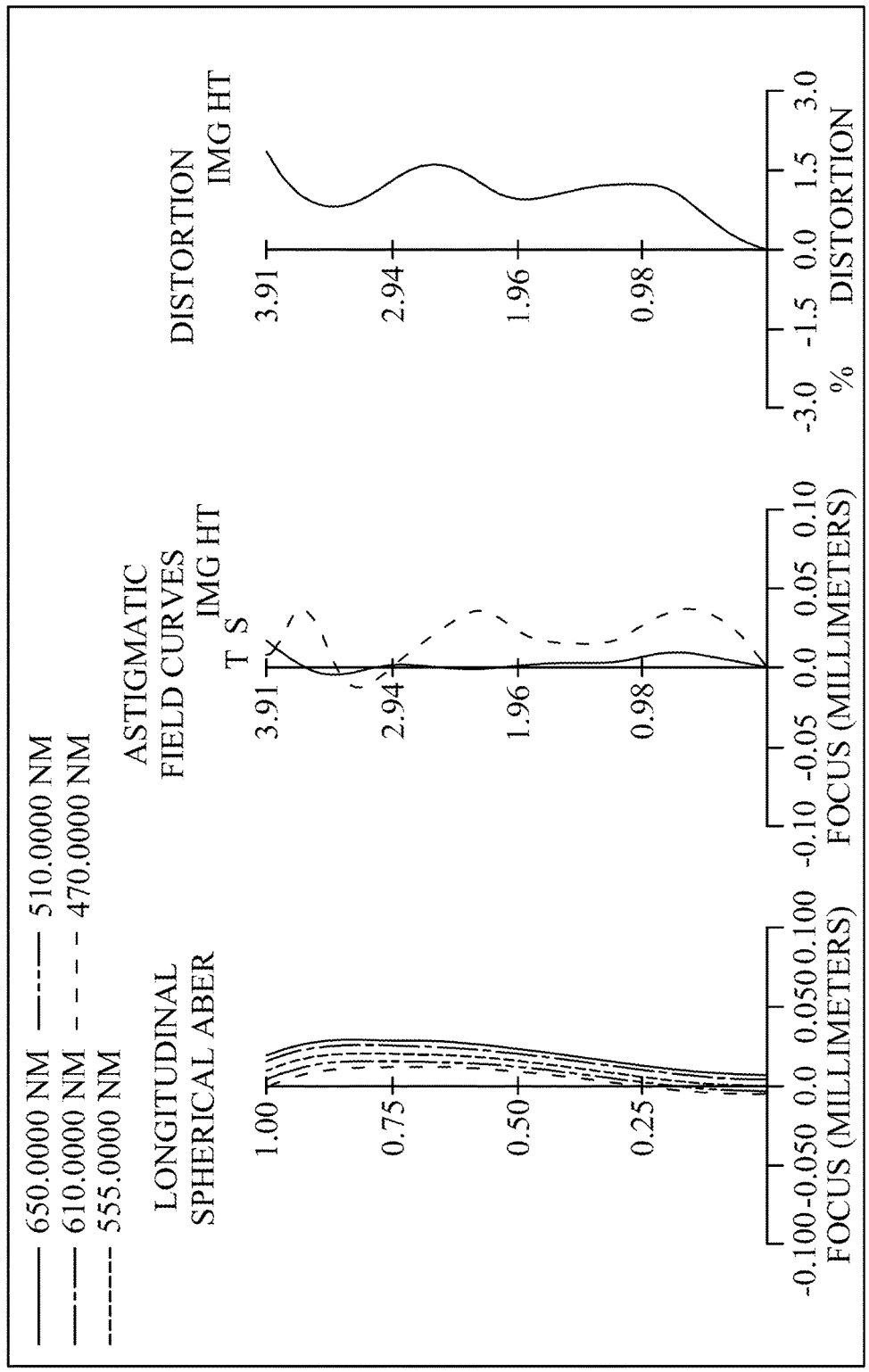
FIG. 8B is longitudinal spherical aberration curves, astigmatic field curves, and an optical distortion grid of the optical image capturing system in the order from left to right according to the eighth embodiment of the present application.
Figure 8C:
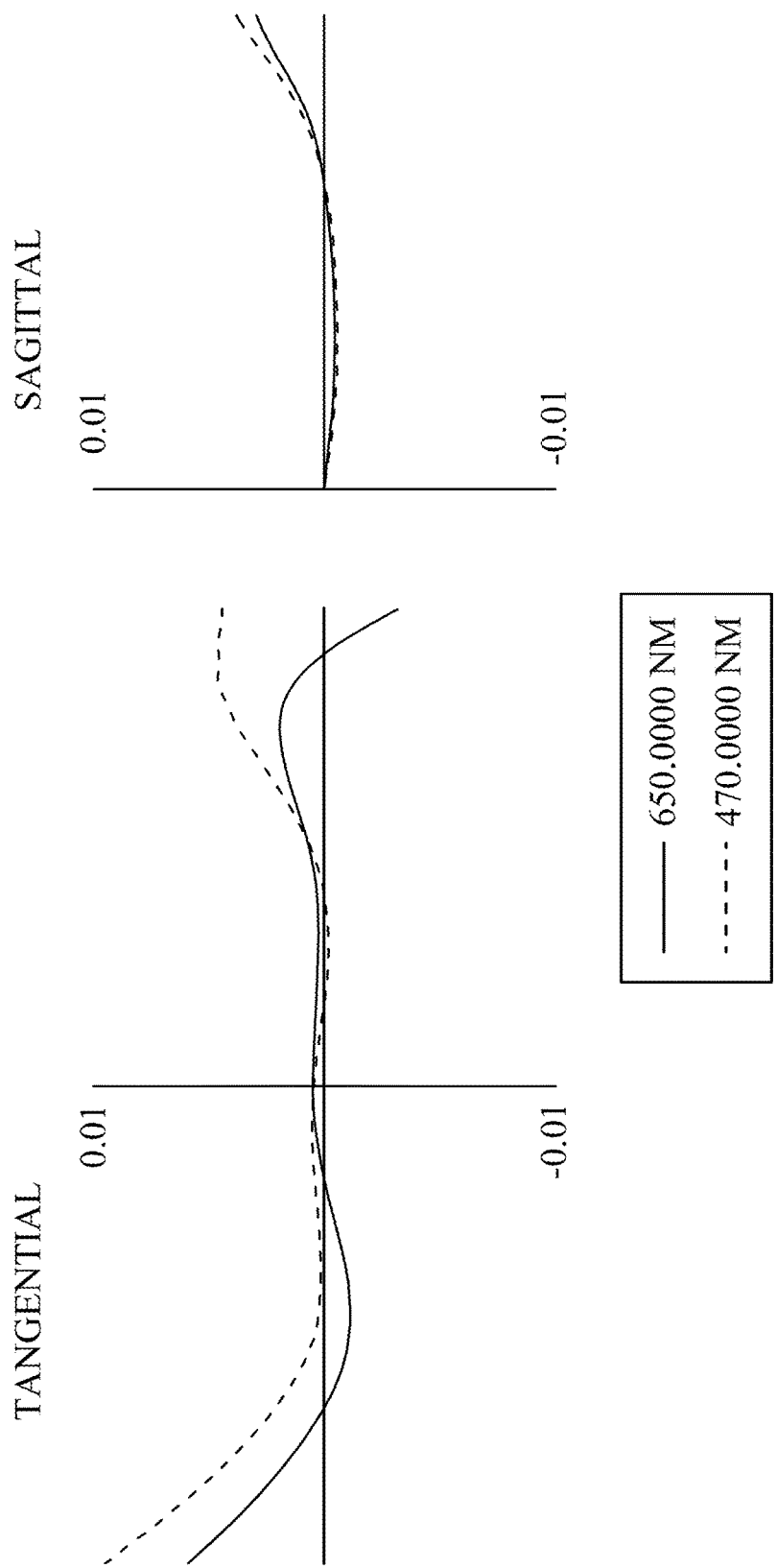
FIG. 8C is a lateral aberration diagram of tangential fan, sagittal fan, the longest operation wavelength and the shortest operation wavelength passing through an edge of the entrance pupil and incident on the image plane by 0.7 HOI according to the eighth embodiment of the present application.

Please refer to FIG. 8A, FIG. 8B and FIG. 8C, FIG. 8A is a schematic view of the optical image capturing system according to the eighth Embodiment of the present application, FIG. 8B is longitudinal spherical aberration curves, astigmatic field curves, and an optical distortion curve of the optical image capturing system in the order from left to right according to the eighth Embodiment of the present application, and FIG. 8C is a lateral aberration diagram of tangential fan, sagittal fan, the longest operation wavelength and the shortest operation wavelength passing through an edge of the entrance pupil and incident on the image plane by 0.7 HOI according to the eighth embodiment of the present application. As shown in FIG. 8A, in order from an object side to an image side, the optical image capturing system includes an aperture stop 800, a first lens element 810, a second lens clement 820, a third lens element 830, a fourth lens element 840, a fifth lens element 850, a sixth lens element 860, an IR-bandstop filter 880, an image plane 890, and an image sensing device 892.

The first lens element 810 has positive refractive power and it is made of plastic material. The first lens element 810 has a convex object-side surface 812 and a concave image-side surface 814, both of the object-side surface 812 and the image-side surface 814 are aspheric, and the image-side surface 814 has an inflection point.

The second lens element 820 has negative refractive power and it is made of plastic material. The second lens element 820 has a concave object-side surface 822 and a concave image-side surface 824, and both of the object-side surface 822 and the image-side surface 824 are aspheric. The image-side surface 824 has two inflection points.

The third lens element 830 has negative refractive power and it is made of plastic material. The third lens element 830 has a convex object-side surface 832 and a concave image-side surface 834, and both of the object-side surface 832 and the image-side surface 834 are aspheric. The object-side surface 832 and the image-side surface 834 both have an inflection point.

The fourth lens element 840 has positive refractive power and it is made of plastic material. The fourth lens element 840 has a concave object-side surface 842 and a convex image-side surface 844, and both of the object-side surface 842 and the image-side surface 844 are aspheric. The object-side surface 842 has three inflection points.

The fifth lens element 850 has positive refractive power and it is made of plastic material. The fifth lens element 850 has a convex object-side surface 852 and a convex image-side surface 854, and both of the object-side surface 852 and the image-side surface 854 are aspheric. The object-side surface 852 has three inflection points and the image-side surface 854 has an inflection point.

The sixth lens element 860 has negative refractive power and it is made of plastic material. The sixth lens element 860 has a concave object-side surface 862 and a concave image-side surface 864. The object-side surface 862 has two infection points and the image-side surface 864 has an inflection point. Hereby, the back focal length is reduced to miniaturize the lens element effectively. In addition, the angle of incident with incoming light from an off-axis view field can be suppressed effectively and the aberration in the off-axis view field can be corrected further.

The IR-bandstop filter 880 is made of glass material without affecting the focal length of the optical image capturing system and it is disposed between the sixth lens element 860 and the image plane 890.

In the optical image capturing system of the eighth embodiment, a sum of focal lengths of all lens elements with positive refractive power is ΣPP. The following relations are satisfied: ΣPP=12.785 mm and f5/ΣPP=0.10. Hereby, it is favorable for allocating the positive refractive power of a single lens element to other positive lens elements and the significant aberrations generated in the process of moving the incident light can be suppressed.

In the optical image capturing system of the sixth embodiment, a sum of focal lengths of all lens elements with negative refractive power is ΣNP. The following relations are satisfied: ΣNP=−112.117 mm and f6/ΣNP=0.009. Hereby, it is favorable for allocating the negative refractive power of a single lens element to other negative lens elements.

Please refer to the following Table 15 and Table 16. The detailed data of the optical image capturing system of the eighth Embodiment is as shown in Table 15.

TABLE 15

Data of the optical image capturing system
f = 3.213 mm; f/HEP = 2.4; HAF = 50.015 deg

| Surface # | | Curvature Radius | Thickness | Material | Index | Abbe # | Focal length |
|---|---|---|---|---|---|---|---|
| 0 | Object | Plano | At infinity | | | | |
| 1 | Shading sheet | Plano | 0.000 | | | | |

TABLE 15-continued

Data of the optical image capturing system
f = 3.213 mm; f/HEP = 2.4; HAF = 50.015 deg

| Surface # | | Curvature Radius | Thickness | Material | Index | Abbe # | Focal length |
|---|---|---|---|---|---|---|---|
| 2 | Ape. stop | Plano | −0.108 | | | | |
| 3 | Lens 1 | 2.117380565 | 0.267 | Plastic | 1.565 | 58.00 | 6.003 |
| 4 | | 5.351202213 | 0.632 | | | | |
| 5 | Lens 2 | −70.37596785 | 0.230 | Plastic | 1.517 | 21.40 | −11.326 |
| 6 | | 8.30936549 | 0.050 | | | | |
| 7 | Lens 3 | 7.333171865 | 0.705 | Plastic | 1.565 | 58.00 | −99.749 |
| 8 | | 6.265499794 | 0.180 | | | | |
| 9 | Lens 4 | −71.32533363 | 0.832 | Plastic | 1.565 | 58.00 | 5.508 |
| 10 | | −3.003657909 | 0.050 | | | | |
| 11 | Lens 5 | 3.397431079 | 0.688 | Plastic | 1.583 | 30.20 | 1.274 |
| 12 | | −0.886432266 | 0.050 | | | | |
| 13 | Lens 6 | −3.715425702 | 0.342 | Plastic | 1.650 | 21.40 | −1.042 |
| 14 | | 0.867623637 | 0.700 | | | | |
| 15 | IR-bandstop filter | Plano | 0.200 | | 1.517 | 64.13 | |
| 16 | | Plano | 0.407 | | | | |
| 17 | Image plane | Plano | | | | | |

Reference wavelength (d-line) = 555 nm, shield position: clear aperture (CA) of the first plano = 0.640 mm As for the parameters of the aspheric surfaces of the eighth Embodiment, reference is made to Table 16.

TABLE 16

Aspheric Coefficients

| Surface # | 3 | 4 | 5 | 6 | 7 | 8 | 9 |
|---|---|---|---|---|---|---|---|
| k | −1.486403E+00 | 2.003790E+01 | −4.783682E+01 | −2.902431E+01 | −5.000000E+01 | −5.000000E+01 | −5.000000E+01 |
| A4 | 2.043654E−02 | −2.642626E−02 | −6.237485E−02 | −4.896336E−02 | −7.363667E−02 | −5.443257E−02 | 3.105497E−02 |
| A6 | −2.231403E−04 | −4.147746E−02 | −8.137705E−02 | −1.981368E−02 | 1.494245E−02 | 1.263891E−04 | −1.532514E−02 |
| A8 | −1.387235E−02 | 2.901026E−02 | 4.589961E−02 | 3.312952E−03 | 6.252296E−03 | −9.655324E−03 | −6.443603E−04 |
| A10 | −3.431740E−02 | −9.512960E−02 | −5.485574E−02 | 5.634445E−03 | −2.226544E−03 | 1.318692E−03 | 4.321089E−04 |
| A12 | 0.000000E+00 | 0.000000E+00 | 0.000000E+00 | 0.000000E+00 | 0.000000E+00 | 0.000000E+00 | 0.000000E+00 |
| A14 | 0.000000E+00 | 0.000000E+00 | 0.000000E+00 | 0.000000E+00 | 0.000000E+00 | 0.000000E+00 | 0.000000E+00 |

| Surface # | 10 | 11 | 12 | 13 | 14 |
|---|---|---|---|---|---|
| k | 8.520005E−01 | −5.000000E+01 | −4.524978E+00 | −5.000000E+01 | −4.286435E+00 |
| A4 | −6.786287E−03 | −9.520247E−02 | −4.666187E−02 | 5.856863E−03 | −2.635938E−02 |
| A6 | 6.693976E−03 | −5.507560E−05 | 3.849227E−03 | 2.442214E−03 | 3.694093E−03 |
| A8 | 8.220809E−04 | 1.932773E−03 | 1.041053E−03 | −2.201034E−03 | −1.355873E−04 |
| A10 | −2.798394E−04 | 3.346274E−04 | 4.713339E−06 | −1.065215E−04 | −5.321575E−05 |
| A12 | 0.000000E+00 | 1.125736E−05 | −2.834871E−06 | 1.227641E−04 | 6.838440E−06 |
| A14 | 0.000000E+00 | −1.671951E−05 | −2.293810E−06 | −1.181115E−05 | −2.530792E−07 |

In the eighth Embodiment, the presentation of the aspheric surface formula is similar to that in the first embodiment. Besides, the definitions of parameters in following tables are equal to those in the first embodiment, so the repetitious details will not be given here.

The following contents may be deduced from Table 15 and Table 16.

Eighth Embodiment (Primary reference wavelength: 555 nm)

| |f/f1| | |f/f2| | |f/f3| | |f/f4| | |f/f5| | |f/f6| |
|---|---|---|---|---|---|
| 0.53529 | 0.28371 | 0.03221 | 0.58335 | 2.52139 | 3.08263 |

| Σ PPR | Σ NPR | Σ PPR/|Σ NPR| | IN12/f | IN56/f | TP4/(IN34 + TP4 + IN45) |
|---|---|---|---|---|---|
| 6.72266 | 0.84594 | 7.94700 | 0.19680 | 0.01556 | 0.78362 |

-continued

Eighth Embodiment (Primary reference wavelength: 555 nm)

| |f1/f2| | |f2/f3| | (TP1 + IN12)/TP2 | (TP6 + IN56)/TP5 |
|---|---|---|---|
| 0.53001 | 0.11354 | 3.90947 | 0.56888 |

| HOS | InTL | HOS/HOI | InS/HOS | ODT % | TDT % |
|---|---|---|---|---|---|
| 5.33002 | 4.02576 | 1.36178 | 0.97981 | 1.92371 | 1.09084 |

| HVT51 | HVT52 | HVT61 | HVT62 | HVT62/HOI | HVT62/HOS |
|---|---|---|---|---|---|
| 0.67483 | 0 | 0.00000 | 2.23965 | 0.57222 | 0.42020 |

-continued

| Eighth Embodiment (Primary reference wavelength: 555 nm) | | | | | |
|---|---|---|---|---|---|
| TP2/TP3 | TP3/TP4 | InRS61 | InRS62 | \|InRS61\|/TP6 | \|InRS62\|/TP6 |
| 0.32631 | 0.84713 | −0.74088 | −0.06065 | 2.16896 | 0.17755 |
| PLTA | PSTA | NLTA | NSTA | SLTA | SSTA |
| 0.005 mm | −0.003 mm | 0.010 mm | 0.006 mm | 0.004 mm | 0.003 mm |

The numerical related to the length of outline curve is shown according to table 15 and table 16.

| Eighth embodiment (Primary reference wavelength = 555 nm) | | | | | | |
|---|---|---|---|---|---|---|
| ARE | 1/2(HEP) | ARE value | ARE − 1/2(HEP) | 2(ARE/HEP) % | TP | ARE/TP (%) |
| 11 | 0.648 | 0.658 | 0.01023 | 101.58% | 0.267 | 246.73% |
| 12 | 0.670 | 0.670 | 0.00041 | 100.06% | 0.267 | 251.19% |
| 21 | 0.670 | 0.670 | 0.00002 | 100.00% | 0.230 | 291.24% |
| 22 | 0.670 | 0.669 | −0.00064 | 99.90% | 0.230 | 290.95% |
| 31 | 0.670 | 0.669 | −0.00063 | 99.91% | 0.705 | 94.94% |
| 32 | 0.670 | 0.669 | −0.00046 | 99.93% | 0.705 | 94.97% |
| 41 | 0.670 | 0.669 | −0.00082 | 99.88% | 0.832 | 80.40% |
| 42 | 0.670 | 0.675 | 0.00511 | 100.76% | 0.832 | 81.12% |
| 51 | 0.670 | 0.670 | −0.00003 | 100.00% | 0.688 | 97.31% |
| 52 | 0.670 | 0.702 | 0.03243 | 104.84% | 0.688 | 102.02% |
| 61 | 0.670 | 0.671 | 0.00099 | 100.15% | 0.342 | 196.39% |
| 62 | 0.670 | 0.699 | 0.02890 | 104.31% | 0.342 | 204.56% |
| ARS | EHD | ARS value | ARS − EHD | (ARS/EHD)% | TP | ARS/TP (%) |
| 11 | 0.648 | 0.658 | 0.01023 | 101.58% | 0.267 | 246.73% |
| 12 | 0.697 | 0.697 | 0.00042 | 100.06% | 0.267 | 261.33% |
| 21 | 0.994 | 1.026 | 0.03192 | 103.21% | 0.230 | 446.16% |
| 22 | 1.255 | 1.259 | 0.00315 | 100.25% | 0.230 | 547.21% |
| 31 | 1.383 | 1.385 | 0.00192 | 100.14% | 0.705 | 196.48% |
| 32 | 1.604 | 1.816 | 0.21279 | 113.27% | 0.705 | 257.68% |
| 41 | 1.876 | 1.908 | 0.03181 | 101.70% | 0.832 | 229.32% |
| 42 | 2.027 | 2.193 | 0.16648 | 108.21% | 0.832 | 263.61% |
| 51 | 2.038 | 2.282 | 0.24376 | 111.96% | 0.688 | 331.49% |
| 52 | 2.144 | 2.485 | 0.34081 | 115.89% | 0.688 | 361.03% |
| 61 | 2.411 | 2.624 | 0.21261 | 108.82% | 0.342 | 768.18% |
| 62 | 3.309 | 3.686 | 0.37664 | 111.38% | 0.342 | 1078.99% |

The following contents may be deduced from Table 15 and Table 16.

| Related inflection point values of eighth Embodiment (Primary reference wavelength: 555 nm) | | | | | | |
|---|---|---|---|---|---|---|
| HIF121 | 0.57452 | HIF121/HOI | 0.14679 | SGI121 | 0.02858 | \| SGI121 \|/(\| SGI121 \| + TP1) | 0.09675 |
| HIF221 | 0.40206 | HIF221/HOI | 0.10272 | SGI221 | 0.00821 | \| SGI221 \|/(\| SGI221 \| + TP2) | 0.03448 |
| HIF222 | 1.11769 | HIF222/HOI | 0.28556 | SGI222 | −0.02234 | \| SGI222 \|/(\| SGI222 \| + TP2) | 0.08853 |
| HIF311 | 0.37391 | HIF311/HOI | 0.09553 | SGI311 | 0.00785 | \| SGI311 \|/(\| SGI311 \| + TP3) | 0.01102 |
| HIF321 | 0.42061 | HIF321/HOI | 0.10746 | SGI321 | 0.01170 | \| SGI321 \|/(\| SGI321 \| + TP3) | 0.01633 |
| HIF411 | 0.19878 | HIF411/HOI | 0.05079 | SGI411 | −0.00023 | \| SGI411 \|/(\| SGI411 \| + TP4) | 0.00028 |
| HIF412 | 0.87349 | HIF412/HOI | 0.22317 | SGI412 | 0.00583 | \| SGI412 \|/(\| SGI412 \| + TP4) | 0.00695 |
| HIF413 | 1.87638 | HIF413/HOI | 0.47940 | SGI413 | −0.17360 | \| SGI413 \|/(\| SGI413 \| + TP4) | 0.17263 |
| HIF511 | 0.36373 | HIF511/HOI | 0.09293 | SGI511 | 0.015644 | \| SGI511 \|/(\| SGI511 \| + TP5) | 0.02222 |
| HIF512 | 1.7159 | HIF512/HOI | 0.43840 | SGI512 | −0.446747 | \| SGI512 \|/(\| SGI512 \| + TP5) | 0.39358 |
| HIF513 | 1.93653 | HIF513/HOI | 0.49477 | SGI513 | −0.638544 | \| SGI513 \|/(\| SGI513 \| + TP5) | 0.48124 |
| HIF521 | 1.54767 | HIF521/HOI | 0.39542 | SGI521 | −0.792114 | \| SGI521 \|/(\| SGI521 \| + TP5) | 0.53505 |
| HIF611 | 0.82168 | HIF611/HOI | 0.20993 | SGI611 | −0.060958 | \| SGI611 \|/(\| SGI611 \| + TP6) | 0.15143 |
| HIF612 | 0.98146 | HIF612/HOI | 0.25076 | SGI612 | −0.07785 | \| SGI612 \|/(\| SGI612 \| + TP6) | 0.18561 |
| HIF621 | 0.79476 | HIF621/HOI | 0.20306 | SGI621 | −0.238143 | \| SGI621 \|/(\| SGI621 \| + TP6) | 0.41079 |

The above-mentioned descriptions represent merely the exemplary embodiment of the present disclosure, without any intention to limit the scope of the present disclosure thereto. Various equivalent changes, alternations or modifications based on the claims of present disclosure are all consequently viewed as being embraced by the scope of the present disclosure.

What is claimed is:

1. An optical image capturing system, from an object side to an image side, comprising:
   a first lens element with positive refractive power;
   a second lens element with negative refractive power;
   a third lens element with positive refractive power;
   a fourth lens element with refractive power;
   a fifth lens element with refractive power;
   a sixth lens element with refractive power; and
   an image plane;

wherein the optical image capturing system consists of the six lens elements with refractive power, a maximum height for image formation on the image plane perpendicular to the optical axis in the optical image capturing system is denoted by HOI, at least one of the first through sixth lens elements has positive refractive power, focal lengths of the first through sixth lens elements are f1, f2, f3, f4, f5 and f6 respectively, a focal length of the optical image capturing system is f, an entrance pupil diameter of the optical image capturing system is HEP, a distance on an optical axis from an object-side surface of the first lens element to the image plane is HOS, a distance on an optical axis from the object-side surface of the first lens element to the image-side surface of the sixth lens element is InTL, a length of outline curve from an axial point on any surface of any one of the six lens elements to a coordinate point of vertical height with a distance of a half of the entrance pupil diameter from the optical axis on the surface along an outline of the surface is denoted as ARE, the following relations are satisfied: 1.2≤f/HEP≤2.4, 0<InTL/HOS<0.9 and 0.9≤2(ARE/HEP)≤1.5;

wherein a half of a maximum view angle of the optical image capturing system is HAF, and the following relation is satisfied: 0 deg<HAF≤60 deg.

2. The optical image capturing system of claim 1, wherein TV distortion for image formation in the optical image capturing system is TDT, a maximum height for image formation on the image plane perpendicular to the optical axis in the optical image capturing system is denoted by HOI, a lateral aberration of the longest operation wavelength of a visible light of a positive direction tangential fan of the optical image capturing system passing through an edge of the entrance pupil and incident on the image plane by 0.7 HOI is denoted as PLTA, and a lateral aberration of the shortest operation wavelength of a visible light of the positive direction tangential fan of the optical image capturing system passing through the edge of the entrance pupil and incident on the image plane by 0.7 HOI is denoted as PSTA, a lateral aberration of the longest operation wavelength of a visible light of a negative direction tangential fan of the optical image capturing system passing through the edge of the entrance pupil and incident on the image plane by 0.7 HOI is denoted as NLTA, a lateral aberration of the shortest operation wavelength of a visible light of a negative direction tangential fan of the optical image capturing system passing through the edge of the entrance pupil and incident on the image plane by 0.7 HOI is denoted as NSTA, a lateral aberration of the longest operation wavelength of a visible light of a sagittal fan of the optical image capturing system passing through the edge of the entrance pupil and incident on the image plane by 0.7 HOI is denoted as SLTA, a lateral aberration of the shortest operation wavelength of a visible light of the sagittal fan of the optical image capturing system passing through the edge of the entrance pupil and incident on the image plane by 0.7 HOI is denoted as SSTA, the following relations are satisfied: PLTA≤100 μm; PSTA≤100 μm; NLTA≤100 μm; NSTA≤100 μm; SLTA≤100 μm; and SSTA≤100 μm; |TDT|<250%.

3. The optical image capturing system of claim 1, wherein a maximum effective half diameter position of any surface of any one of the six lens elements is denoted as EHD, and a length of outline curve from an axial point on any surface of any one of the six lens elements to the maximum effective half diameter position of the surface along the outline of the surface is denoted as ARS, the following relation is satisfied: 0.9≤ARS /EHD≤2.0.

4. The optical image capturing system of claim 1, wherein the following relation is satisfied: 0 mm<HOS≤30 mm.

5. The optical image capturing system of claim 1, wherein a length of outline curve from an axial point on the object-side surface of the sixth lens element to a coordinate point of vertical height with a distance of a half of the entrance pupil diameter from the optical axis on the surface along an outline of the surface is denoted as ARE61; a length of outline curve from an axial point on the image-side surface of the sixth lens element to the coordinate point of vertical height with the distance of a half of the entrance pupil diameter from the optical axis on the surface along the outline of the surface is denoted as ARE62, and a thickness of the sixth lens element on the optical axis is TP6, the following relations are satisfied: 0.05≤ARE61/TP6≤15, and 0.05≤ARE62/TP6≤15.

6. The optical image capturing system of claim 1, wherein a length of outline curve from an axial point on the object-side surface of the fifth lens element to a coordinate point of vertical height with a distance of a half of the entrance pupil diameter from the optical axis on the surface along an outline of the surface is denoted as ARE51; a length of outline curve from an axial point on the image-side surface of the fifth lens element to the coordinate point of vertical height with the distance of a half of the entrance pupil diameter from the optical axis on the surface along the outline of the surface is denoted as ARE52, and a thickness of the fifth lens element on the optical axis is TP5, the following relations are satisfied: 0.05≤ARE51/TP5≤15; and 0.05≤ARE52/TP5≤15.

7. The optical image capturing system of claim 1, further comprising an aperture stop, a distance from the aperture stop to the image plane on the optical axis is InS, and the following relation is satisfied: 0.2≤InS/HOS≤1.1.

8. An optical image capturing system, from an object side to an image side, comprising:
 a first lens element with positive refractive power;
 a second lens element with negative refractive power;
 a third lens element with positive refractive power;
 a fourth lens element with refractive power;
 a fifth lens element with refractive power;
 a sixth lens element with refractive power; and
 an image plane;
 wherein the optical image capturing system consists of the six lens elements with refractive power, a maximum height for image formation on the image plane perpendicular to the optical axis in the optical image capturing system is denoted by HOI, at least two lens elements among the first through sixth lens elements respectively have at least one inflection point on at least one surface thereof, at least one of the second through fourth lens elements has positive refractive power, focal lengths of the first through sixth lens elements are f1, f2, f3, f4, f5 and f6 respectively, a focal length of the optical image capturing system is f, an entrance pupil diameter of the optical image capturing system is HEP, a distance on an optical axis from an object-side surface of the first lens element to the image plane is HOS, a distance on an optical axis from the object-side surface of the first lens element to the image-side surface of the sixth lens element is InTL, a length of outline curve from an axial point on any surface of any one of the six lens elements to a coordinate point of vertical height with a distance of a half of the entrance pupil diameter from the optical axis on the surface along an outline of the surface is denoted as ARE, the following relations are satisfied: 1.2≤f/HEP≤2.4, 0<InTL/HOS<0.9 and 0.9≤2(ARE/HEP)≤1.5;
 wherein a half of a maximum view angle of the optical image capturing system is HAF, and the following relation is satisfied: 0 deg<HAF≤60 deg.

9. The optical image capturing system of claim 8, wherein a maximum effective half diameter position of any surface of any one of the six lens elements is denoted as EHD, and a length of outline curve from an axial point on any surface of any one of the six lens elements to the maximum effective half diameter position of the surface along the outline of the surface is denoted as ARS, the following relation is satisfied: 0.9≤ARS /EHD≤2.0.

10. The optical image capturing system of claim 8, wherein at least three lens elements among the first through sixth lens elements respectively have at least one inflection point on at least one surface thereof.

11. The optical image capturing system of claim 8, wherein a maximum height for image formation on the image plane perpendicular to the optical axis in the optical image capturing system is denoted by HOI, a lateral aberration of the longest operation wavelength of a visible light of a positive direction tangential fan of the optical image capturing system passing through an edge of the entrance pupil and incident on the image plane by 0.7 HOI is denoted as PLTA, and a lateral aberration of the shortest operation wavelength of a visible light of the positive direction tangential fan of the optical image capturing system passing through the edge of the entrance pupil and incident on the image plane by 0.7 HOI is denoted as PSTA, a lateral aberration of the longest operation wavelength of a visible light of a negative direction tangential fan of the optical image capturing system passing through the edge of the entrance pupil and incident on the image plane by 0.7 is denoted as NLTA, a lateral aberration of the shortest operation wavelength of a visible light of a negative direction tangential fan of the optical image capturing system passing through the edge of the entrance pupil and incident on the image plane by 0.7 HOI is denoted as NSTA, a lateral aberration of the longest operation wavelength of a visible light of a sagittal fan of the optical image capturing system passing through the edge of the entrance pupil and incident on the image plane by 0.7 HOI is denoted as SLTA, a lateral aberration of the shortest operation wavelength of a visible light of the sagittal fan of the optical image capturing system passing through the edge of the entrance pupil and incident on the image plane by 0.7 HOI is denoted as SSTA, the following relations are satisfied: PLTA≤100 μm; PSTA≤100 μm; NLTA≤100 μm; NSTA≤100 μm; SLTA≤100 μm; SSTA≤100 μm and HOI>3.0 mm.

12. The optical image capturing system of claim 8, wherein at least one of the first, the second, the third, the fourth, the fifth and the sixth lens elements is a light filtration element with a wavelength of less than 500 nm.

13. The optical image capturing system of claim 8, wherein a distance between the first lens element and the second lens element on the optical axis is IN12, and the following relation is satisfied: 0<IN12/f≤3.0.

14. The optical image capturing system of claim 8, wherein a distance between the fifth lens element and the sixth lens element on the optical axis is IN56, and the following relation is satisfied: 0<IN56/f≤0.8.

15. The optical image capturing system of claim 8, wherein the distance from the fifth lens element to the sixth lens element on the optical axis is IN56, a thickness of the fifth lens element and a thickness of the sixth lens element on the optical axis respectively are TP5 and TP6, and the following relation is satisfied: 0.1≤(TP6+IN56)/TP5≤10.

16. The optical image capturing system of claim 8, wherein the distance from the first lens element to the second lens element on the optical axis is IN12, a thickness of the first lens element and a thickness of the second lens element on the optical axis respectively are TP1 and TP2, and the following relation is satisfied: 0.1≤(TP1+IN12)/TP2≤10.

17. The optical image capturing system of claim 8, wherein a distance from the third lens element to the fourth lens element on the optical axis is IN34, a distance from the fourth lens element to the fifth lens element on the optical axis is IN45, a thickness of the fourth lens element is TP4, and the following relation is satisfied: 0<TP4/(IN34+TP4+IN45)<1.

18. An optical image capturing system, from an object side to an image side, comprising:
a first lens element with positive refractive power;
a second lens element with negative refractive power;
a third lens element with positive refractive power;
a fourth lens element with refractive power;
a fifth lens element with refractive power;
a sixth lens element with refractive power; and
an image plane; wherein the optical image capturing system consists of the six lens elements with refractive power, a maximum height for image formation on the image plane perpendicular to the optical axis in the optical image capturing system is denoted by HOI, at least three lens elements among the first through sixth lens elements respectively have at least one inflection point on at least one surface thereof, an object-side surface and an image-side surface of at least one of the six lens elements are aspheric, focal lengths of the first through sixth lens elements are f1, f2, f3, f4, f5 and f6 respectively, a focal length of the optical image capturing system is f, an entrance pupil diameter of the optical image capturing system is HEP, a half of maximum view angle of the optical image capturing system is HAF, a distance on an optical axis from an object-side surface of the first lens element to the image plane is HOS, a distance on an optical axis from the object-side surface of the first lens element to the image-side surface of the sixth lens element is InTL, a length of outline curve from an axial point on any surface of any one of the six lens elements to a coordinate point of vertical height with a distance of a half of the entrance pupil diameter from the optical axis on the surface along an outline of the surface is denoted as ARE, the following relations are satisfied: 1.2≤f/HEP≤2.4; 0<InTL/HOS<0.9; HOI>3.0 mm and 0.9≤2 (ARE/HEP)≤1.5;
wherein the following relation is satisfied: 0 deg<HAF≤60 deg.

19. The optical image capturing system of claim 18, wherein a maximum effective half diameter position of any surface of any one of the six lens elements is denoted as EHD, and a length of outline curve from an axial point on any surface of any one of the six lens elements to the maximum effective half diameter position of the surface along the outline of the surface is denoted as ARS, the following relation is satisfied: 0.95≤ARS /EHD≤2.0.

20. The optical image capturing system of claim 18, wherein the following relation is satisfied: 0 mm<HOS≤30 mm.

21. The optical image capturing system of claim 18, wherein a length of outline curve from an axial point on the object-side surface of the sixth lens element to a coordinate point of vertical height with a distance of a half of the entrance pupil diameter from the optical axis on the surface along an outline of the surface is denoted as ARE61; a length of outline curve from an axial point on the image-side surface of the sixth lens element to the coordinate point of vertical height with the distance of a half of the entrance pupil diameter from the optical axis on the surface along the outline of the surface is denoted as ARE62, and a thickness of the sixth lens element on the optical axis is TP6, the following relations are satisfied: $0.05 \leq ARE\mathbf{61}/TP\mathbf{6} \leq 15$ and $0.05 \leq ARE\mathbf{62}/TP\mathbf{6} \leq 15$.

22. The optical image capturing system of claim 18, wherein a length of outline curve from an axial point on the object-side surface of the fifth lens element to a coordinate point of vertical height with a distance of a half of the entrance pupil diameter from the optical axis on the surface along an outline of the surface is denoted as ARE51; a length of outline curve from an axial point on the image-side surface of the fifth lens element to the coordinate point of vertical height with the distance of a half of the entrance pupil diameter from the optical axis on the surface along the outline of the surface is denoted as ARE52, and a thickness of the fifth lens element on the optical axis is TP5, the following relations are satisfied: $0.05 \leq ARE\mathbf{51}/TP\mathbf{5} \leq 15$ and $0.05 \leq ARE\mathbf{52}/TP\mathbf{5} \leq 15$.

23. The optical image capturing system of claim 18, wherein the optical image capturing system further comprise an aperture stop, an image sensing device and a driving module, the image sensing device is disposed on the image plane, a distance from the aperture stop to the image plane is InS, and the driving module couples with the lens elements to displace the lens elements, the following relation is satisfied: $0.2 \leq InS/HOS \leq 1.1$.

\* \* \* \* \*